US008902860B2

(12) United States Patent  
Laroia et al.

(10) Patent No.: US 8,902,860 B2
(45) Date of Patent: Dec. 2, 2014

(54) WIRELESS COMMUNICATION METHODS AND APPARATUS USING BEACON SIGNALS

(75) Inventors: Rajiv Laroia, Far Hills, NJ (US); Frank A. Lane, Asbury, NJ (US); Junyi Li, Bedminster, NJ (US); Tom Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1766 days.

(21) Appl. No.: 11/621,991

(22) Filed: Jan. 10, 2007

(65) Prior Publication Data

US 2008/0002648 A1 Jan. 3, 2008

Related U.S. Application Data

(60) Provisional application No. 60/758,010, filed on Jan. 11, 2006, provisional application No. 60/758,011, (Continued)

(51) Int. Cl.
*H04J 3/00* (2006.01)
*H04L 5/00* (2006.01)

(Continued)

(52) U.S. Cl.
CPC ............ *H04W 72/02* (2013.01); *H04W 84/042* (2013.01); *H04L 27/2601* (2013.01); *H04L*

(Continued)

(58) Field of Classification Search
CPC ..... H04W 88/06; H04W 16/14; H04W 84/18; H04L 5/0048
USPC .......... 455/41.2, 41.3, 552.1, 553.1; 370/338, 370/328, 341
See application file for complete search history.

(56) References Cited

U.S. PATENT DOCUMENTS

| 2,972,743 A | 2/1961 | Svensson et al. |
| 5,216,693 A | 6/1993 | Nakamura |

(Continued)

FOREIGN PATENT DOCUMENTS

| CN | 1310927 A | 8/2001 |
| CN | 1327354 A | 12/2001 |

(Continued)

OTHER PUBLICATIONS

International Search Report—PCT/US20071060360, International Search Authority—European Patent Office—Sep. 14, 2007.

(Continued)

*Primary Examiner* — Olumide T Ajibade Akonai
*Assistant Examiner* — Edward Zhang
(74) *Attorney, Agent, or Firm* — James K. O'Hare

(57) ABSTRACT

Methods and apparatus supporting peer to peer communications are discussed. A base station serving as an access node for wireless terminals also communicates information supporting peer to peer communications. A base station transmits a beacon signal conveying information about a peer to peer frequency band and also receives user data from a plurality of wireless terminals, using the base station as a current point of network attachment. In some embodiments, the beacon signal is transmitted into the same frequency band being used for access node based communications and identifies a different frequency band which is to be used as a peer to peer frequency band. Alternatively, or in addition, in support of peer to peer communications, a beacon signal transmission apparatus, a free standing device which doesn't transmit user data, transmits a sequence of beacon signal bursts, each beacon signal burst including at least one high power beacon symbol.

68 Claims, 37 Drawing Sheets

Related U.S. Application Data filed on Jan. 11, 2006, provisional application No. 60/758,012, filed on Jan. 11, 2006, provisional application No. 60/845,052, filed on Sep. 15, 2006, provisional application No. 60/845,051, filed on Sep. 15, 2006, provisional application No. 60/863,304, filed on Oct. 27, 2006.

(51) Int. Cl.
| | | |
|---|---|---|
| H04W 48/20 | (2009.01) | |
| H04W 8/00 | (2009.01) | |
| H04W 72/02 | (2009.01) | |
| H04W 36/16 | (2009.01) | |
| H04W 16/14 | (2009.01) | |
| H04W 88/10 | (2009.01) | |
| H04W 52/02 | (2009.01) | |
| H04W 84/04 | (2009.01) | |
| H04L 27/26 | (2006.01) | |
| H04W 48/08 | (2009.01) | |
| H04W 36/24 | (2009.01) | |
| H04W 88/04 | (2009.01) | |
| H04W 52/04 | (2009.01) | |
| H04W 28/04 | (2009.01) | |
| H04W 40/24 | (2009.01) | |
| H04W 48/16 | (2009.01) | |
| H04W 84/18 | (2009.01) | |
| H04W 28/18 | (2009.01) | |
| H04J 3/06 | (2006.01) | |
| H04W 88/06 | (2009.01) | |
| H04W 88/02 | (2009.01) | |

(52) U.S. Cl.
CPC ..... 5/0016 (2013.01); H04W 48/08 (2013.01); H04W 36/24 (2013.01); H04W 88/04 (2013.01); H04W 48/20 (2013.01); H04W 52/04 (2013.01); Y02B 60/50 (2013.01); H04W 8/005 (2013.01); H04L 27/261 (2013.01); H04W 28/048 (2013.01); H04L 5/0035 (2013.01); H04L 5/0048 (2013.01); H04W 40/24 (2013.01); H04W 48/16 (2013.01); H04W 84/18 (2013.01); H04W 28/18 (2013.01); H04J 3/0602 (2013.01); H04W 88/06 (2013.01); H04W 88/02 (2013.01); H04W 36/16 (2013.01); H04W 16/14 (2013.01); H04W 88/10 (2013.01); H04W 52/0229 (2013.01)
USPC .... 370/336; 455/41.3; 455/552.1; 455/553.1; 370/338; 370/341

(56) References Cited

U.S. PATENT DOCUMENTS

| | | | |
|---|---|---|---|
| 5,233,627 A | 8/1993 | Kozima et al. | |
| 5,535,425 A | 7/1996 | Watanabe | |
| 5,583,870 A | 12/1996 | Delprat et al. | |
| 5,701,589 A | 12/1997 | Lee et al. | |
| 5,726,893 A | 3/1998 | Schuchman et al. | |
| 5,754,542 A | 5/1998 | Ault et al. | |
| 5,805,575 A * | 9/1998 | Kamin, Jr. | 370/335 |
| 5,818,871 A | 10/1998 | Blakeney, II et al. | |
| 5,839,074 A | 11/1998 | Plehn | |
| 5,844,900 A | 12/1998 | Hong et al. | |
| 5,852,780 A | 12/1998 | Wang et al. | |
| 5,903,618 A | 5/1999 | Miyake et al. | |
| 5,940,765 A | 8/1999 | Haartsen | |
| 5,953,323 A | 9/1999 | Haartsen | |
| 5,991,639 A | 11/1999 | Rautiola et al. | |
| 5,995,500 A | 11/1999 | Ma et al. | |
| 5,995,844 A | 11/1999 | Fukuda | |
| 6,011,515 A * | 1/2000 | Radcliffe et al. | 342/453 |
| 6,047,178 A | 4/2000 | Frlan | |
| 6,175,747 B1 | 1/2001 | Tanishima et al. | |
| 6,230,012 B1 | 5/2001 | Willkie et al. | |
| 6,377,608 B1 | 4/2002 | Zyren | |
| 6,389,062 B1 | 5/2002 | Wu | |
| 6,473,418 B1 | 10/2002 | Laroia et al. | |
| 6,545,997 B1 | 4/2003 | Bohnke et al. | |
| 6,574,266 B1 * | 6/2003 | Haartsen | 375/133 |
| 6,580,981 B1 | 6/2003 | Masood et al. | |
| 6,609,010 B1 | 8/2003 | Dolle et al. | |
| 6,611,507 B1 | 8/2003 | Hottinen et al. | |
| 6,614,769 B1 | 9/2003 | Eteminan et al. | |
| 6,650,629 B1 * | 11/2003 | Takahashi et al. | 370/335 |
| 6,671,525 B2 | 12/2003 | Allen et al. | |
| 6,725,058 B2 * | 4/2004 | Rinne et al. | 455/553.1 |
| 6,728,232 B2 | 4/2004 | Hasty, Jr. et al. | |
| 6,735,448 B1 | 5/2004 | Krishnamurthy et al. | |
| 6,741,836 B2 | 5/2004 | Lee et al. | |
| 6,744,743 B2 | 6/2004 | Walton et al. | |
| 6,760,599 B1 | 7/2004 | Uhlik | |
| 6,763,013 B2 | 7/2004 | Kennedy | |
| 6,771,963 B1 * | 8/2004 | Kuo et al. | 455/437 |
| 6,859,463 B1 | 2/2005 | Mayor et al. | |
| 6,882,632 B1 | 4/2005 | Koo et al. | |
| 6,882,851 B2 | 4/2005 | Sugar et al. | |
| 6,920,171 B2 | 7/2005 | Souissi et al. | |
| 6,922,388 B1 | 7/2005 | Laroia et al. | |
| 6,934,299 B2 | 8/2005 | Kaatz | |
| 6,940,827 B2 | 9/2005 | Li et al. | |
| 6,940,843 B2 | 9/2005 | Goodall et al. | |
| 6,975,600 B1 * | 12/2005 | Vaughan et al. | 370/321 |
| 6,975,855 B1 | 12/2005 | Wallenius | |
| 6,982,987 B2 | 1/2006 | Cain | |
| 6,985,087 B2 | 1/2006 | Soliman | |
| 6,990,087 B2 | 1/2006 | Rao et al. | |
| 7,006,451 B2 | 2/2006 | Kuwahara | |
| 7,013,145 B1 | 3/2006 | Centore, III | |
| 7,016,649 B1 * | 3/2006 | Narasimhan et al. | 455/63.1 |
| 7,016,673 B2 | 3/2006 | Reddy et al. | |
| 7,019,616 B2 | 3/2006 | Fernandez | |
| 7,027,409 B2 | 4/2006 | Cain | |
| 7,035,221 B2 | 4/2006 | Furukawa et al. | |
| 7,039,372 B1 | 5/2006 | Sorrells et al. | |
| 7,072,650 B2 | 7/2006 | Stanforth | |
| 7,092,353 B2 | 8/2006 | Laroia et al. | |
| 7,092,391 B2 | 8/2006 | Umeda | |
| 7,103,314 B2 | 9/2006 | Li | |
| 7,130,368 B1 | 10/2006 | Aweya et al. | |
| 7,133,697 B2 | 11/2006 | Judd et al. | |
| 7,136,655 B2 | 11/2006 | Skafidas et al. | |
| 7,146,130 B2 | 12/2006 | Hsu et al. | |
| 7,149,201 B2 | 12/2006 | Hunzinger | |
| 7,151,945 B2 | 12/2006 | Myles et al. | |
| 7,164,885 B2 | 1/2007 | Jonsson et al. | |
| 7,167,463 B2 | 1/2007 | Alapuranen | |
| 7,174,187 B1 | 2/2007 | Ngan | |
| 7,180,884 B2 | 2/2007 | Elliott et al. | |
| 7,194,263 B2 | 3/2007 | Bahl et al. | |
| 7,218,689 B2 | 5/2007 | Gupta | |
| 7,221,667 B2 | 5/2007 | Hori et al. | |
| 7,224,954 B2 | 5/2007 | Okajima et al. | |
| 7,228,138 B2 | 6/2007 | Hansson et al. | |
| 7,233,602 B2 | 6/2007 | Chen et al. | |
| 7,246,235 B2 | 7/2007 | Ellison et al. | |
| 7,248,570 B2 | 7/2007 | Bahl et al. | |
| 7,260,399 B1 | 8/2007 | Oh et al. | |
| 7,269,169 B1 | 9/2007 | Venkataraman et al. | |
| 7,280,467 B2 * | 10/2007 | Smee et al. | 370/208 |
| 7,280,810 B2 | 10/2007 | Feher | |
| 7,298,716 B2 | 11/2007 | Abraham et al. | |
| 7,313,628 B2 | 12/2007 | Chaskar et al. | |
| 7,333,829 B2 | 2/2008 | Malone et al. | |
| 7,336,626 B1 | 2/2008 | Barratt et al. | |
| 7,336,927 B2 | 2/2008 | Diaz Cervera et al. | |
| 7,339,883 B2 | 3/2008 | Santhoff et al. | |
| 7,342,834 B2 | 3/2008 | Ishibashi | |
| 7,342,896 B2 | 3/2008 | Ayyagari | |
| 7,342,900 B2 | 3/2008 | Xiong et al. | |

(56) References Cited

U.S. PATENT DOCUMENTS

| | | | |
|---|---|---|---|
| 7,352,733 B2 | 4/2008 | Green | |
| 7,366,200 B2 | 4/2008 | Laroia et al. | |
| 7,378,953 B2 | 5/2008 | Coronel et al. | |
| 7,388,845 B2 | 6/2008 | Laroia et al. | |
| 7,388,857 B2* | 6/2008 | Sharma | 370/350 |
| 7,401,224 B2 | 7/2008 | Gantman et al. | |
| 7,424,268 B2 | 9/2008 | Diener et al. | |
| 7,426,396 B2 | 9/2008 | Iwasaki et al. | |
| 7,440,754 B2 | 10/2008 | Bahl et al. | |
| 7,457,646 B2 | 11/2008 | Mahany et al. | |
| 7,477,897 B2 | 1/2009 | Bye | |
| 7,489,651 B2 | 2/2009 | Sugaya et al. | |
| 7,493,149 B1 | 2/2009 | Doyle et al. | |
| 7,499,418 B2 | 3/2009 | Oprescu-Surcobe et al. | |
| 7,502,341 B2 | 3/2009 | Matoba et al. | |
| 7,512,096 B2 | 3/2009 | Kuzminskiy et al. | |
| 7,522,551 B2* | 4/2009 | Giaimo et al. | 370/328 |
| 7,545,771 B2 | 6/2009 | Wentink et al. | |
| 7,548,758 B2 | 6/2009 | Periyalwar et al. | |
| 7,570,627 B2 | 8/2009 | Welborn et al. | |
| 7,570,969 B2 | 8/2009 | Hwang et al. | |
| 7,583,644 B2 | 9/2009 | Morioka et al. | |
| 7,586,881 B2 | 9/2009 | Hansen et al. | |
| 7,590,183 B2 | 9/2009 | Yonge, III et al. | |
| 7,613,426 B2 | 11/2009 | Kuehnel et al. | |
| 7,626,975 B2 | 12/2009 | Colban et al. | |
| 7,653,011 B2 | 1/2010 | Rahman et al. | |
| 7,657,276 B2 | 2/2010 | Sakoda | |
| 7,660,595 B2 | 2/2010 | Ramaswamy et al. | |
| 7,664,055 B2 | 2/2010 | Nelson | |
| 7,664,130 B2 | 2/2010 | Sakoda et al. | |
| 7,720,029 B2 | 5/2010 | Orava et al. | |
| 7,720,172 B2 | 5/2010 | Nakagawa et al. | |
| 7,724,713 B2 | 5/2010 | Del Prado Pavon et al. | |
| 7,729,240 B1 | 6/2010 | Crane et al. | |
| 7,756,521 B2 | 7/2010 | Gerlach et al. | |
| 7,925,010 B2 | 4/2011 | Sannino et al. | |
| 8,498,237 B2 | 7/2013 | Corson et al. | |
| 8,504,099 B2 | 8/2013 | Corson et al. | |
| 8,542,658 B2 | 9/2013 | Laroia et al. | |
| 8,553,644 B2 | 10/2013 | Laroia et al. | |
| 8,554,226 B2 | 10/2013 | Laroia et al. | |
| 2001/0018336 A1* | 8/2001 | Okajima et al. | 455/403 |
| 2001/0055980 A1 | 12/2001 | Sato | |
| 2002/0024935 A1 | 2/2002 | Furukawa et al. | |
| 2002/0075941 A1 | 6/2002 | Souissi et al. | |
| 2002/0077124 A1 | 6/2002 | Hunzinger | |
| 2002/0080739 A1 | 6/2002 | Kuwahara | |
| 2002/0105970 A1* | 8/2002 | Shvodian | 370/468 |
| 2002/0128049 A1 | 9/2002 | Davis | |
| 2002/0131121 A1 | 9/2002 | Jeganathan et al. | |
| 2002/0131386 A1 | 9/2002 | Gwon | |
| 2002/0193945 A1 | 12/2002 | Tan et al. | |
| 2002/0196771 A1 | 12/2002 | Vij et al. | |
| 2002/0196844 A1 | 12/2002 | Rafie et al. | |
| 2003/0002482 A1 | 1/2003 | Kubler et al. | |
| 2003/0007473 A1 | 1/2003 | Strong et al. | |
| 2003/0012188 A1 | 1/2003 | Zelig et al. | |
| 2003/0053437 A1 | 3/2003 | Bahl et al. | |
| 2003/0054818 A1 | 3/2003 | Bahl et al. | |
| 2003/0063655 A1 | 4/2003 | Young | |
| 2003/0069035 A1 | 4/2003 | Shurvinton | |
| 2003/0078031 A1 | 4/2003 | Masuda | |
| 2003/0078037 A1 | 4/2003 | Auckland et al. | |
| 2003/0108016 A1 | 6/2003 | Bonta | |
| 2003/0112901 A1 | 6/2003 | Gupta | |
| 2003/0123425 A1 | 7/2003 | Walton et al. | |
| 2003/0128659 A1 | 7/2003 | Hirsch | |
| 2003/0128690 A1 | 7/2003 | Elliott et al. | |
| 2003/0142631 A1 | 7/2003 | Silvester | |
| 2003/0145064 A1 | 7/2003 | Hsu et al. | |
| 2003/0169697 A1 | 9/2003 | Suzuki et al. | |
| 2003/0174067 A1* | 9/2003 | Soliman | 340/870.02 |
| 2003/0179756 A1 | 9/2003 | Cain | |
| 2003/0181213 A1 | 9/2003 | Sugar et al. | |
| 2003/0210680 A1 | 11/2003 | Rao et al. | |
| 2003/0217266 A1 | 11/2003 | Epp et al. | |
| 2003/0217269 A1 | 11/2003 | Gantman et al. | |
| 2004/0005904 A1 | 1/2004 | Wolf et al. | |
| 2004/0008661 A1 | 1/2004 | Myles | |
| 2004/0009781 A1 | 1/2004 | Andrews et al. | |
| 2004/0028003 A1 | 2/2004 | Diener | |
| 2004/0032536 A1 | 2/2004 | Islam et al. | |
| 2004/0032847 A1 | 2/2004 | Cain | |
| 2004/0047324 A1 | 3/2004 | Diener | |
| 2004/0057400 A1 | 3/2004 | Walsh et al. | |
| 2004/0063458 A1 | 4/2004 | Hori | |
| 2004/0064568 A1 | 4/2004 | Arora | |
| 2004/0067773 A1* | 4/2004 | Rachabathuni et al. | 455/560 |
| 2004/0072558 A1 | 4/2004 | Van Bosch | |
| 2004/0077346 A1 | 4/2004 | Krenik et al. | |
| 2004/0077366 A1 | 4/2004 | Panasik et al. | |
| 2004/0081117 A1 | 4/2004 | Malek et al. | |
| 2004/0082326 A1 | 4/2004 | Shaw et al. | |
| 2004/0082356 A1 | 4/2004 | Walton et al. | |
| 2004/0090924 A1 | 5/2004 | Giaimo | |
| 2004/0095880 A1 | 5/2004 | Laroia et al. | |
| 2004/0095902 A1 | 5/2004 | Laroia et al. | |
| 2004/0095904 A1 | 5/2004 | Laroia et al. | |
| 2004/0106401 A1 | 6/2004 | Ormson | |
| 2004/0109432 A1 | 6/2004 | Laroia et al. | |
| 2004/0114521 A1 | 6/2004 | Sugaya | |
| 2004/0125776 A1 | 7/2004 | Haugli et al. | |
| 2004/0125778 A1 | 7/2004 | Lin et al. | |
| 2004/0127204 A1 | 7/2004 | Belmont | |
| 2004/0127214 A1 | 7/2004 | Reddy | |
| 2004/0127240 A1 | 7/2004 | Li | |
| 2004/0133689 A1 | 7/2004 | Vasisht | |
| 2004/0145604 A1 | 7/2004 | Min | |
| 2004/0147223 A1* | 7/2004 | Cho | 455/41.2 |
| 2004/0152464 A1 | 8/2004 | Sugaya | |
| 2004/0162871 A1 | 8/2004 | Pabla et al. | |
| 2004/0165563 A1 | 8/2004 | Hsu et al. | |
| 2004/0174829 A1 | 9/2004 | Ayyagari | |
| 2004/0176024 A1 | 9/2004 | Hsu et al. | |
| 2004/0176059 A1 | 9/2004 | Hayem et al. | |
| 2004/0190483 A1 | 9/2004 | Shahaf et al. | |
| 2004/0196808 A1 | 10/2004 | Chaskar et al. | |
| 2004/0203762 A1 | 10/2004 | Liu et al. | |
| 2004/0204850 A1 | 10/2004 | MacNeille | |
| 2004/0218562 A1 | 11/2004 | Orava et al. | |
| 2004/0218568 A1 | 11/2004 | Goodall et al. | |
| 2004/0223469 A1 | 11/2004 | Bahl et al. | |
| 2004/0223477 A1 | 11/2004 | Iwasaki et al. | |
| 2004/0240401 A1 | 12/2004 | Willenegger et al. | |
| 2004/0240405 A1 | 12/2004 | Okazaki | |
| 2004/0240476 A1 | 12/2004 | Joshi | |
| 2004/0246983 A1 | 12/2004 | Kaatz | |
| 2004/0249448 A1 | 12/2004 | Gault | |
| 2004/0258006 A1 | 12/2004 | An | |
| 2004/0259529 A1 | 12/2004 | Suzuki | |
| 2004/0259558 A1* | 12/2004 | Skafidas et al. | 455/450 |
| 2005/0009578 A1 | 1/2005 | Liu | |
| 2005/0017843 A1 | 1/2005 | Fernandez | |
| 2005/0025092 A1 | 2/2005 | Morioka | |
| 2005/0037754 A1 | 2/2005 | Liu et al. | |
| 2005/0058102 A1 | 3/2005 | Santhoff et al. | |
| 2005/0058117 A1 | 3/2005 | Morioka et al. | |
| 2005/0058229 A1 | 3/2005 | Alagha | |
| 2005/0060535 A1 | 3/2005 | Bartas | |
| 2005/0063344 A1 | 3/2005 | Winzell | |
| 2005/0063416 A1 | 3/2005 | Shin et al. | |
| 2005/0068934 A1 | 3/2005 | Sakoda | |
| 2005/0075118 A1* | 4/2005 | Lewis et al. | 455/456.5 |
| 2005/0085190 A1 | 4/2005 | Nishikawa | |
| 2005/0085214 A1 | 4/2005 | Laroia | |
| 2005/0088980 A1 | 4/2005 | Olkkonen et al. | |
| 2005/0090266 A1 | 4/2005 | Sheynblat | |
| 2005/0094618 A1 | 5/2005 | Colban et al. | |
| 2005/0105491 A1 | 5/2005 | Chaskar et al. | |
| 2005/0111397 A1 | 5/2005 | Attar et al. | |
| 2005/0117525 A1 | 6/2005 | Poustchi | |
| 2005/0117530 A1 | 6/2005 | Abraham | |
| 2005/0128991 A1 | 6/2005 | Dayanandan et al. | |

(56) References Cited

U.S. PATENT DOCUMENTS

| | | | |
|---|---|---|---|
| 2005/0129221 A1* | 6/2005 | Dickens et al. ......... 379/373.01 |
| 2005/0135295 A1 | 6/2005 | Walton |
| 2005/0143119 A1 | 6/2005 | Chandra et al. |
| 2005/0152280 A1 | 7/2005 | Pollin et al. |
| 2005/0153736 A1 | 7/2005 | Ganton |
| 2005/0157660 A1 | 7/2005 | Mandato et al. |
| 2005/0176371 A1 | 8/2005 | Palin et al. |
| 2005/0177639 A1 | 8/2005 | Reunamaki |
| 2005/0180353 A1 | 8/2005 | Hansen et al. |
| 2005/0185628 A1 | 8/2005 | Watanabe et al. |
| 2005/0185669 A1 | 8/2005 | Welborn et al. |
| 2005/0201308 A1 | 9/2005 | Sekiya et al. |
| 2005/0210157 A1 | 9/2005 | Sakoda |
| 2005/0220201 A1 | 10/2005 | Laroia et al. |
| 2005/0226175 A1 | 10/2005 | Gupta |
| 2005/0226207 A1 | 10/2005 | Sharma |
| 2005/0227692 A1 | 10/2005 | Kawashima et al. |
| 2005/0227698 A1 | 10/2005 | Nonin et al. |
| 2005/0233742 A1 | 10/2005 | Karaoguz et al. |
| 2005/0233746 A1 | 10/2005 | Laroia et al. |
| 2005/0238083 A1 | 10/2005 | Laroia et al. |
| 2005/0239451 A1 | 10/2005 | Periyalwar et al. |
| 2005/0243782 A1 | 11/2005 | Sakoda et al. |
| 2005/0250469 A1 | 11/2005 | Laroia et al. |
| 2005/0254435 A1 | 11/2005 | Moakley et al. |
| 2005/0259607 A1 | 11/2005 | Xiong et al. |
| 2005/0265218 A1 | 12/2005 | Molisch et al. |
| 2005/0265221 A1 | 12/2005 | Batra et al. |
| 2005/0276243 A1 | 12/2005 | Sugaya et al. |
| 2005/0281320 A1 | 12/2005 | Neugebauer |
| 2005/0286477 A1 | 12/2005 | Gupta et al. |
| 2006/0002332 A1 | 1/2006 | Diaz Cervera et al. |
| 2006/0013160 A1 | 1/2006 | Haartsen |
| 2006/0014542 A1 | 1/2006 | Khandekar et al. |
| 2006/0019660 A1 | 1/2006 | Li |
| 2006/0020556 A1 | 1/2006 | Hamnen |
| 2006/0023668 A1 | 2/2006 | Ramaswamy et al. |
| 2006/0023686 A1 | 2/2006 | Jeong et al. |
| 2006/0025151 A1 | 2/2006 | Karaoguz et al. |
| 2006/0031583 A1 | 2/2006 | Fujii et al. |
| 2006/0034315 A1 | 2/2006 | Maekawa et al. |
| 2006/0039332 A1 | 2/2006 | Kotzin |
| 2006/0046728 A1* | 3/2006 | Jung et al. ................ 455/445 |
| 2006/0058059 A1 | 3/2006 | Kim |
| 2006/0058061 A1 | 3/2006 | Nakagawa et al. |
| 2006/0063543 A1* | 3/2006 | Matoba et al. ............. 455/509 |
| 2006/0073847 A1 | 4/2006 | Pirzada et al. |
| 2006/0083199 A1 | 4/2006 | Yang |
| 2006/0087423 A1 | 4/2006 | Coronel et al. |
| 2006/0088010 A1 | 4/2006 | Buchwald et al. |
| 2006/0089099 A1 | 4/2006 | Buchwald et al. |
| 2006/0094456 A1 | 5/2006 | Rittle et al. |
| 2006/0105741 A1 | 5/2006 | Suh et al. |
| 2006/0109814 A1* | 5/2006 | Kuzminskiy et al. ......... 370/329 |
| 2006/0111104 A1 | 5/2006 | Hyslop |
| 2006/0114853 A1 | 6/2006 | Hasty, Jr. et al. |
| 2006/0116113 A1 | 6/2006 | Gass |
| 2006/0116877 A1 | 6/2006 | Pickering et al. |
| 2006/0178131 A1 | 8/2006 | Huotari et al. |
| 2006/0203789 A1 | 9/2006 | Iacono et al. |
| 2006/0203795 A1 | 9/2006 | Welborn et al. |
| 2006/0209878 A1 | 9/2006 | Nelson |
| 2006/0215611 A1 | 9/2006 | Nakagawa et al. |
| 2006/0223511 A1 | 10/2006 | Hagale et al. |
| 2006/0223574 A1* | 10/2006 | Chandra ................ 455/552.1 |
| 2006/0233125 A1* | 10/2006 | Pajukoski et al. ............. 370/320 |
| 2006/0251017 A1 | 11/2006 | Bishop |
| 2006/0251033 A1 | 11/2006 | Oprescu-Surcobe et al. |
| 2006/0253736 A1 | 11/2006 | Rudolf et al. |
| 2006/0280131 A1 | 12/2006 | Rahman et al. |
| 2007/0019717 A1 | 1/2007 | Laroia et al. |
| 2007/0054624 A1 | 3/2007 | Kashiwagi |
| 2007/0064742 A1 | 3/2007 | Shvodian |
| 2007/0066360 A1 | 3/2007 | Sato et al. |
| 2007/0070179 A1 | 3/2007 | Van Rooyen |
| 2007/0086424 A1 | 4/2007 | Calcev et al. |
| 2007/0097922 A1 | 5/2007 | Parekh et al. |
| 2007/0100222 A1 | 5/2007 | Mastrototaro et al. |
| 2007/0104138 A1 | 5/2007 | Rudolf et al. |
| 2007/0111734 A1 | 5/2007 | Beppu et al. |
| 2007/0136459 A1 | 6/2007 | Roche et al. |
| 2007/0142084 A1 | 6/2007 | Van Niekerk et al. |
| 2007/0153729 A1 | 7/2007 | Alapuranen |
| 2007/0160016 A1 | 7/2007 | Jain |
| 2007/0165589 A1 | 7/2007 | Sakoda |
| 2007/0201423 A1 | 8/2007 | Laroia et al. |
| 2007/0206554 A1 | 9/2007 | Laroia et al. |
| 2007/0211677 A1 | 9/2007 | Laroia et al. |
| 2007/0211678 A1 | 9/2007 | Li et al. |
| 2007/0211679 A1 | 9/2007 | Laroia et al. |
| 2007/0211680 A1 | 9/2007 | Laroia et al. |
| 2007/0213046 A1 | 9/2007 | Li et al. |
| 2007/0247365 A1 | 10/2007 | Laroia et al. |
| 2007/0254596 A1 | 11/2007 | Corson et al. |
| 2007/0255960 A1 | 11/2007 | Hon et al. |
| 2007/0270190 A1 | 11/2007 | Hisky et al. |
| 2007/0274275 A1 | 11/2007 | Laroia et al. |
| 2007/0274276 A1 | 11/2007 | Laroia et al. |
| 2007/0286111 A1 | 12/2007 | Corson et al. |
| 2007/0291714 A1 | 12/2007 | Laroia et al. |
| 2007/0291715 A1 | 12/2007 | Laroia et al. |
| 2008/0002647 A1 | 1/2008 | Laroia et al. |
| 2008/0013519 A1 | 1/2008 | Kwon et al. |
| 2008/0031193 A1 | 2/2008 | Laroia et al. |
| 2008/0037487 A1 | 2/2008 | Li et al. |
| 2008/0039066 A1 | 2/2008 | Laroia et al. |
| 2008/0043656 A1 | 2/2008 | Yoon et al. |
| 2008/0069072 A1 | 3/2008 | Callaway et al. |
| 2008/0075033 A1 | 3/2008 | Shattil |
| 2008/0112334 A1 | 5/2008 | Laroia et al. |
| 2008/0123600 A1 | 5/2008 | Fodor |
| 2008/0212651 A1 | 9/2008 | Santhoff et al. |
| 2008/0212771 A1 | 9/2008 | Hauser |
| 2008/0318612 A1 | 12/2008 | Axnas et al. |
| 2009/0017858 A1 | 1/2009 | Kwon et al. |
| 2009/0040996 A1 | 2/2009 | Laroia et al. |
| 2009/0059841 A1 | 3/2009 | Laroia et al. |
| 2009/0092075 A1 | 4/2009 | Corson et al. |
| 2009/0190558 A1 | 7/2009 | Strutt et al. |
| 2009/0282253 A1 | 11/2009 | Rose et al. |
| 2009/0296669 A1 | 12/2009 | Uchiyama et al. |
| 2010/0128652 A1 | 5/2010 | Lee et al. |
| 2013/0343283 A1 | 12/2013 | Laroia et al. |

FOREIGN PATENT DOCUMENTS

| | | |
|---|---|---|
| CN | 1371583 A | 9/2002 |
| CN | 1397117 A | 2/2003 |
| CN | 1411237 | 4/2003 |
| CN | 1578314 A | 2/2005 |
| CN | 1596005 A | 3/2005 |
| CN | 1650594 A | 8/2005 |
| CN | 1663156 | 8/2005 |
| CN | 1689345 A | 10/2005 |
| CN | 1909386 A | 2/2007 |
| EP | 0469659 A1 | 2/1992 |
| EP | 0776134 A2 | 5/1997 |
| EP | 0848567 A1 | 6/1998 |
| EP | 0969602 A1 | 1/2000 |
| EP | 1089586 A1 | 4/2001 |
| EP | 1119137 A1 | 7/2001 |
| EP | 1241838 A2 | 9/2002 |
| EP | 1326386 A1 | 7/2003 |
| EP | 1408651 A1 | 4/2004 |
| EP | 1469659 A1 | 10/2004 |
| EP | 1496668 | 1/2005 |
| EP | 1549094 A1 | 6/2005 |
| EP | 1562333 | 8/2005 |
| EP | 1566944 | 8/2005 |
| EP | 1592176 | 11/2005 |
| EP | 1670183 A1 | 6/2006 |
| EP | 1895714 A1 | 3/2008 |
| EP | 2312885 A1 | 4/2011 |
| GB | 232251 A1 | 3/1926 |

(56) References Cited

FOREIGN PATENT DOCUMENTS

| | | |
|---|---|---|
| GB | 2375014 A1 | 10/2002 |
| GB | 2410653 A | 8/2005 |
| JP | 7023465 | 1/1995 |
| JP | 07143567 | 6/1995 |
| JP | 8307934 A | 11/1996 |
| JP | 9107583 | 4/1997 |
| JP | 10013324 | 1/1998 |
| JP | 11289583 A | 10/1999 |
| JP | 11355291 A | 12/1999 |
| JP | 2001069060 A | 3/2001 |
| JP | 2001069557 A | 3/2001 |
| JP | 2001118191 A | 4/2001 |
| JP | 2002502164 A | 1/2002 |
| JP | 2002112347 | 4/2002 |
| JP | 2002208891 A | 7/2002 |
| JP | 2002223470 | 8/2002 |
| JP | 2002232337 A | 8/2002 |
| JP | 2002325281 A | 11/2002 |
| JP | 2002344458 A | 11/2002 |
| JP | 2003503920 | 1/2003 |
| JP | 2003143644 A | 5/2003 |
| JP | 2003158525 A | 5/2003 |
| JP | 2003249939 A | 9/2003 |
| JP | 2003258703 A | 9/2003 |
| JP | 2003348636 A | 12/2003 |
| JP | 2004032462 A | 1/2004 |
| JP | 2004053510 A | 2/2004 |
| JP | 2004128785 A | 4/2004 |
| JP | 2004146883 A | 5/2004 |
| JP | 2004147015 A | 5/2004 |
| JP | 2004180297 A | 6/2004 |
| JP | 2004242187 A | 8/2004 |
| JP | 2004247820 A | 9/2004 |
| JP | 2004254254 A | 9/2004 |
| JP | 2004260258 A | 9/2004 |
| JP | 2004260748 A | 9/2004 |
| JP | 2004336351 A | 11/2004 |
| JP | 2004533762 A | 11/2004 |
| JP | 2004349777 A | 12/2004 |
| JP | 2004350168 A | 12/2004 |
| JP | 2004363877 A | 12/2004 |
| JP | 2005033808 A | 2/2005 |
| JP | 2005045368 | 2/2005 |
| JP | 2005065101 A | 3/2005 |
| JP | 2005072910 A | 3/2005 |
| JP | 2005086234 A | 3/2005 |
| JP | 2005086408 | 3/2005 |
| JP | 2005124121 A | 5/2005 |
| JP | 2005136529 A | 5/2005 |
| JP | 2005151525 A | 6/2005 |
| JP | 2005167502 A | 6/2005 |
| JP | 2005210703 A | 8/2005 |
| JP | 2005223722 A | 8/2005 |
| JP | 2005223767 A | 8/2005 |
| JP | 2005523616 A | 8/2005 |
| JP | 2005236819 A | 9/2005 |
| JP | 2005244698 A | 9/2005 |
| JP | 2005252645 A | 9/2005 |
| JP | 2005253038 A | 9/2005 |
| JP | 2005253047 A | 9/2005 |
| JP | 2005277599 A | 10/2005 |
| JP | 2005277815 A | 10/2005 |
| JP | 2005295400 | 10/2005 |
| JP | 2005328231 | 11/2005 |
| JP | 2005348203 | 12/2005 |
| JP | 2005354326 A | 12/2005 |
| JP | 2005537762 T | 12/2005 |
| JP | 2006005792 A | 1/2006 |
| JP | 2006501777 A | 1/2006 |
| JP | 2007509531 A | 4/2007 |
| JP | 2007525891 A | 9/2007 |
| JP | 2007533256 | 11/2007 |
| JP | 2008507219 T | 3/2008 |
| JP | 2008228128 A | 9/2008 |
| JP | 4927869 | 2/2012 |
| KR | 960012088 B1 | 9/1996 |
| KR | 100225765 B1 | 10/1999 |
| KR | 20000035806 A | 6/2000 |
| KR | 2000076038 | 12/2000 |
| KR | 10362135 | 11/2002 |
| KR | 20030024435 A | 3/2003 |
| TW | 540210 | 7/2003 |
| TW | 545006 B | 8/2003 |
| TW | 1230525 | 4/2005 |
| TW | 1239782 | 9/2005 |
| TW | M286515 | 1/2006 |
| TW | I250742 | 3/2006 |
| TW | M292848 | 6/2006 |
| WO | WO9701256 | 1/1997 |
| WO | WO9749258 | 12/1997 |
| WO | WO9808321 | 2/1998 |
| WO | 9839938 A2 | 9/1998 |
| WO | WO0074429 | 12/2000 |
| WO | WO0101717 A1 | 1/2001 |
| WO | 0192992 A2 | 12/2001 |
| WO | 0223758 | 3/2002 |
| WO | WO0249387 A1 | 6/2002 |
| WO | 02078271 A1 | 10/2002 |
| WO | 02082742 A1 | 10/2002 |
| WO | 02091623 A1 | 11/2002 |
| WO | WO03001742 | 1/2003 |
| WO | 03030954 | 5/2003 |
| WO | WO-03039064 A1 | 5/2003 |
| WO | WO2003039054 | 5/2003 |
| WO | WO03090037 A2 | 10/2003 |
| WO | 2004012464 A2 | 2/2004 |
| WO | 2004019529 A2 | 3/2004 |
| WO | WO2004023241 A2 | 3/2004 |
| WO | 2004032536 A2 | 4/2004 |
| WO | WO2004047348 A1 | 6/2004 |
| WO | WO2004066646 A1 | 8/2004 |
| WO | WO2004071022 A1 | 8/2004 |
| WO | 2004080103 A1 | 9/2004 |
| WO | WO2004077920 A2 | 9/2004 |
| WO | WO2005013529 | 2/2005 |
| WO | 2005022846 A1 | 3/2005 |
| WO | WO2005020517 | 3/2005 |
| WO | WO2005027556 A1 | 3/2005 |
| WO | 2005038606 A2 | 4/2005 |
| WO | 2005039105 A1 | 4/2005 |
| WO | WO05039128 | 4/2005 |
| WO | WO2005034433 A1 | 4/2005 |
| WO | 2005053346 A1 | 6/2005 |
| WO | 2005053347 A1 | 6/2005 |
| WO | WO2005053253 | 6/2005 |
| WO | WO2005055527 | 6/2005 |
| WO | WO2005060209 A1 | 6/2005 |
| WO | WO 2005062552 A1 | 7/2005 |
| WO | 2005071998 A1 | 8/2005 |
| WO | 2005076543 A1 | 8/2005 |
| WO | WO2005079012 A1 | 8/2005 |
| WO | 2005109657 A1 | 11/2005 |
| WO | WO2005109916 | 11/2005 |
| WO | WO 2005109917 A1 | 11/2005 |
| WO | 2005117463 A1 | 12/2005 |
| WO | WO2005119478 | 12/2005 |
| WO | 2006000617 A1 | 1/2006 |
| WO | 2006007946 A1 | 1/2006 |
| WO | WO-2006006138 A1 | 1/2006 |
| WO | WO06057815 | 6/2006 |
| WO | WO 2006138122 A2 | 12/2006 |
| WO | 2007038896 A2 | 4/2007 |
| WO | 2007082281 | 7/2007 |
| WO | WO2007082247 | 7/2007 |
| WO | WO2008014336 A2 | 1/2008 |
| WO | 2008020162 A2 | 2/2008 |
| WO | 2008072346 A1 | 6/2008 |

OTHER PUBLICATIONS

Written Opinion—PCT/US2007/060360, International Search Authority—European Patent Office—Sep. 14, 2007.

(56) References Cited

OTHER PUBLICATIONS

International Preliminary Report on Patentability—PCT/US2007/060360, International Search Authority—The International Bureau of WIPO—Geneva, Switzerland—Jul. 15, 2008.
Yanchao Zhang, Wei Liu, Wenjing Lou, Yuguang Fang; Anonymous Handshakes in Mobile Ad Hoc Networks; MILCOM 2004—2004 IEEE Military Communications Conference; pp. 1193-1199; XP-002432989.
Hung-Yu Wei, Richard D. Gitlin; Incentive Scheduling for Cooperative Relay in WWAN/WLAN Two-Hop-Relay Network; IEEE Communications Society/ WCNC 2005; pp. 1696-1701.
Jose Costa-Requena, Raimo Kantola, Nicklas Beijar; Incentive.
Carlos Cordeiro, Kiran Challapali, Dagnachew Birru, Sai Shankar; IEEE 802.22: The First Worldwide Wireless Standard Based on Cognitive Radios; 2005 IEEE ; pp. 328-337 : XP-10855130A.
Cabric D et al: "Implementation Issues in Spectrum Sensing for Cognitive Radios" Signals, Systems and Computers, 2004. Conference Record of the Thirty-Eighth ASILOMAR Conference on Pacific Grove, CA Nov. 7-10, 2004 pp. 772-776 XP-010781056.
Ylianttila et al: "Geolocation Information and Inter-Technology Handoff" ICC 2000. 2000 IEEE International Conference on Communications. Conference Record. New Orleans, LA, Jun. 18-22, 2000, pp. 1573-1577,—XP-001208676.
Dagres et al., "Flexible Radio: A General Framework With PHY-Layer Algorithm-Design Insights" EUROCON 2005, Nov. 22-24 2005 pp. 120-123, XP-10916036.
Brandes S et al: "Reduction of Out-Of-Band Radiation in OFDM Based Overlay Systems" New Frontiers in Dynamic Spectrum Access Networks, 2005. DYSPAN 2005. 2005 First IEEE International Symposium on Baltimore, MD, USA Nov. 8-11, 2005, Piscataway, NJ, USA,IEEE, (Nov. 8, 2005), pp. 662-665, XP010855171 ISBN: 1-4244-0013-9.
Costa-Requena J et al: "Incentive Problem for Ad Hoc Networks Scalability" Autonomic and Autonomous Systems and International Conference on Networking and Services, 2005. ICAS-ICNS 2005. Joint International Conference on Papette, Tahiti Oct. 23-28, 2005, Piscataway, NJ, USA, IEEE, Oct. 23, 2005, pp. 70-70, XP010864809.
European Search Report—EP10160880, Search Authority—Munich Patent Office, Jun. 28, 2010.
European Search Report—EP10166886, Search Authority—Munich Patent Office, Aug. 2, 2010.
European Search Report—EP10176878—Search Authority—Munich—Apr. 11, 2011.
European Search Report—EP10178266—Search Authority—Munich—Apr. 5, 2011.
European Search Report—EP10187769 ,Search Authority—Munich Patent Office, Dec. 2, 2010.
European Search Report—EP10189181, Search Authority—Munich Patent Office, Mar. 9, 2011.
European Search Report—EP10189182—Search Authority—Munich—Mar. 10, 2011.
European Search Report—EP10191747—Search Authority—Munich—Mar. 18, 2011.
European Search Report—EP11150402—Search Authority—Munich—Mar. 14, 2011.
European Search Report—EP11157024—Search Authority—Munich—May 23, 2011.
European Search Report—EP11150397—Search Authority—Munich—Mar. 15, 2011.
IEEE Computer Society, Part 15. 4: Wireless Medium Access Control (MAC) and Physical Layer (PHY) Specifications for Low-Rate Wireless Personal Area Network (LRWPANs), IEEE Std 802. 15.4 (TM)—2003, The United States of America, IEEE, Oct. 1, 2003, pp. 13 to 21, 45 to 47, 111 to 120, and 147 to 153.
IEEE Computer Society, Part 15.3: Wireless Medium Access Control (MAC) and Physical Layer (PHY) Specifications for High Rate Wireless Personal Area Networks (WPANs), IEEE Std 802. 15. 3 (TM)—2003, The United States of America, IEEE, Sep. 29, 2003, pp. 164 and 165.

IEEE, Part 15.3: Wireless Medium Access Control (MAC) and Physical Layer (PHY) Specifications for High Rate Wireless Personal Area Networks (WPANs), 802.15.3, The United States of America, IEEE, Sep. 29, 2003, IEEE Std 802. 15. Mar. 2003, pp. 8 to 16, 108 to 111,116 to 117, 170 to 171,and 204 to206.
International Preliminary Reoprt on Patentability—PCT/US2007/060353, International Search Authority—The International Bureau of WIPO—Geneva, Switzerland—Jul. 15, 2008.
International Preliminary Report on Patentability—PCT/US2007/000755, International Search Authority—The International Bureau of WIPO—Geneva, Switzerland—Jul. 15, 2008.
International Preliminary Report on Patentability—PCT/US2007/060362, International Search Authority—The International Bureau of WIPO—Geneva, Switzerland—Jul. 15, 2008.
International Preliminary Report on Patentability—PCT/US2007/060406, International Search Authority—The International Bureau of WIPO—Geneva, Switzerland—Jul. 15, 2008.
International Preliminary Report on Patentability—PCT/US2007/060412, International Search Authority—The International Bureau of WIPO—Geneva, Switzerland—Jul. 15, 2008.
International Preliminary Report on Patentability—PCT/US2007/000752, International Search Authority—The International Bureau of WIPO—Geneva, Switzerland—Jul. 15, 2008.
International Preliminary Report on Patentability—PCT/US2007/060347, International Search Authority—The International Bureau of WIPO—Geneva, Switzerland—Jul. 15, 2008.
International Preliminary Report on Patentability—PCT/US2007/060348, International Search Authority—The International Bureau of WIPO—Geneva, Switzerland—Jul. 15, 2008.
International Preliminary Report on Patentability—PCT/US2007/060349, International Search Authority—The International Bureau of WIPO—Geneva, Switzerland—Jul. 15, 2008.
International Preliminary Report on Patentability—PCT/US2007/060351, International Search Authority—The International Bureau of WIPO—Geneva, Switzerland—Jul. 15, 2008.
International Preliminary Report on Patentability—PCT/US2007/060354, International Search Authority—The International Buearu of WIPO—Geneva, Switzerland—Jul. 15, 2008.
International Preliminary Report on Patentability—PCT/US2007/060355, International Search Authority—The International Buearu of WIPO—Geneva, Switzerland—Jul. 15, 2008.
International Preliminary Report on Patentability—PCT/US2007/060356, International Search Authority—The International Bureau of WIPO—Geneva, Switzerland—Jul. 15, 2008.
International Preliminary Report on Patentability—PCT/US2007/060357, International Search Authority—The International Bureau of WIPO—Geneva, Switzerland—Jul. 15, 2008.
International Preliminary Report on Patentability—PCT/US2007/060359, International Search Authority—The International Bureau of WIPO—Geneva, Switzerland—Jul. 15, 2008.
International Preliminary Report on Patentability—PCT/US2007/060415, International Search Authority—The International Bureau of WIPO—Geneva, Switzerland—Jul. 15, 2008.
International Preliminary Report on Patentability—PCT/US2007/060358, International Search Authority—The International Bureau of WIPO—Geneva,Switzerland—Jul. 15, 2008.
International Search Report—PCT/US2007/000752, International Search Authority—European Patent Office—Jun. 11, 2007.
International Search Report—PCT/US2007/000755, International Search Authority—European Patent Office—Jun. 29, 2007.
International Search Report—PCT/US2007/060347, International Search Authority—European Patent Office—Jun. 6, 2007.
International Search Report—PCT/US2007/060348, International Search Authority—European Patent Office—May 29, 2007.
International Search Report—PCT/US2007/060349, International Search Authority—European Patent Office—Sep. 5, 2007.
International Search Report—PCT/US2007/060350, International Search Authority—European Patent Office—Apr. 25, 2007.
International Search Report—PCT/US2007/060351, International Search Authority—European Patent Office—May 25, 2007.
International Search Report—PCT/US2007/060352, International Search Authority—European Patent Office—Apr. 26, 2007.

(56) References Cited

OTHER PUBLICATIONS

International Search Repor—PCT/US2007/060353, International Search Authority—European Patent Office—May 22, 2007.
International Search Report—PCT/US2007/060354, International Search Authority—European Patent Office—May 16, 2007.
International Search Report—PCT/US2007/060355, International Search Authority—European Patent Office—Jul. 23, 2007.
International Search Report—PCT/US2007/060356, International Search Authority—European Patent Office—May 24, 2007.
International Search Report—PCT/US2007/060358, International Search Authority—European Patent Office—Jun. 4, 2007.
International Search Report—PCT/US2007/060362, International Search Authority—European Patent Office—Jun. 4, 2007.
International Search Report—PCT/US2007/060406, International Search Authority—European Patent Office—Jun. 13, 2007.
International Search Report—PCT/US2007/060412, International Search Authority—European Patent Office—May 31, 2007.
International Search Report—PCT/US2007/060415, International Search Authority—European Patent Office—Jun. 5, 2007.
International Search Report and Written Opinion—PCT/US07/060361, International Search Authority—European Patent Office—Jun. 4, 2007.
International Search Report and Written Opinion—PCT/US2007/000751, International Search Authority—European Patent Office—Jul. 4, 2007.
International Search Report and Written Opinion—PCT/US2009/043041, International Search Authority—European Patent Office—Aug. 6, 2009.
International Search Report and Written Opinion—PCT/US2009/058649, ISA/EPO—May 17, 2011.
International Search Report—PCT/US2007/060357, International Search Authority—European Patent Office—Jun. 12, 2007.
International Search Report—PCT/US2007/060359, International Search Authority—European Patent Office—Jun. 5, 2007.
Juels, A. et al.: "Client Puzzles: A Cryptographic Countermeasure Against Connection Depletion Attacks" Proceedings of NDSS. Networks and Distributed Security Systems, XX, XX, Feb. 3, 1999, pp. 151-165, XP002340691 paragraph [0001] paragraph [0003].
Taiwan Search Report—096101138—TIPO—Jan. 4, 2011.
Taiwan Search Report—TW096101103—TIPO—Jan. 28, 2011.
Taiwan Search Report—TW096101104—TIPO—Jan. 27, 2011.
Taiwan Search Report—TW096101113—TIPO—May 23, 2011.
Taiwan Search Report—TW096101114—TIPO—Mar. 28, 2011.
Taiwan Search Report—TW096101119—TIPO—Mar. 10, 2011.
Taiwan Search Report—TW096101120—TIPO—Apr. 25, 2011.
Taiwan Search Report—TW096101125—TIPO—Nov. 5, 2010.
Taiwan Search Report—TW096101130—TIPO—Jan. 14, 2011.
Taiwan Search Report—TW096101132—TIPO—Jan. 31, 2011.
Taiwanese Search report-096101136—TIPO—Jul. 16, 2010.
Taiwanese Search report-096101180—TIPO—Sep. 3, 2010.
Taiwanese Search Report-096101174, TIPO—Mar. 18, 2010.
Taiwanese Search Report-096101176, TIPO—Mar. 7, 2010.
Translation of Office Action in Japan application 2008-550500 corresponding to U.S. Appl. No. 11/621,984, citing NIELS_HOVEN_et_al_pp._250_255_year_2005, JP2005354326, JP2005151525, JP2001069060, JP2002232337 and JP2005537762 dated Mar. 29, 2011.
Translation of Office Action in Japan application 2008-550506 corresponding to U.S. Appl. No. 11/621,966, citing JP9107583, JP10013324, JP2003249939 and JP11355291 dated Mar. 29, 2011.
Translation of Office Action in Japan application 2008-550523 corresponding to U.S. Appl. No. 11/621,990, citing JP2004349777, JP2004336351, JP2005065101, JP2004260748, JP2004242187 and JP20042542542 dated Mar. 29, 2011.
Translation of Office Action in Korean Application 2008-7019606 corresponding to U.S. Appl. No. 11/621,967, citing GB2375014 and US20050025092 dated Feb. 23, 2011.

Wada, Y. et al., "Consideration of OFDM Cellular System Using Single Band", IEICE Year 2002 Communication Society Convention Lecture Papers 1, Aug. 20, 2002, p. 355, B-5-58.
Waters, B., et al., "New Client Puzzle Outsourcing Techniques for DoS Resistance" CCS'04, Oct. 29, 2004, pp. 1-11, XP002538930 Washington, DC, USA abstract paragraph [01.2].
Written Opinion—PCT/US07/060357, International Search Authority, European Patent Office, Jun. 12, 2007.
Written Opinion—PCT/US2007/000755, International Search Authority—European Patent Office—Jun. 29, 2007.
Written Opinion—PCT/US2007/060347, International Search Authority—European Patent Office—Jun. 6, 2007.
Written Opinion—PCT/US2007/060348, International Search Authority—European Patent Office—May 29, 2007.
Written Opinion—PCT/US2007/060349, International Search Authority—European Patent Office—Sep. 5, 2007.
Written Opinion—PCT/US2007/060350, International Search Authority—European Patent Office—Apr. 25, 2007.
Written Opinion—PCT/US2007/060351, International Search Authority—European Patent Office—May 25, 2007.
Written Opinion—PCT/US2007/060352, International Search Authority—European Patent Office—Apr. 26, 2007.
Written Opinion—PCT/US2007/060353, International Search Authority—European Patent Office—May 22, 2007.
Written Opinion—PCT/US2007/060354, International Search Authority—European Patent Office—May 16, 2007.
Written Opinion—PCT/US2007/060355, International Search Authority—European Patent Office—Jul. 23, 2007.
Written Opinion—PCT/US2007/060356, International Search Authority—European Patent Office—May 24, 2007.
Written Opinion—PCT/US2007/060358, International Search Authority—European Patent Office—Jun. 4, 2007.
Written Opinion—PCT/US2007/060359, International Search Authority—European Patent Office—Jun. 5, 2007.
Written Opinion—PCT/US2007/060362, International Search Authority—European Patent Office—Jun. 4, 2007.
Written Opinion—PCT/US2007/060406, International Search Authority—European Patent Office—Jun. 13, 2007.
Written Opinion—PCT/US2007/060412, International Search Authority—European Patent Office—May 31, 2007.
Written Opinion—PCT/US2007/060415, International Search Authority—European Patent Office—Jun. 5, 2007.
Written Opinion—PCT/US2007/000752, International Search Authority—European Patent Office—Jun. 11, 2007.
Yanchao Zhang, Wei Liu, Wenjing Lou, Yuguang Fang; Anonymous Handshakes in Mobile Ad Hoc Networks; Milcom 2004-2004 IEEE Military Communications Conference; pp. 1193-1199; XP-002432989.
Hung-Yu Wei, Richard D. Gitlin; Incentive Scheduling for Cooperative Relay in WWAN/WLAN Two-Hop-Relay Network; IEEE Communications Society/WCNC 2005; pp. 1696-1701.
Niels Hoven, Anant Sahai; Power Scaling for Cognitive Radio; 2005 International Conference on Wireless Networks, Communications and Mobile Computing; pp. 250-255.
Carlos Cordeiro, Kiran Challapali, Dagnachew Birru, Sai Shankar; IEEE 802.22: The First Worldwide Wireless Standard Based on Cognitive Radios; 2005 IEEE ; pp. 328-337: XP-10855130A.
Cabric D et al: "Implementation Issues in Spectrum Sensing for Cognitive Radios" Signals, Systems and Computers, 2004. Conference Record of the Thirty- Eighth Asilomar Conference on Pacific Grove, CA Nov. 7-10, 2004 pp. 772-776 XP-010781056.
Ylianttila et al: " Geolocation Information and Inter-Technology Handoff" ICC 2000. 2000 IEEE International Conference on Communications. Conference Record. New Orleans, LA, June 18-22, 2000, pp. 1573-1577, -XP-001208676.
Spyridon Panagiotakis et al: "Intelligent Service Mediation for Supporting Advanced Location and Mobility—Aware Service Provisioning in Reconfigurable Mobile Networks" IEEE Personal Communications, Oct. 2002 pp. 28-38, XP-011093874.

(56) References Cited

OTHER PUBLICATIONS

Dagres et al., "Flexible Radio: A General Framework With Phy-Layer Algorithm-Design Insights" Eurocon 2005, Nov. 22-24, 2005 pp. 120-123, XP-10916036.

Van De Beek, "ML Estimation of Time and Frequency Offset in OFDM Systems" IEEE Transactions on Signal Processing, vol. 45 No. 7 Jul. 1997, XP-11057861.

Brandes S et al: "Reduction of Out-Of-Band Radiation in OFDM Based Overlay Systems" New Frontiers in Dynamic Spectrum Access Networks, 2005. Dyspan 2005. 2005 First IEEE International Symposium on Baltimore, MD, USA Nov. 8-11, 2005, Piscataway, NJ, USA, IEEE, (Nov. 8, 2005), pp. 662-665, XP010855171 ISBN: 1-4244-0013-9.

Hlavacs H., et al., "Enhancing ZRTP by using Computational Puzzles", Journal of Universal Computer Science, vol. 14 No. 5, Feb. 28, 2008, pp. 693-716.

Kim S., et al., "Reliable transfer on wireless sensor networks", 2004. IEEE SECON 2004—IEEE, pp. 449-459.

Feng W et al., "Design and implementation of network puzzles", INFCOM 2005 Proceedings IEEE 24th Annual Joint Conference of the IEEE Computer and Communications Societies Mar. 2005, pp. 2372-2382, vol. 4.

* cited by examiner

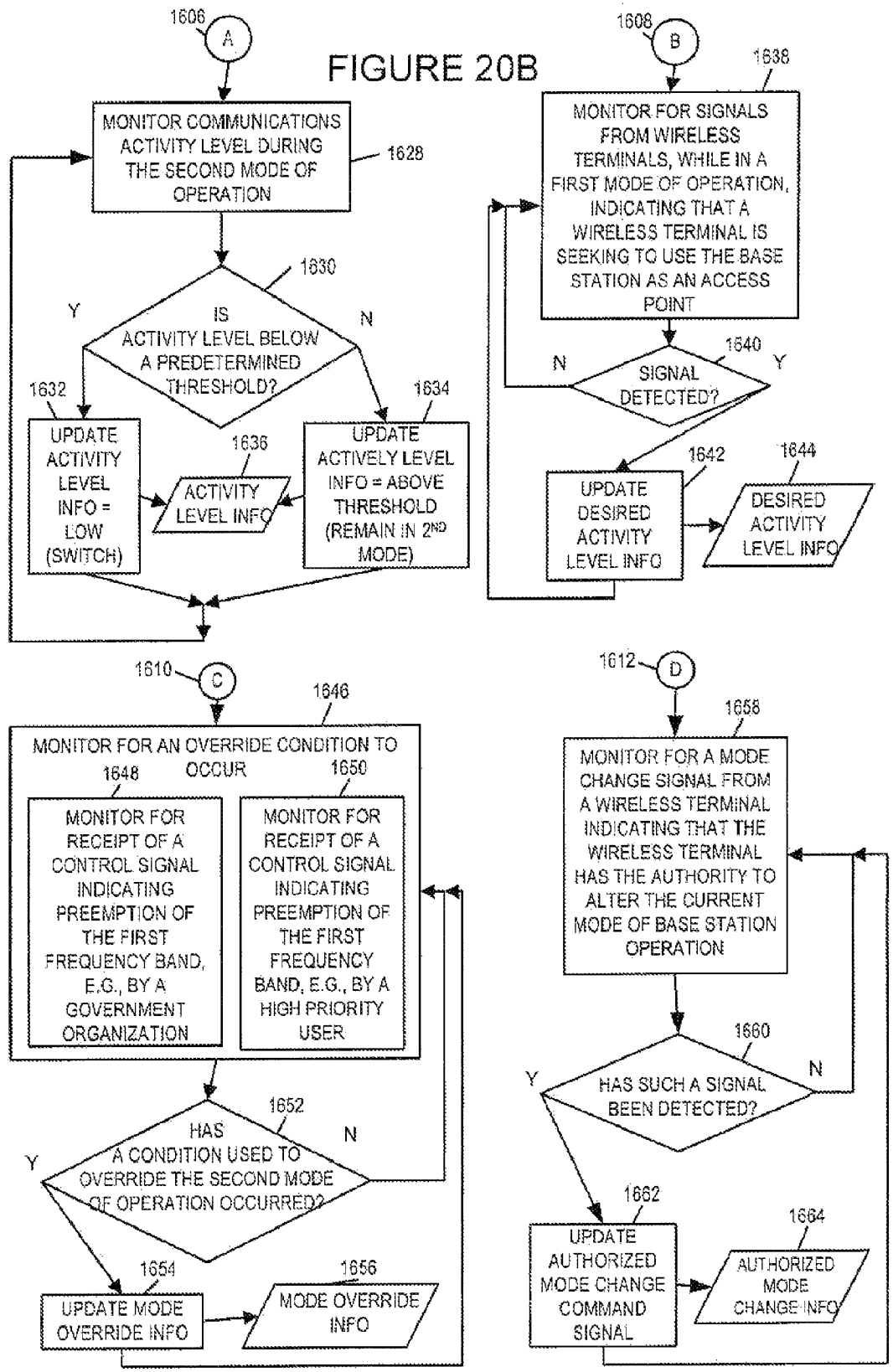

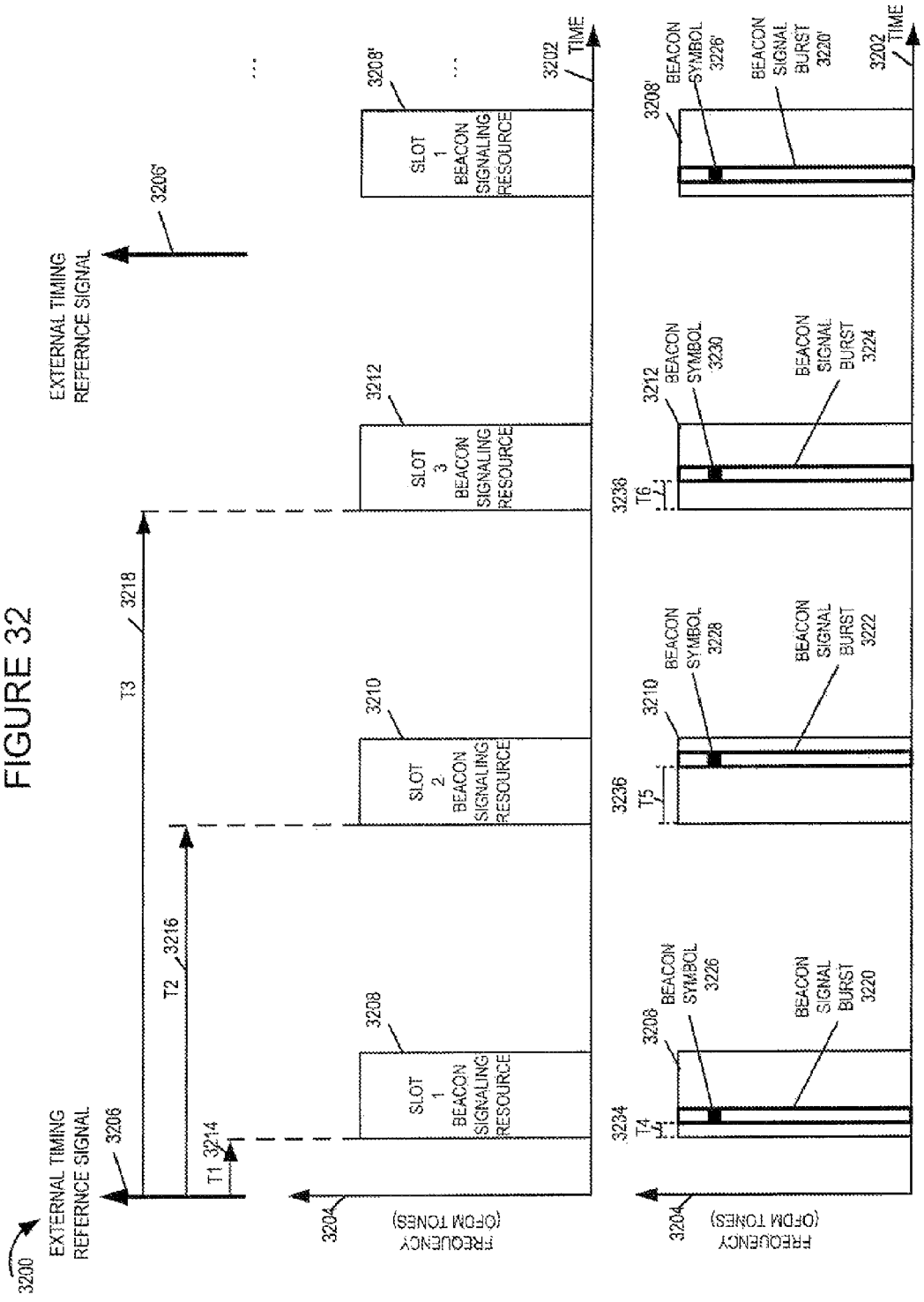

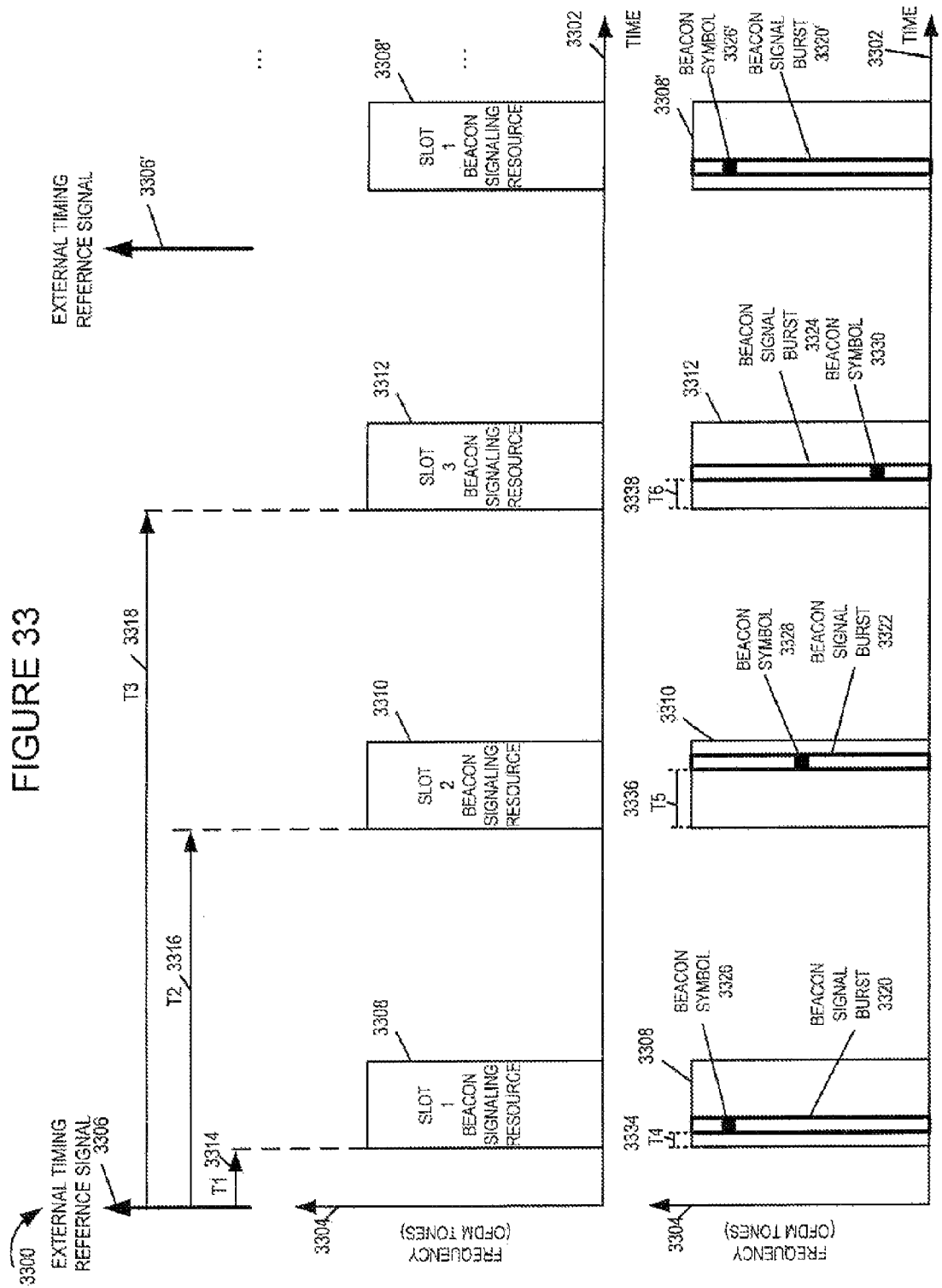

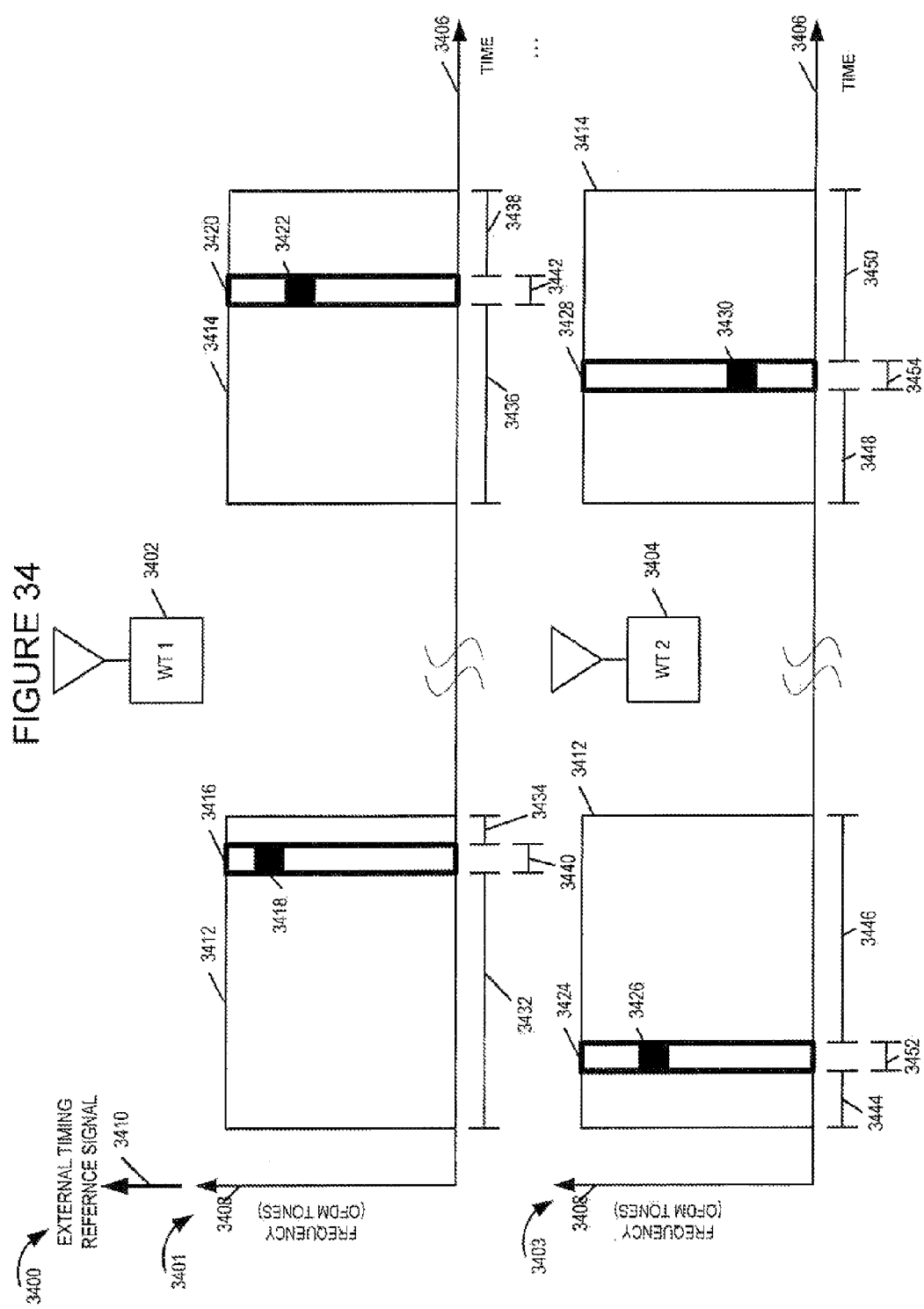

WIRELESS COMMUNICATION METHODS AND APPARATUS USING BEACON SIGNALS

RELATED APPLICATIONS

The present application claims the benefit of U.S. Provisional Patent Application Ser. No. 60/758,011 filed Jan. 11, 2006, filed "METHODS AND APPARATUS FOR USING BEACON SIGNALS FOR IDENTIFICATION, SYNCHRONIZATION OR ACQUISITION IN AN AD HOC WIRELESS NETWORK", U.S. Provisional Patent Application Ser. No. 60/758,010 filed Jan. 11, 2006, titled "METHODS AND APPARATUS FOR FACILITATING IDENTIFICATION, SYNCHRONIZATION OR ACQUISITION USING BEACON SIGNALS", U.S. Provisional Patent Application Ser. No. 60/758,012 filed on Jan. 11, 2006, titled "METHOD AND APPARATUS FOR USING BEACON SIGNALS IN A COGNITIVE RADIO NETWORK", U.S. Provisional Patent Application Ser. No. 60/863,304 filed on Oct. 27, 2006, U.S. Provision Patent Application Ser. No. 60/845,052 filed on Sep. 15, 2006, and U.S. Provisional Patent Application Ser. No. 60/845,051 filed on Sep. 15, 2006, each of which is hereby incorporated by reference and all of which are assigned to the assignee hereof.

FIELD

The present invention is directed to method and apparatus for signaling in wireless communication and, more particularly, to methods and apparatus for using signals for identification, synchronization and/or acquisition.

BACKGROUND

In a wireless network, e.g., an ad hoc network, in which a network infrastructure does not exits, a terminal has to combat certain challenges in order to set up a communication link with another peer terminal. One challenge is to make the terminals in the vicinity to be synchronized to a common timing and/or frequency reference. A common timing and/or frequency reference is crucial for the terminals to establish communication links. For example, in an ad hoc network, when a terminal just powers up or moves into a new area, the terminal may have to first find out whether another terminal is present in the vicinity before any communication between the two terminals can start. The general solution is to let the terminal transmit and/or receive signals according to certain protocol. However, if the terminals do not have a common timing notation, it is possible that when a first terminal is transmitting a signal and a second terminal is not in the receiving mode, the transmitted signal does not help the second terminal to detect the presence of the first terminal.

In view of the above discussion, it should be appreciated that there is a need for new and improved ways for identification, acquisition, and/or synchronization, especially in a wireless system in which the network infrastructure may not be available.

SUMMARY

Various embodiments are directed to base station methods and apparatus for supporting peer to peer communications. In one exemplary embodiment a base station, which is serving as a network access point for wireless terminals, also transmits a beacon signal conveying information about a peer to peer frequency band. In some such embodiments, the beacon signal conveying information about a peer to peer frequency band is transmitted into the same band being used by the base station for its access node based communications. An exemplary method of operating a base station, comprises: transmitting a beacon signal, said beacon signal including at least one beacon signal burst, said beacon signal conveying information about a peer to peer frequency band, and receiving data from a plurality of wireless terminals using said base station as an access node for communication through said access node. An exemplary base station includes: a beacon signal generation module for generating a beacon signal, said beacon signal including at least one beacon signal burst, said beacon signal burst conveying information about a peer to peer frequency band; a transmitter for transmitting the generated beacon signal, and a receiver for receiving signals including user data signals from a plurality of wireless terminals using said base station as an access node for communication through said access node.

Some embodiments are directed to a beacon signal transmission device supporting peer to peer communications and methods of operating a beacon signal transmission device supporting peer to peer communications. One exemplary beacon signal transmission apparatus includes: a beacon signal transmitter for transmitting a sequence of beacon signal bursts each beacon signal burst including at least one beacon symbol, said beacon transmission apparatus being a free standing device not including any transmitter used to transmit data to an individual user device. One exemplary method of transmitting beacon signals comprises: operating a beacon signal transmitter to transmit a sequence of beacon signal bursts each beacon signal burst including at least one beacon symbol, wherein said beacon signal transmission apparatus does not include any transmitter used to transmit data to an individual user device.

While various embodiments have bee discussed in the summary above, it should be appreciated that not necessarily all embodiments include the same features and some of the features described above not necessary but can be desirable in some embodiments. Numerous additional features, embodiments and benefits are discussed in the detailed description which follows.

BRIEF DESCRIPTION OF THE DRAWINGS

FIG. 32 is a drawing illustrating exemplary beacon burst time position hopping in accordance with various embodiments.

FIG. 33 is a drawing illustrating exemplary beacon burst time position hopping and beacon symbol tone hopping in accordance with various embodiments.

FIG. 34 is a drawing illustrating exemplary coordinated timing in a peer to peer communications band in accordance with various embodiments.

DETAILED DESCRIPTION

Figure 1:
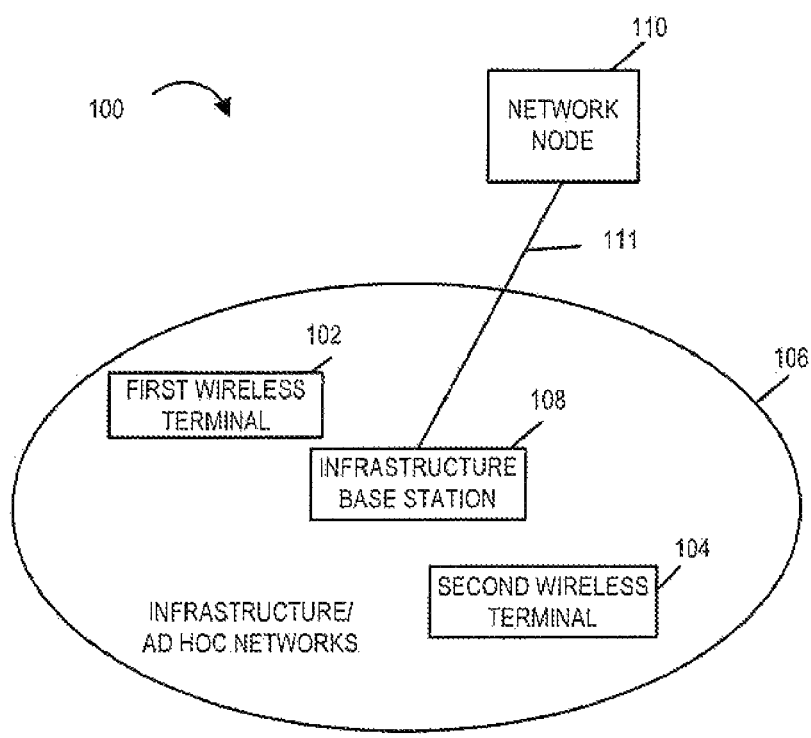
FIG. 1 illustrates an exemplary communications system supporting both access node based communications and peer to peer communications implemented in accordance with various embodiments.

FIG. 1 illustrates an exemplary communications system 100 supporting both access node based communications and peer to peer communications implemented in accordance with various embodiments. An infrastructure base station 108 is coupled with a big network, e.g., the Internet, through a network node 110 via a wired link 111. The base station 108 provides services to the wireless terminals, such as a first wireless terminal 102 and a second wireless terminal 104, in the geographic area 106 via a wireless spectrum band. The wireless spectrum band is called the infrastructure band.

Figure 2:
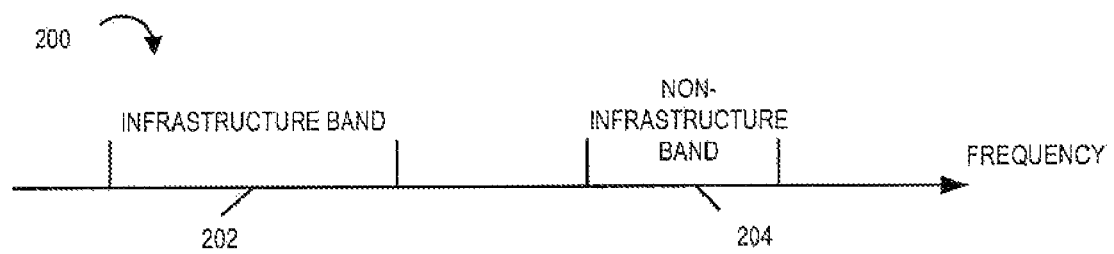
FIG. 2 illustrates two exemplary spectrum bands available to be used in a geographic area.

In addition to the infrastructure band, a different spectrum band, referred to as non-infrastructure band may also be, and sometimes is, available to be used by the wireless terminals in the same geographic area. Thus wireless terminals (102, 104) can participated in an ad hoc peer to peer communication session using non-infrastructure band. FIG. 2 includes drawing 200 which illustrates the notion of the infrastructure band 202 and the non-infrastructure band 204. The two bands are in some embodiments non-overlapping. In a typical embodiment, the infrastructure band includes a pair of FDD (frequency division duplex) spectrum bands or an unpaired TDD (time division duplex) spectrum band. The non-infrastructure band includes an unpaired spectrum and can be used for ad hoc peer-to-peer communication. In some embodiments, the non-infrastructure band is also used for TDD. In some embodiments, the same infrastructure base station, which provides the service to the infrastructure band, may also provide service in the non-infrastructure band.

In an exemplary embodiment, the infrastructure base station transmits a beacon signal in the infrastructure band. The beacon signal is a special signal that occupies a small fraction of the total minimum transmission units in the available spectrum. In some embodiments, a beacon signal includes a sequence of one or more beacon signal bursts, each beacon signal burst including at least one beacon symbol. In some embodiments, the beacon symbols corresponding to a beacon signal occupy a small fraction, e.g., in some embodiments no more than 0.1%, of the total minimum transmission units in the available spectrum air link resource. A minimum transmission unit is the minimum unit of air link resource to use for communication. In some exemplary frequency division multiplexing systems, e.g., some OFDM systems, a minimum transmission unit is a single tone over a symbol transmission period, sometimes referred to as a tone-symbol. In addition, the average transmission power of the beacon symbols of the beacon signal is much higher, e.g., at least 10 dBs or at least 16 dB higher, than the average transmission power of data and control signals per minimum transmission unit when the terminal transmitter is an ordinary data session.

In addition, the infrastructure base station, in some embodiments, uses a broadcast channel, including the beacon signal, to send the system information including the frequency (e.g., carrier) location of the non-infrastructure spectrum band and/or the type of service provided in the band, e.g., TDD (time division duplex) or ad hoc networking.

Figure 3:
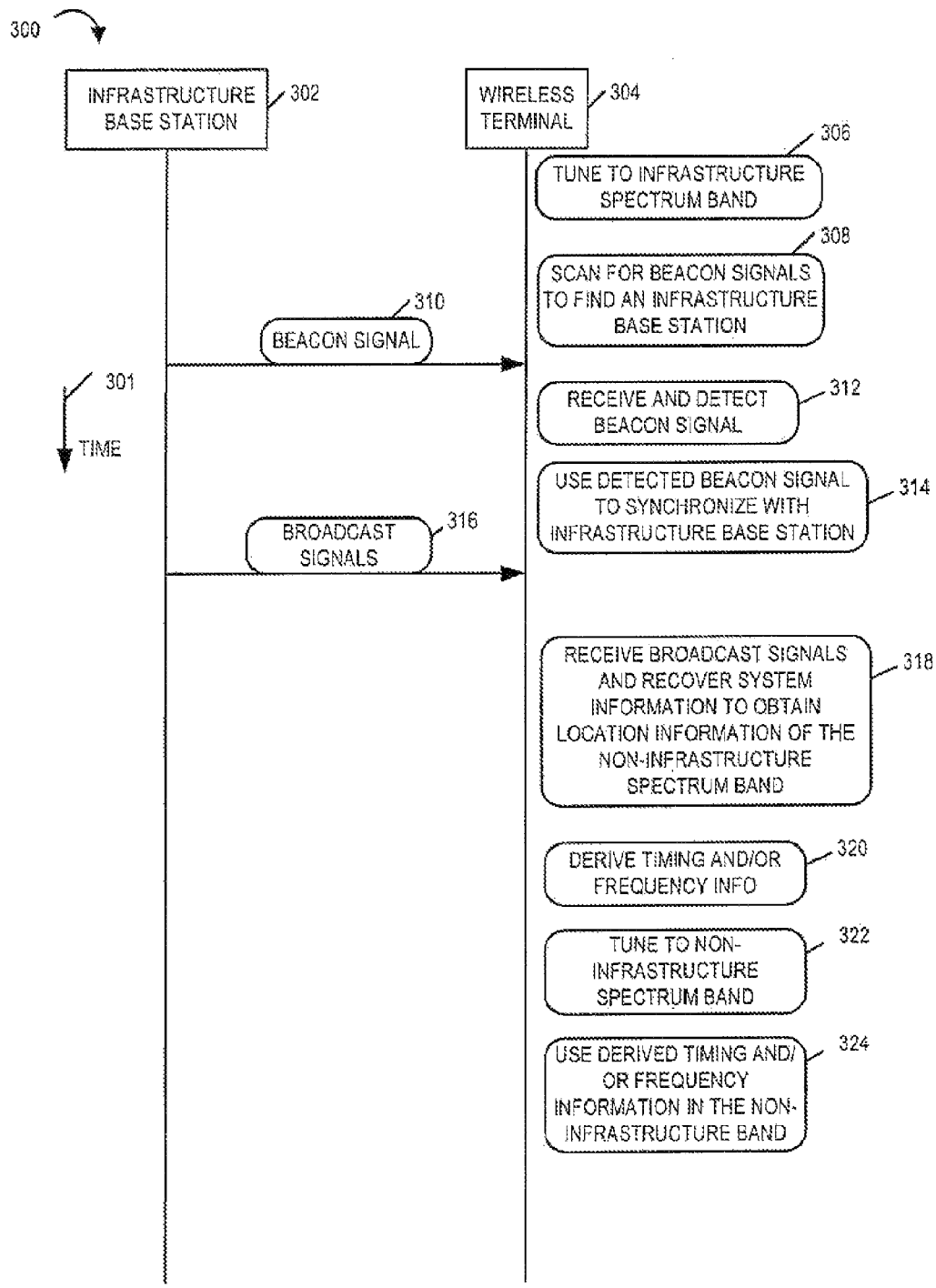
FIG. 3 illustrates a ladder diagram of an exemplary method of obtaining and utilizing spectrum information implemented in accordance with various embodiments.

FIG. 3 illustrates an exemplary ladder diagram 300 of an exemplary method of obtaining and utilizing spectrum information implemented by a wireless terminal in accordance with various embodiments. Drawing 300 includes time axis 301, infrastructure base station 302 and wireless terminal 304.

The wireless terminal 304 knows the frequency location of the infrastructure spectrum band. The wireless terminal 304 first tunes to the infrastructure spectrum band (306) and searches for the beacon signal (308) to find the availability of the infrastructure base station. The infrastructure base station 302 transmits beacon signal 310 which is received and detected (312) by wireless terminal 304. Once the wireless terminal 304 detects the beacon signal (310), the wireless terminal 304 synchronizes (314) itself with the infrastructure base station 302. The infrastructure base station 302 transmits broadcast signals 316, in addition to beacon signals 310. In some embodiments, wireless terminal 304 further receives the broadcast signals 316 and recovers system information from a broadcast channel to obtain the frequency location information of the non-infrastructure spectrum band (318). The wireless terminal 304, in various embodiments, derives timing and/or frequency information from at least one of the broadcast channels and/or the beacon signal (320). The wireless terminal 304 then tunes to the frequency location of the non-infrastructure band to obtain the TDD and/or ad hoc service (322). The wireless terminal 304 uses the timing and/or frequency information derived in step 320 when the terminal 304 obtains the service in the non-infrastructure band (324).

Unlike the infrastructure band, the non-infrastructure band may not, and sometimes does not, have a natural source from which each of the wireless terminals can derive synchronization information. When each of the wireless terminals use the timing and/or frequency information derived from a common source, i.e., the infrastructure base station in the infrastructure spectrum band, the wireless terminals now have a common timing and/or frequency reference. Advantageously this enables synchronization of the terminals in the non-infrastructure band. To elaborate, drawing 400 of FIG. 4 illustrates an example of utilizing timing synchronization information obtained from infrastructure signaling in an associated non-infrastructure band.

The horizontal axis 401 represents time. The infrastructure base station transmits the beacon signal 402 in the infrastructure band. The beacon signal 402 includes a sequence of beacon signal bursts, 404, 406, 408, and so on. Suppose that two wireless terminals derive the timing information from the beacon signal 402, and then time to the non-infrastructure band, which is used for peer-to-peer ad hoc network.

Either of the two wireless terminals has to be aware of the presence of the other before they can set up a peer-to-peer communication session. In one embodiment, either wireless terminal transmits or receives a user beacon signal burst in the non-infrastructure band in a time interval, which is a function of the timing of the beacon signal bursts sent by the infrastructure base station.

Figure 4:
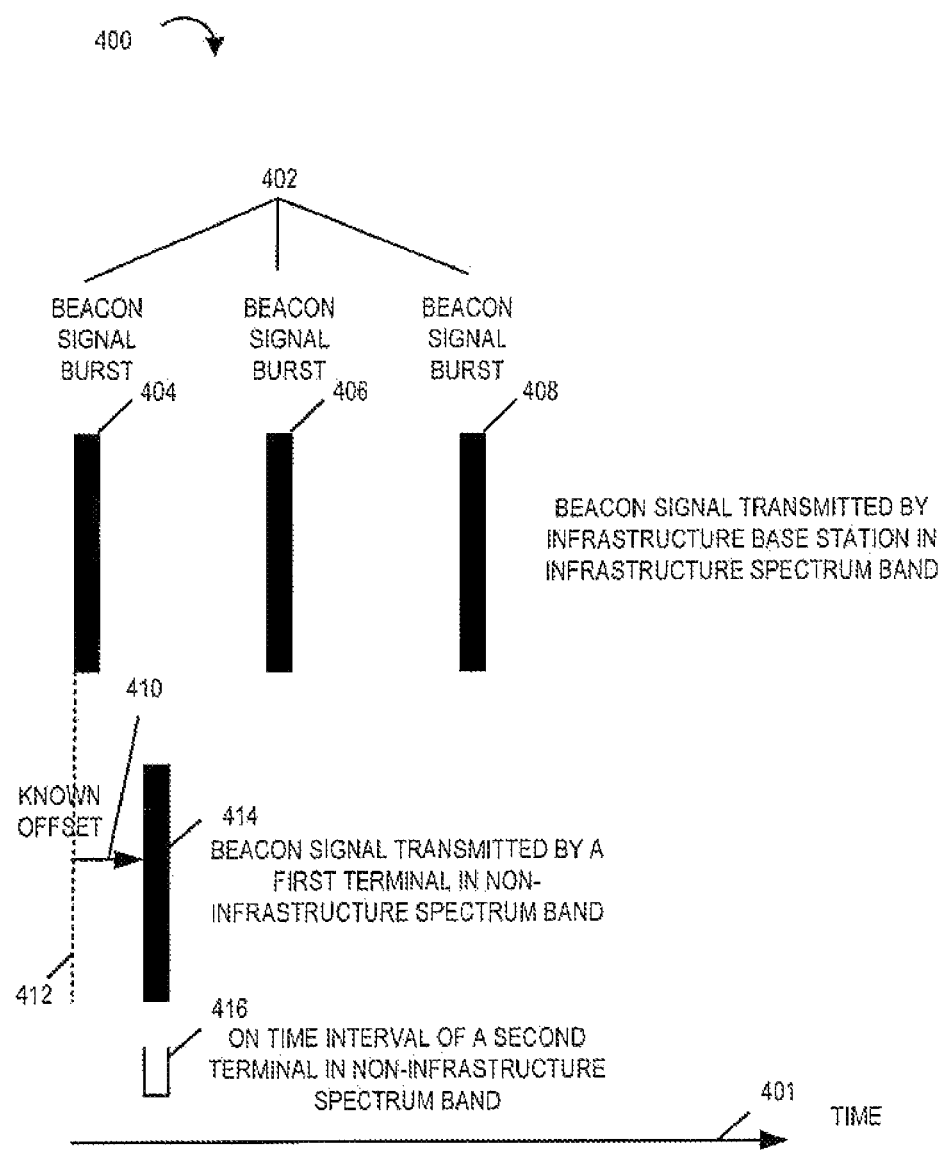
FIG. 4 illustrates an example of utilizing timing synchronization information implemented in accordance with various embodiments.

For example, in FIG. 4, the time interval starts from a time instance that has known time offset 410 from the beginning 412 of a beacon signal burst sent by the infrastructure base station. Either wireless terminal in some embodiments randomly chooses whether to transmit or receive. In the exemplary scenario shown in FIG. 4, the first wireless terminal chooses to transmit, as indicated by exemplary user beacon signal burst 414 transmitted into the non-infrastructure spectrum band, while the second wireless terminal chooses to receive. The second wireless terminal controls its receiver on time interval for beacon monitoring in the non-infrastructure spectrum band such as to include internal 416 corresponding to the first wireless terminal's beacon transmission, and the second wireless terminal detects the user beacon signal sent by the first wireless terminal. The second wireless terminal may, and sometimes does, then start to establish a communication link with the first wireless terminal. However, if both wireless terminals choose to transmit or to receive, then they may not find each other in this time interval. The wireless terminals can probabilistically find each other in subsequent time intervals.

Note that in the absence of the common timing reference, the wireless terminals may have to be in the listening mode in a much longer time interval in order to detect a user beacon signal burst. The common timing reference thus helps the wireless terminals to find each other much more rapidly and in a more power efficient manner.

In another embodiment, the base station additionally transmits the beacon signal in the second spectrum band, so that if the wireless terminal directly tunes to the second spectrum band, the wireless terminal can derive the desired common timing and/or frequency reference from the beacon signal.

Figure 5:
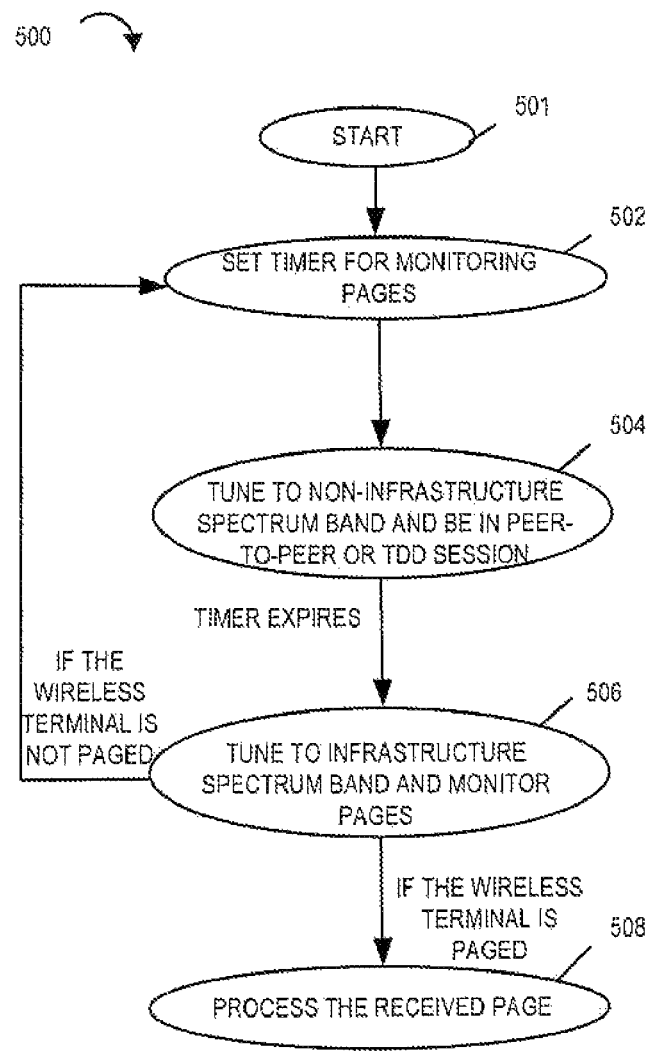
FIG. 5 illustrates an exemplary diagram of receiving paging and being in a peer-to-peer or TDD session implemented in accordance with various embodiments.

FIG. 5 illustrates an exemplary state diagram 500 of receiving paging and being in a peer-to-peer or TDD session implemented in accordance with various embodiments. Operation starts in step 501, where the wireless terminal is powered on and initialized and then proceeds to step 502.

A wireless terminal and the network paging agent, e.g., a server on the network side, have an agreement on when a page for the wireless terminal, if any, will be sent to the wireless terminal via the infrastructure base station. The wireless terminal sets a timer to monitor potential incoming pages (502). In a typical paging system, the wireless terminal may go to a power saving mode until the timer expires. In accordance with a novel feature of various exemplary embodiments, the wireless terminal tunes to the non-infrastructure spectrum band and obtains service (504), e.g., TDD or peer-to-peer communication service. When the timer expires, the wireless terminal tunes to the infrastructure spectrum band and monitors a paging channel (506). If the terminal is not pages, the wireless terminal may set the timer again for the next page monitoring time (502). Otherwise, the wireless terminal is being pages, needs to process the received page, and processes the received page (508).

In some embodiments, there is a common time interval during which each of the wireless terminals or a large subset of the wireless terminals using the non-infrastructure spectrum band suspend the sessions in the non-infrastructure spectrum band and check pages in the infrastructure spectrum band. Advantageously, this synchronized suspension of non-infrastructure sessions helps reduce the wastage of resource in the non-infrastructure band.

Figure 6:
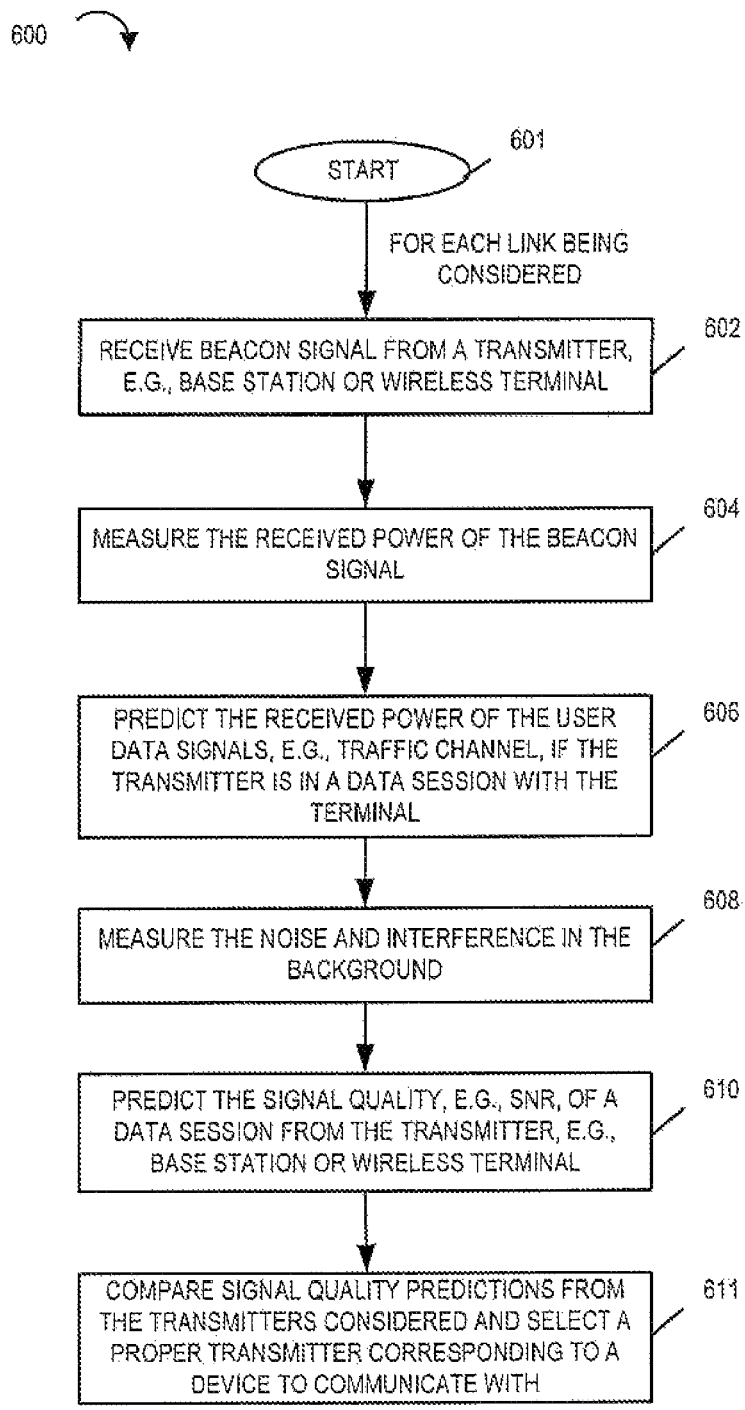
FIG. 6 illustrates a flowchart of an exemplary method of operating a wireless terminal to determine data rates corresponding to potential links with alternative nodes, e.g., a base station and a peer wireless terminal, and selecting a node to communicate with in accordance with various embodiments.

FIG. 6 illustrates a flowchart 600 of an exemplary method of operating a wireless terminal to determine data rates corresponding to potential links with alternative nodes, e.g., a base station and a peer wireless terminal, and selecting a node to communicate with in accordance with various embodiments.

A base station transmits a beacon signal. In some embodiments, in the non-infrastructure band, the infrastructure base station transmits a beacon signal, and a wireless terminal also transmits a user beacon signal. Thus, in such an embodiment, a wireless terminal can have its receiver tuned to the non-infrastructure band and receive base station beacon signals and wireless terminal user beacon signals. Different beacon signals, in some embodiments, differentiate from each other by using different beacon tone hopping sequences and/or different timing of beacon bursts. A transmitter, e.g., the base station or the wireless terminal, in some embodiments is also used to transmit data/control channels. In accordance with various embodiments, the transmission power of the beacon signal and/or that of the data/control channels are such that from the received beacon signal or signals, a receiver can predict the signal quality of the data/control channels, and/or compare the signal quality from multiple transmitters.

In some embodiments, the transmission power of the base station beacon signal is the same for each base station. In some embodiments, the transmission power of the user beacon signal is the same for each of the wireless terminals transmitting user beacon signals. In some embodiments, the transmission power of base station and user beacons are the same. In some embodiments, the data/control channels are sent at a transmission power, which is a function of the transmission power of the beacon signal. For example, the per minimum transmission unit transmission power of the data channel, at a given coding and modulation rate, is a fixed dB amount, e.g., 10 dBs or 16 dBs, below the transmission power of the beacon signal.

With regard to FIG. 6, operation of the exemplary method starts in step 601, where the wireless terminal is powered on and initialized and proceeds to step 602 for each link being considered. In step 602 the wireless terminal receives a beacon signal from a transmitter, e.g., an infrastructure base station transmitter or a wireless terminal transmitter, and then, in step 604 the wireless terminal measures the received power. Operation proceeds from step 604 to step 606. In step 606, the wireless terminal then predicts the received power of user data signals, e.g., a data/control traffic channel, assuming that the wireless terminal is receiving the channel from the transmitter, using the known power relationship between the traffic channel and the beacon signal. In step 608, the wireless terminal further measures the background noise and interference. Then, in step 610, the wireless terminal predicts the signal quality, e.g., signal-to-noise ratio (SNR) of a data session if the wireless terminal is set up a session with the device, e.g., base station or wireless terminal, corresponding to the transmitter, and sees whether the signal quality and thus the data rate of the data session are sufficient. In some cases, the wireless terminal may, and sometimes does, receive beacon signals from multiple transmitters. In step 611, the wireless terminal compares the signal quality from the transmitters considered and selects a proper one with which to communicate, thus selecting the base station or wireless terminal corresponding to the selected transmitters.

Figure 7:
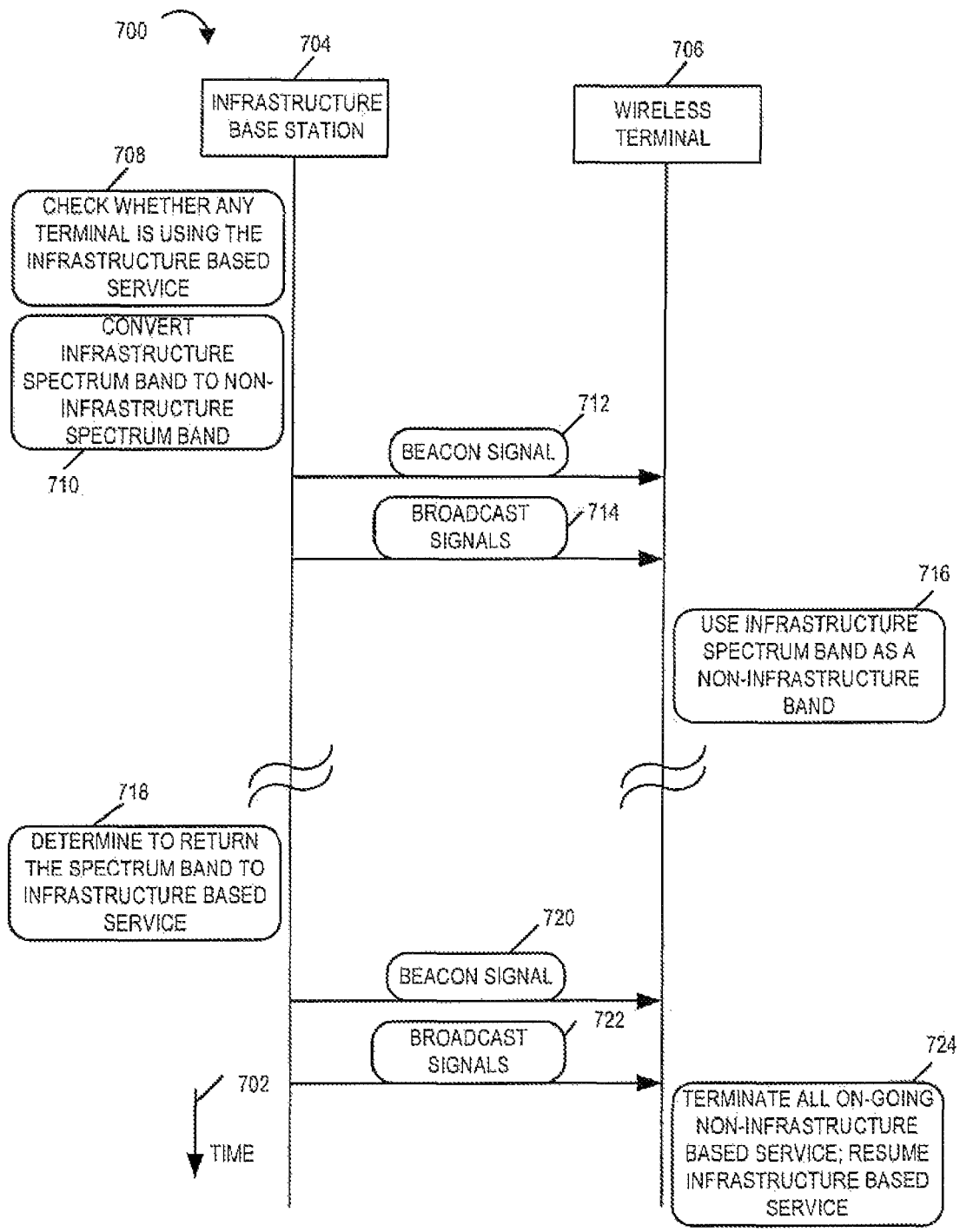
FIG. 7 illustrates a ladder diagram of an exemplary method of using beacon and/or broadcast channels to temporarily convert infrastructure spectrum band for non-infrastructure based implemented in accordance with various embodiments.

FIG. 7 illustrates a ladder diagram 700 of an exemplary method of using beacon and/or broadcast channels to temporarily convert infrastructure spectrum band for non-infrastructure bases service implemented in accordance with various embodiments. Unlike some of the other embodiments presented, this exemplary embodiment has an infrastructure band but does not need a fixed non-infrastructure band.

The vertical axis 702 represents time. The infrastructure base station 704 checks (708) whether there is any wireless terminal using the normal service provided by the infrastructure base station, such as normal FDD or TDD service. The normal service is referred to as infrastructure based service. If the answer is not, then the infrastructure base station can convert (710) the infrastructure spectrum band to become a non-infrastructure band, which can be used by non-infrastructure based service, such as peer-to-peer communication service. To do so, the base station sends at least one of a beacon signal (712) and a non-beacon broadcast signal (714) to indicate that the infrastructure band has been converted to non-infrastructure band. Upon the reception of that signal, the wireless terminals, e.g., wireless terminal 706, in the area can start to use non-infrastructure service in the band (716).

At a later time, the infrastructure base station 704 may decide (718) to return the spectrum band to the infrastructure based service. The infrastructure base station in some embodiments does so because of at least one of the following reasons: 1) the infrastructure base station senses that some wireless terminals may need the infrastructure based service; 2) some timer has expired, in which case the timer is used to control the time duration of the infrastructure spectrum band being used as a non-infrastructure band. To do so, the base station 704 sends at least one of a beacon signal (720) and a non-beacon broadcast signal (722) to indicate that the infrastructure band has returned to the infrastructure based service. Upon the reception of that signal, the wireless terminals in the area, e.g., wireless terminal 706, can cease to use non-infrastructure service in the band (724). For example, if a wireless terminal has an on-going peer-to-peer communication session, the wireless terminal shall stop or suspend the session.

Figure 8:
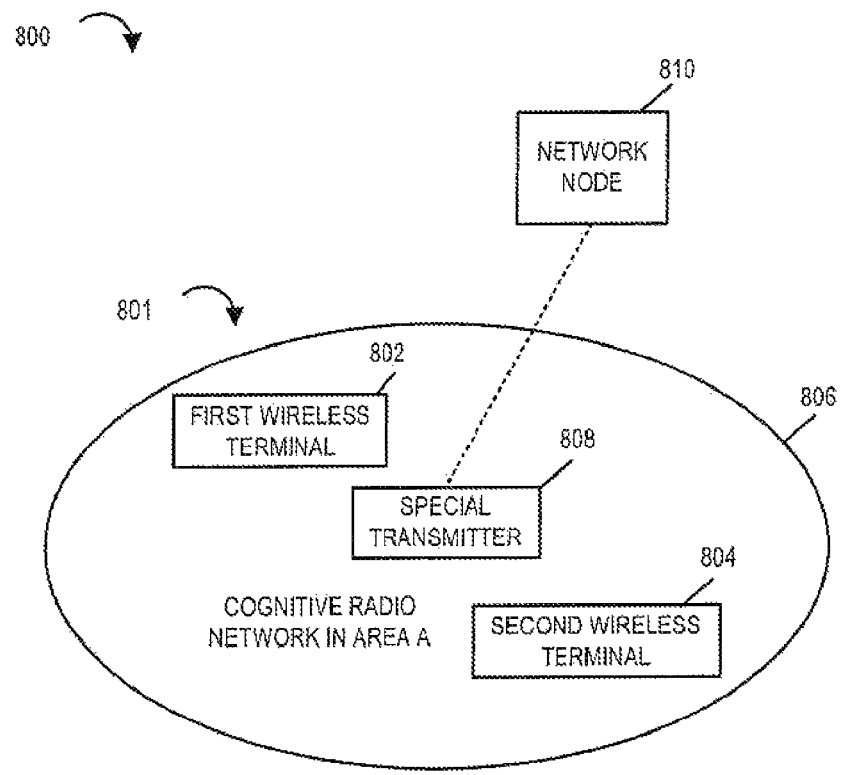
FIG. 8 illustrates two exemplary ad hoc networks in two geographic areas, implemented in accordance with various embodiments.
Figure 8:
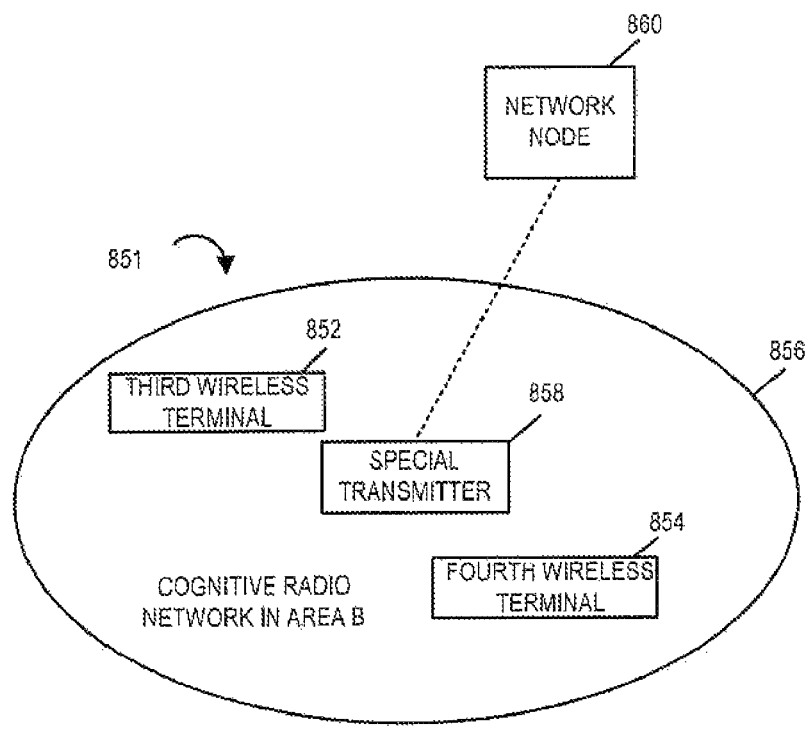

FIG. 8 illustrates in drawing 800 two exemplary ad hoc networks (801, 851) in two geographic areas (806, 856), respectively, implemented in accordance with various embodiments.

The ad hoc network 801 in geographic area A 806 includes a number of terminals, such as a first wireless terminal 802 and a second wireless terminal 804, and a special transmitter 808, which transmits a system beacon signal in accordance with the exemplary embodiment. The wireless terminals, in some embodiments, use the system beacon signal as a system reference signal. The special transmitter in some embodiments is coupled to a big network, e.g., the Internet, through a network node 810, e.g., via a wired link. The special transmitter 808, in some embodiments, is also used to have peer-to-peer sessions with a wireless terminal. Alternatively, in some embodiments the transmitter may be, and sometimes is a standalone unit.

The ad hoc network 851 in geographic area B 856 includes a number of terminals, such as a third wireless terminal 852 and a fourth wireless terminal 854, and a special transmitter 858, which transmits a system beacon signal in accordance with the exemplary embodiment. The special transmitter in some embodiments is coupled to a big network, e.g., the Internet, through a network node 860, e.g., via a wired link.

Figure 9:
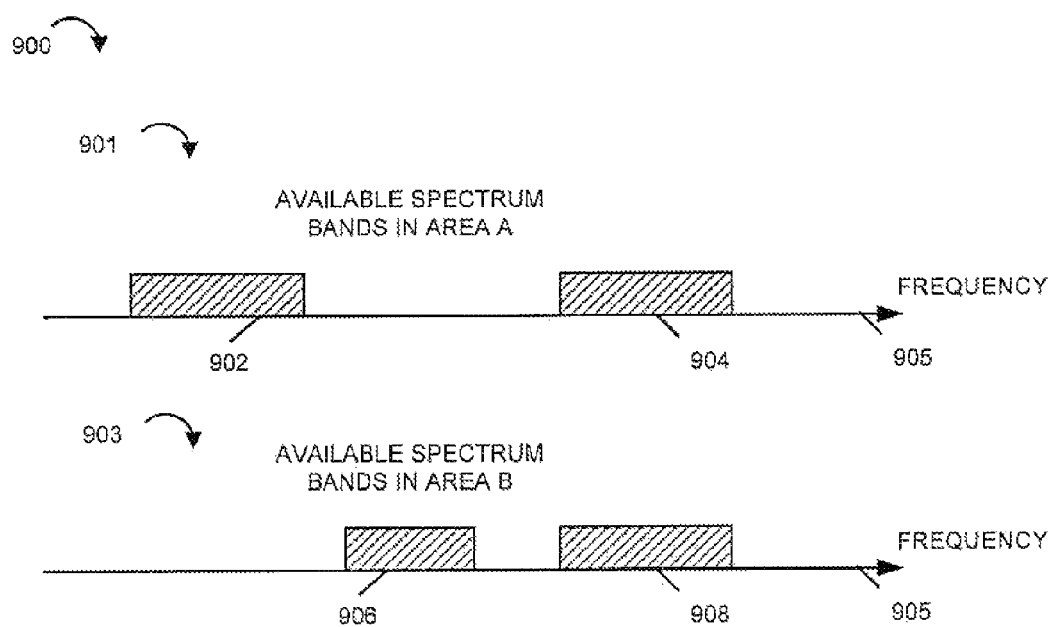
FIG. 9 illustrates exemplary spectrum bands available to be used in two different geographic areas.

In this exemplary embodiment, the spectrum availability is a function of the environment. Here, infrastructure spectrum bands may not exist. For example, drawing 900 of FIG. 9 shows exemplary spectrum bands available in geographic area A 806 and in geographic area B 856. Those spectrum bands are non-infrastructure.

The horizontal axis 905 represents frequency. The upper portion 901 of the FIG. 9 shows that there are two spectrum bands, 902 and 904, available for use in the ad hoc network 801 in geographic area A 806. The lower portion 903 of FIG. 9 shows that there are two spectrum bands, 906 and 908, available for use in the ad hoc network 851 in geographic area B 856. In the exemplary scenario shown in FIG. 9, the spectrum bands 904 and 908 are identical. In other words, part of the spectrum bands available in area A and area B (905 and 908) are the same, while the rest (902 and 906) are different.

One reason that a different set of spectrum bands are available in a different area is that a spectrum band may have been allocated to other services in some geographic area but can be made available in another area. When a wireless terminal moves into area A or area B, the wireless terminal needs to first figure out which spectrum bands are available for use, so that the wireless terminal does not cause interference or disruption to existing services.

To help the wireless terminal to figure out the spectrum availability in a given area, in accordance with a feature of some embodiments, a special transmitter transmits a system beacon signal in each of the spectrum bands that are available for use in the vicinity of the geographical area in which the special transmitter is located. The beacon signal is a special signal that occupies a small fraction of the total minimum transmission units in the available spectrum. In some embodiments, the beacon symbols of the beacon signal occupy no more than 0.1% of the total minimum transmission units in the available spectrum air link resource. A minimum transmission unit is the minimum unit of resource to use for communication. In some exemplary frequency division multiplexing systems, e.g., some OFDM systems, a minimum transmission unit is a single tone over a symbol transmission period, sometimes referred to as an OFDM tone-symbol. In addition, the transmission power of the beacon symbols per minimum transmission unit is much higher, e.g., in some embodiments at least 10 dB higher, than the average transmission power of data and control signals per minimum transmission unit when the transmitter is in an ordinary data session. In some such embodiments, the transmission power of the beacon signal's beacon symbols per minimum transmission unit is at least 16 dBs higher than the average transmission power of data and control signals per minimum transmission unit when the transmitter is in an ordinary data session.

Figure 10:
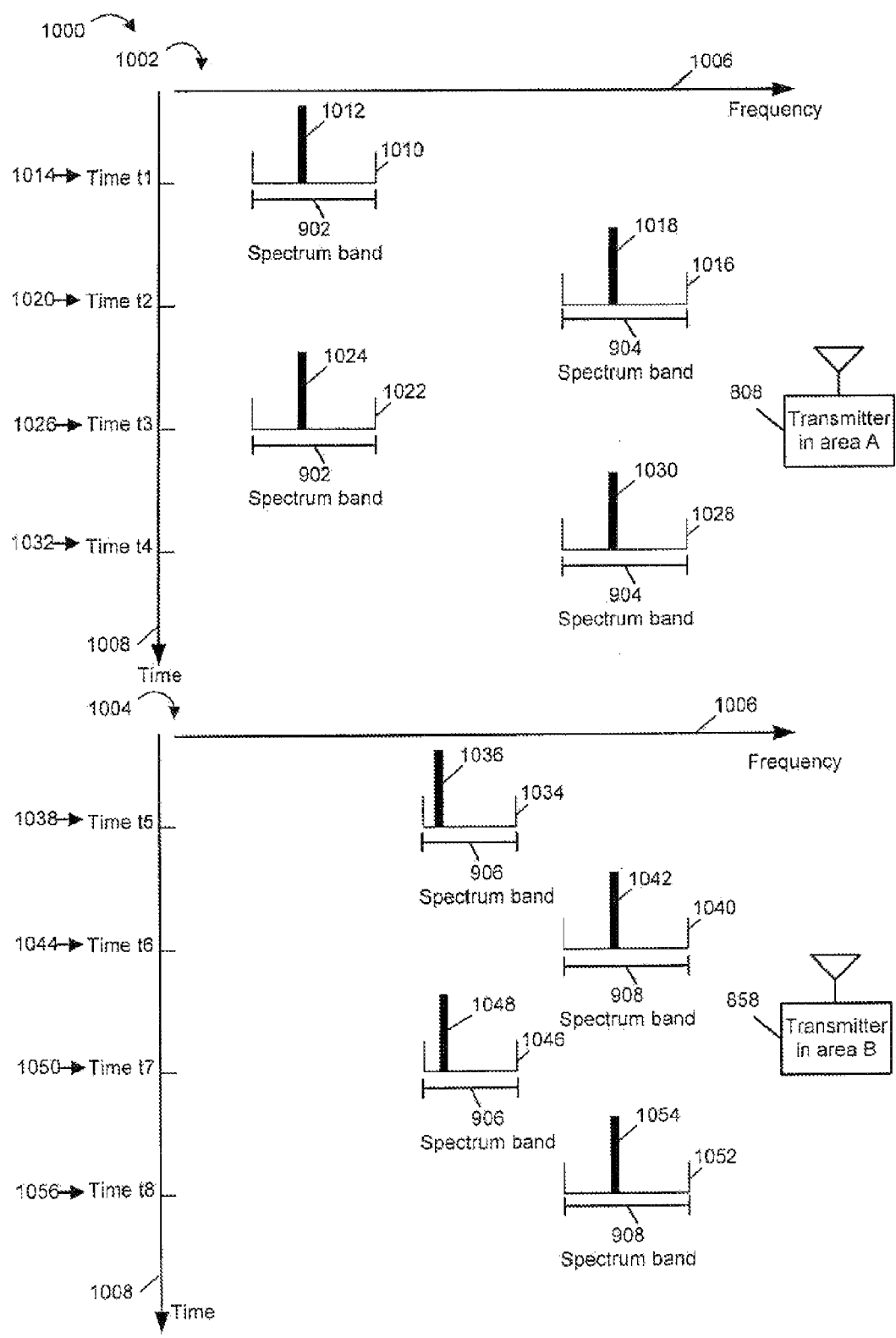
FIG. 10 illustrates exemplary system beacon signals transmitted in the ad hoc networks in two different geographic areas.

Drawing 1000 of FIG. 10 illustrates exemplary system beacon signals transmitted in exemplary ad hoc networks (801, 851) in two different geographic areas (806, 856), respectively. The upper portion 1002 illustrates the system beacon signal transmitted by the special transmitter 808 in area A 806 and the lower portion 1004 illustrates the system beacon signal transmitted by the special transmitter 858 in area B 856.

In either the upper or the lower portion (1002, 1004), the horizontal axis 1006 represents frequency and the vertical axis 1008 represents time.

Recall from FIG. 9 that spectrum bands 902 and 904 are available in area A 806. The upper portion 1002 of FIG. 10 slows that, the special transmitter 808 transmits the system beacon signal burst 1010 including beacon symbol(s) 1012 at time t1 1014 in spectrum band 902 and transmits the system beacon signal burst 1016 including beacon symbol(s) 1018 at time t2 1020 in spectrum band 904. The transmitter 808 then repeats the above procedure and transmits the system beacon signal burst 1022 including beacon symbol(s) 1024 at time t3 1026 ill spectrum band 902 and transmits the system beacon signal burst 1028 including beacon symbol(s) 1030 time t4 1032 in spectrum band 904, and so on. In some embodiments the beacon signal bursts 1010 and 1022 are identical, e.g., the beacon symbols occupy the same positions in a beacon burst. In some embodiments, the beacon signal bursts 1010, 1022 vary, e.g., the positions of the beacon symbols(s) change in accordance with a predetermined hopping sequence being implemented by beacon transmitter 808. In some beacon signal bursts 1016 and 1028 are identical. In some embodiments the beacon signal bursts 1016 and 1028 vary, e.g., in accordance with a predetermined hopping sequence being implemented by beacon transmitter 808. In some embodiments, the beacon signal bursts 1010 and 1016 are similar, e.g., the beacon symbols occupy the same relative positions in the beacon burst.

Recall from FIG. 9 that spectrum bands 906 and 908 are available in area B 856. The lower portion 1004 of FIG. 10 shows that the special transmitter 858 transmits the system beacon signal burst 1034 including beacon symbol(s) 1036 at time t5 1038 in spectrum band 906 and transmits the system beacon signal burst 1040 including beacon symbol(s) 1042 at teems t6 1044 in spectrum band 908. The transmitter 858 then repeats the above procedure and transmits the system beacon signal burst 1046 including beacon symbol(s) 1048 at time t7 1050 in spectrum band 906 and transmits the system beacon signal burst 1052 including beacon symbol(s) 1054 at time t8 1056 in spectrum band 908, and so on.

In an exemplary embodiment, at a given time, a special transmitter transmits at most one beacon signal burst in a spectrum band. The special transmitter hops across each of the available spectrum bands, successively from one spectrum band to another, and transmits the beacon signal burst in each band at a given time. For example, in the embodiment shown in FIG. 10, times T1 1014, t2 1020, t3 1026, t4 1032 do not overlap with each other. However, it is also possible that in other embodiments the transmitter may, and sometimes does, simultaneously transmit multiple beacon signals, each in a different spectrum band.

In the example of drawing 1000 of FIG. 10, with respect to the transmitter 808 in area A, t4>t3>t2>t1, and with respect to transmitter 858 in area B, t8>t7>t6>t5. However, the drawing does not intend to show that a timing relationship between t5 and t4 exists such that t5 is necessarily greater than t4. For example, the range of time including (t1, t2, t3, t4) and the range of time including (t5, t6, t7, t8) may, and sometimes does, at least partially overlap. In some embodiments, the two transmitters (808, 858) operate independently from one another and are not intentionally timing synchronized. In some embodiments, the two transmitters (808, 858) have timing structures which are coordinated, e.g., synchronized with respect to one another.

Figure 11:
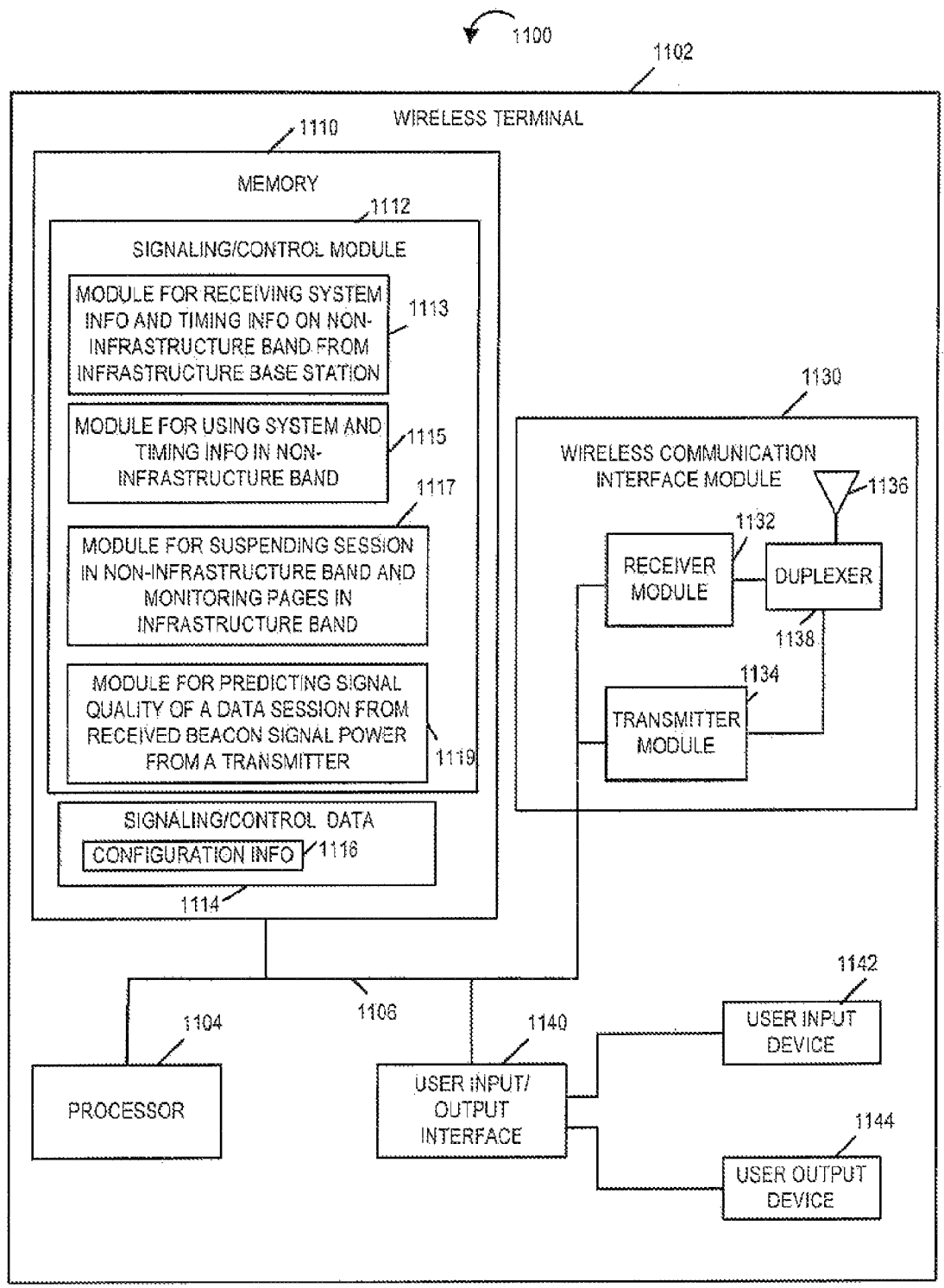
FIG. 11 illustrates an exemplary wireless terminal implemented in accordance with various embodiments.

FIG. 11 provides a details illustration of an exemplary wireless terminal 1100 implemented in accordance with the present invention. The exemplary terminal 1100, depicted in FIG. 11, is a detailed representation of an apparatus that may be used as any one of terminals 102 and 104 depicted in FIG. 1. In the FIG. 11 embodiment, the wireless terminal 1100 includes a processor 1104, a wireless communication interface module 1130, a user input/output interface 1140 and memory 1110 coupled together by bus 1106. Accordingly, via bus 1106 the various components of the wireless terminal 1100 can exchange information, signals and data. The components 1104, 1106, 1110, 1130, 1140 of the wireless terminal 1100 are located inside a housing 1102.

The wireless communication interface 1130 provides a mechanism by which the internal components of the wireless terminal 1100 can send and receive signals to/from external devices and another terminal. The wireless communication interface 1130 includes, e.g., a receiver module 1132 and a transmitter module 1134. which are connected with a duplexer 1138 with an antenna 1136 used for coupled the wireless terminal 1100 to other terminals, e.g., via wireless communications channels.

The exemplary wireless terminal 1100 also includes a user input device 1142, e.g., keypad, and a user output device 1144, e.g., display, which are coupled to bus 1106 via the user input/output interface 1140. Thus, user input/output devices 1142, 1144 can exchange information, signals and data with other components of the terminal 1100 via user input/output interface 1140 and bus 1106. The user input/output interface 1140 and associated devices 1142, 1144 provide a mechanism by which a user can operate the wireless terminal 1100 to accomplish various tasks. In particular, the user input device 1142 and user output device 1144 provide the functionality that allows a user to control the wireless terminal 1100 and applications, e.g., modules, programs, routines and/or functions, that execute in the memory 1110 of the wireless terminal 1100.

The processor 1104 under control of various modules, e.g., routines, included in memory 1110 controls operation of the wireless terminal 1100 to perform various signaling and processing. The modules included in memory 1110 are executed on startup or as called by other modules. Modules may exchange data, information, and signals when executed. Modules may also share data and information when executed. In the FIG. 11 embodiment, the memory 1110 of wireless terminal 1100 includes a signaling/control module 1112 and signaling/control data 1114.

The signaling/control module 1112 controls processing relating to receiving and sending signals, e.g., messages, for management of state information storage, retrieval, and processing. Signaling/control data 1114 includes state information, e.g., parameters, status and/or other information relating to operation of the wireless terminal. In particular, the signaling/control data 1114 includes various configuration information 1116, e.g., the page monitoring interval, the frequency location of infrastructure spectrum band and non-infrastructure spectrum band, the timing and/or frequency reference information of the beacon signal received from the infrastructure base station, and the power relationship between the beacon signal and the data/control traffic channel. The module 1112 may, and sometimes does, access and/or modify the data 1114, e.g., update the configuration information 1116. The module 1112 also includes a module 1113 for receiving system info and timing info on non-infrastructure band from infrastructure base station; module 1115 for using system and timing info in non-infrastructure band; module 1117 for suspending session in non-infrastructure band and monitoring pages in infrastructure band; and module 1119 for predicting signal quality of a data session from received beacon signal power from a transmitter.

Figures 12, 12A, 12B:
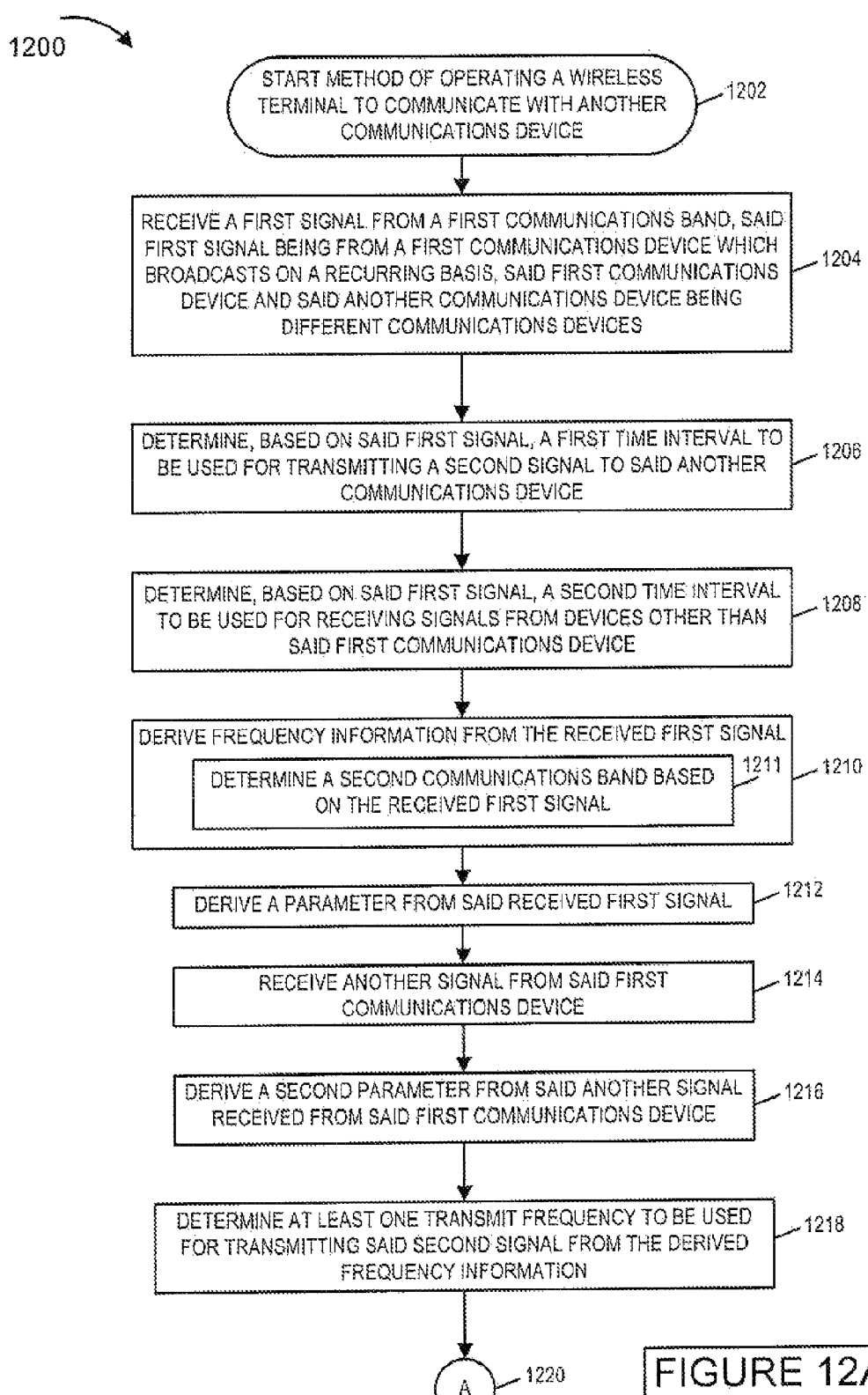
FIG. 12 comprising the combination of FIG. 12A
FIG. 12B is a drawing of a flowchart of an exemplary method of operating a wireless terminal to communicate with another communications device in accordance with various embodiments.
Figure 12B:
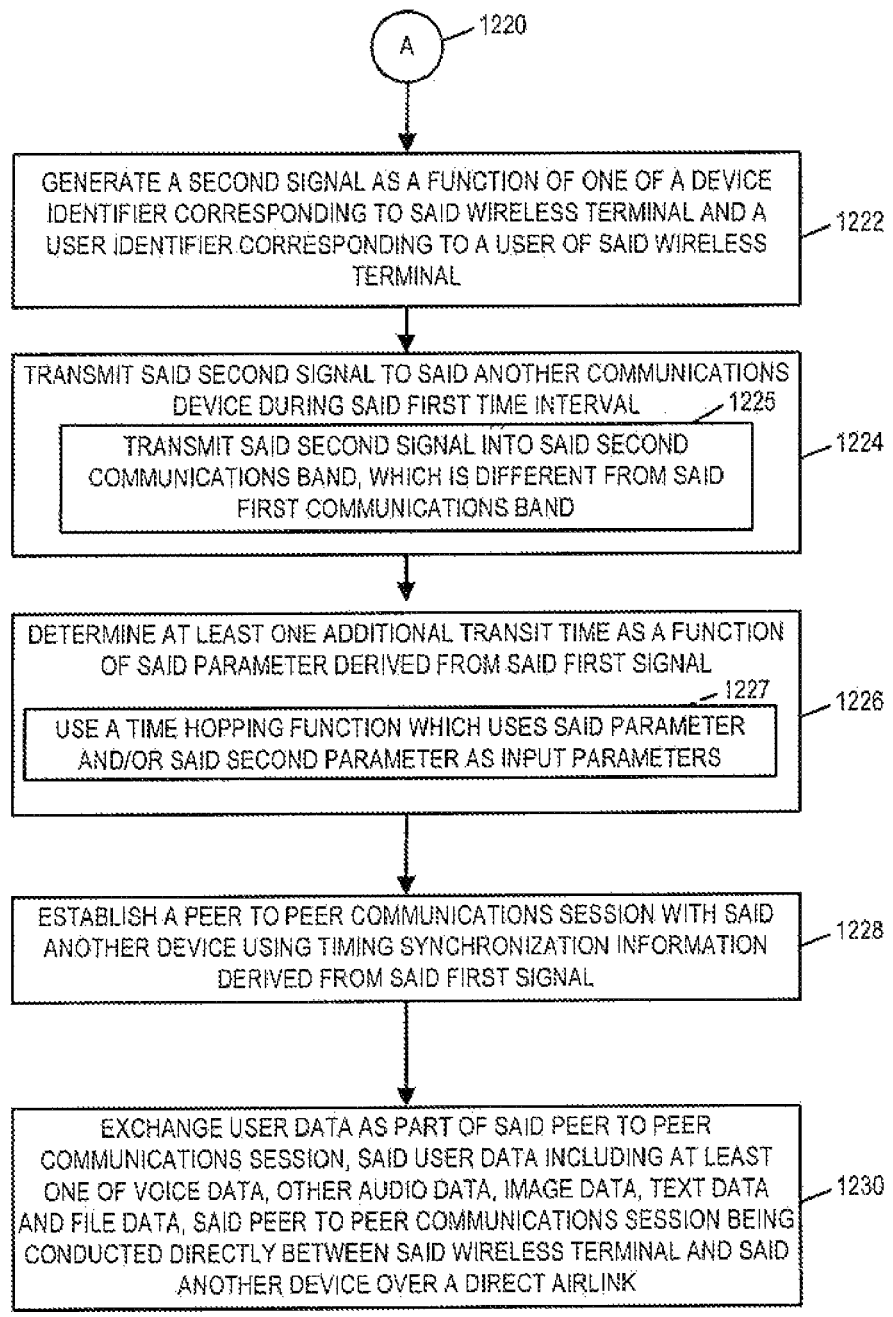

FIG. 12 comprising the combination of FIG. 12A and FIG. 12B is a flowchart 1200 of an exemplary method of operating a wireless terminal to communicate with another communications device in accordance with various embodiments. Operation starts in step 1202, where the wireless terminal is powered on and initialized and proceeds to step 1204. In step 1204, the wireless terminal receives a first signal from a first communications band, said first signal being from a first communications device which broadcasts on a recurring basis, said first communications device and said another communications device being different communications devices. Operation proceeds from step 1204 to step 1206.

In step 1206, the wireless terminal determines, based on the first signal, a first time interval to be used for transmitting a second signal to said another communications device. Then, in step 1208, the wireless terminal determines based on the first signal a second time interval to be used for receiving signals from devices other than the first communications device. Operation proceeds from step 1208 to step 1210.

In step 1210, the wireless terminal derives frequency information from the received first signal. Step 1210 includes sub-step 1211 in which the wireless terminal determines a second communications band based on the received first signal. Operation proceeds from step 1210 to step 1212 in which the wireless terminal derives a parameter from the received first signal. Operation proceeds from step 1212 to step 1214 in which the wireless terminal receives another signal from the first communications device, and then in step 1216 the wireless terminal derives a second parameter from another signal received from said first communications device. Operation proceeds from step 1216 to step 1218.

In step 1218, the wireless terminal determines at least one transmit frequency to be used for transmitting said second signal from the derived frequency information. Operations proceed from step 1218 via connecting node A 1220 to step 1222 of FIG. 12B.

In step 1222, the wireless terminal generates a second signal as a function of one of device identifier corresponding to said wireless terminal and a user identifier corresponding to a user of said wireless terminal. Then, in step 1224, the wireless communications device transmits said second signal to said another communications device during said first time interval. Step 1234 includes sub-step 1225 in which the wireless terminal transmits said second signal into said second communications band, which is different from said first communications band. Operation proceeds from step 1224 to step 1226.

In step 1226, the wireless terminal determines at least one additional transit time as a function of said parameter derived from said first signal. Step 1236 includes sub-step 1227, in which the wireless terminal uses a time hopping function which uses said parameter and/or said second parameter as input parameters. Operations proceeds from step 1226 to step 1228.

In step 1228, the wireless terminal establishes a peer to peer communications session with said another device using timing synchronization information derived from said first signal. Then, in step 1230, the wireless terminal exchanges user data as part of said peer to peer communications session, said user data including at least one of voice data, other audio data, image data, text data and file data, said peer to peer communications session being conducted directly between said wireless terminal and said another device over a direct airlink.

In some embodiments the first and second communications bands are non-overlapping. In various embodiments, the first and second communications bands are partially overlapping. In some embodiments, the second signal includes a beacon signal burst, e.g., an OFDM beacon signal burst including at least one beacon symbol. In some embodiments, the second signal is a pseudo noise sequence signal transmitted over the frequency spectrum of the second frequency band. In some embodiments both the first and second signals are OFDM signals. In some embodiments, both the first and second signals are CDMA signals. In some embodiments, both the first and second signals are GSM signals. In some embodiments the first signal is a GSM signal and the second signal is an OFDM signal. In some embodiments, the first signal is a CDMA signal and the second signal is an OFDM signal. In various embodiments, the first signal is a satellite broadcast signal, e.g., a GPS signal, a timing reference signal, a reference signal obtained from a geostationary satellite, a signal from a satellite TV and/or radio broadcast, etc., and the second signal is a terrestrial broadcast signal. The terrestrial broadcast signal is, e.g., from a fixed position base station, from a fixed position special transmitter, e.g., a beacon transmitter, or from a movable transmitter temporarily stationed at a fixed site to provide a reference such as a beacon signal, to be available for use by mobile nodes in the vicinity for a peer to peer network. In some embodiments, the first signal is received from a terrestrial cellular network and the wireless terminal is a mobile handset.

One exemplary embodiment will now be described corresponding to flowchart 1200 of FIG. 12. The wireless terminal is a first mobile node, and the another communications device is a second mobile node which participates in a peer to peer communication session with the first mobile node. The first communications device is a device such as a base station, special beacon transmitter, satellite, etc., which provides reference information to be used by the wireless terminal and another communications device. The first signal is an OFDM beacon signal burst including at least one beacon symbol, e.g., a high energy tone, transmitted into the first frequency band. The another signal is, e.g., a non-beacon broadcast signal transmitted from the first communications device. Reference timing information is derived from the first signal and used in determining a time for the wireless terminal to receive beacon signals from other wireless terminals, e.g., peers, and in determining a time to transmit its own user beacon signal. The second signal is an OFDM user beacon signal burst including at least one beacon symbol, which is generated as a function of an identifier associated with the wireless terminal or wireless terminal user. From the received first signal the wireless terminal derives the second communications band, which is the communications band to be used for peer to peer communications, which includes transmit frequencies of the user beacon to be generated by the wireless terminal. In this embodiment, the first and second communications bands are non-overlapping. Thus the wireless terminal's user beacon and peer to peer user data are communicated into the same band, the second communications band. First and second parameters are input control parameters used in a time hopping sequence associated with user beacon signals generated and transmitted by the wireless terminal. For example, one of first and second parameters may provide an indication or notion of time and the other may provide an identifier associated with the transmitter. The wireless terminal time hops the relative position of the beacon burst within a time window from one beacon burst to the next, in accordance with the hopping sequence using the input control parameters.

Figure 13:
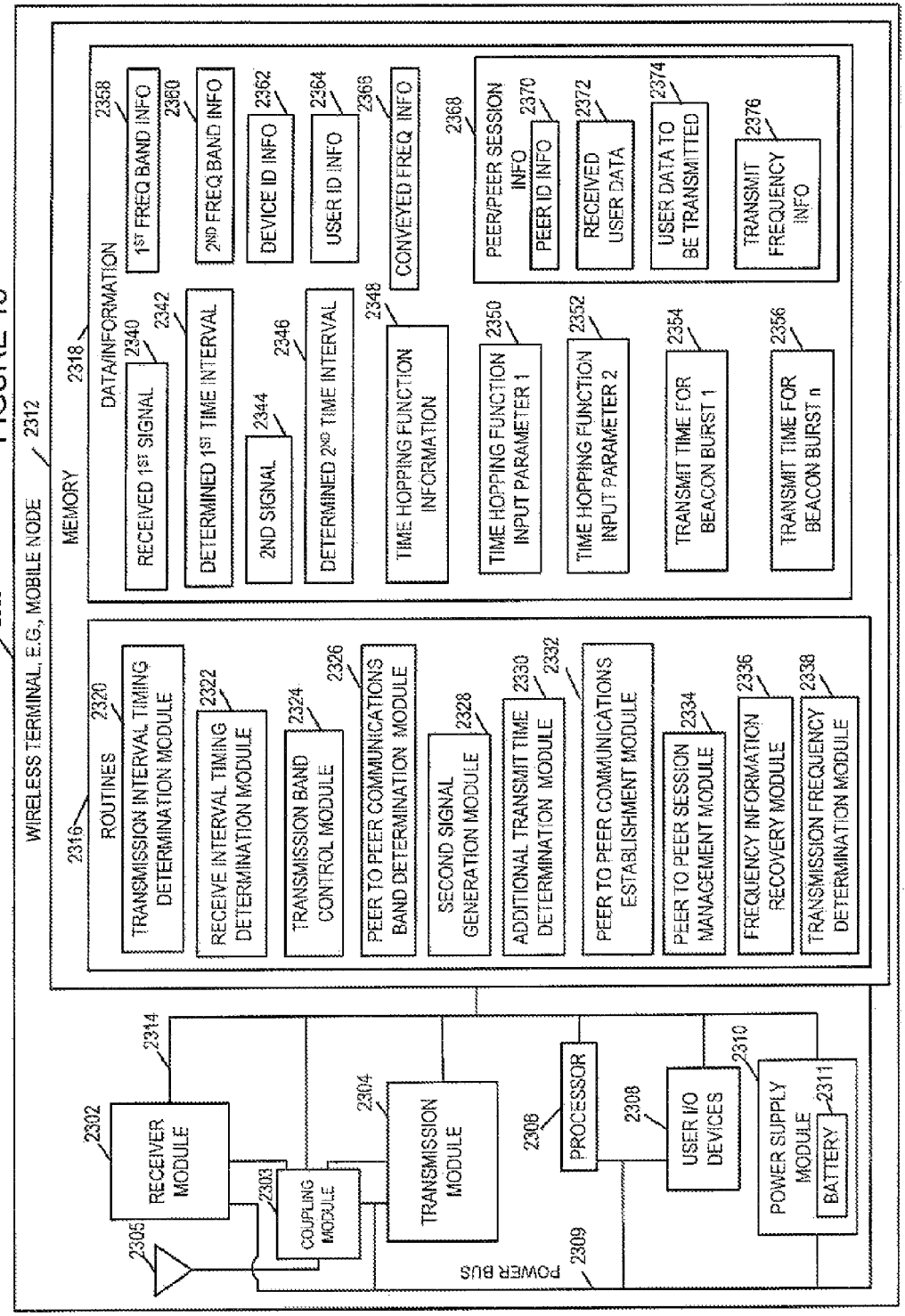
FIG. 13 is a drawing of an exemplary wireless terminal, e.g., mobile node, implemented in accordance with various embodiments.

FIG. 13 is a drawing of an exemplary wireless terminal 2300, e.g., mobile node, implemented in accordance with various embodiments. Exemplary wireless terminal 2300 includes a receiver module 2302, a transmission module 2304, a coupling module 2303, a processor 2306, user I/O devices 2308, a power supply module 2310 and memory 2312 coupled together via a bus 2314 over which the various elements may interchange data and information. Memory 2312 includes routines 2316 and data/information 2318. The processor 2306, e.g., a CPU, executes the routines and uses data/information 2318 in memory 2312 to control the operation of the wireless terminal 2300 and implement methods.

Coupling module 2302, e.g., a duplex module, couples the receiver module 2302 to antenna 2305 and the transmission module 2304 to antenna 2305. Power supply module 2312, which includes a battery 2311, is used to power up the various components of the wireless terminal. Power is distributed from the power supply module 2310 to the various components (2302, 2303, 2304, 2306, 2308, 2312), via a power bus 2309. User I/O devices 2308 include, e.g., keypad, keyboard, switches, mouse, microphone, speaker, display, etc. User I/O devices 2308 are used for operations including inputting user data, accessing output user data, and controlling at least some functions and operations of the wireless terminal, e.g., initiating a peer to peer communications session.

Routines 2316 include a transmission interval timing determination module 2320, a receive interval timing determination module 2322, a transmission band control module 2324, a peer to peer communications band determination module 2326, a second signal generation module 2328, an additional transmit time determination module 2330, a peer to peer communications establishment module 2332, a peer to peer session management module 2334, a frequency information recovery module 2336, and a transmission frequency determination module 2338. Data/information 2318 includes a received $1^{st}$ signal 2340, a determined first time interval 2342, $1^{st}$ frequency band information 2358, a second signal 2344, a determined $2^{nd}$ time interval 2346, $2^{nd}$ frequency band information 2360, device identification information 2362, user identification information 2364, time hopping function information 2348, a first time hopping function input parameter 2350, a second time hopping function input parameter 2352, a plurality of transmit times corresponding to beacon burst transmissions (transmit time for beacon burst 1 2354, ..., transmit time for beacon burst n 2356), conveyed frequency information 2366, and peer to peer session information 2368. The peer to peer session information 2368 includes peer identification information 2370, received user data 2372, user data to be transmitted 2374, and transmit frequency information 2376.

Receiver module 2302, e.g., a receiver, receives a first signal from a first communications band, said first signal being from a first communications device which broadcasts on a recurring basis. The first communications device is a different communications device that the communications device with which wireless terminal 2300 has a communications session. Information representing the received $1^{st}$ signal 2340 is stored in memory 2312, and $1^{st}$ frequency band information 2358 identifies the frequency band to which the receiver module is tuned when receiving the $1^{st}$ signal. The $1^{st}$ signal is, e.g., a broadcast signal used to obtain a timing reference by the wireless terminal 2300. Receiver module 2302 also receives signals from other communication devices, e.g., a part of communications sessions such as peer to peer communications sessions. Some of the received signals include user data 2372. In some embodiments, receiver module 2302 supports a plurality of signaling technologies, e.g., the first signal which is used as a reference may be and sometimes is a different technology than the technology used for peer to peer communications sessions.

Transmission module 2304, e.g., an OFDM transmitter, is used for transmitting a second signal 2344 to a communications device, e.g., a peer wireless terminal, during a determined $1^{st}$ time interval 2342. In some embodiments, the second signal 2344 includes a beacon signal burst, e.g., an OFDM beacon signal burst including at least one beacon symbol. Transmission module 2304 also transmits user data 2344, as part of a peer to peer communications session using transmit frequency information 2376.

Transmission interval timing determination module 2322 determines, based on the received $1^{st}$ signal 2340, a first time interval 2342 to be used for transmitting $2^{nd}$ signal 2344, e.g., a WT 2300 beacon signal burst, to another communications device, e.g., a peer wireless terminal. Receive interval timing determination module 2322 determines, based on the received $1^{st}$ signal 2340, a $2^{nd}$ time interval 2346 to be used for receiving signals from devices other than the device which transmitted the $1^{st}$ signal. In some embodiments, the $2^{nd}$ time interval is a time interval in which wireless terminal 2300 is to receive and monitor for beacon signals from another communications device, e.g., peer wireless terminal.

Transmission band control module 2324 controls the wireless terminal 2300 to transmit the $2^{nd}$ signal 2344, e.g., WTs 2300's beacon signal burst, in a second communications band identified by $2^{nd}$ frequency band information 2360. In some embodiments, the $2^{nd}$ frequency band is different from the $1^{st}$ frequency band. For example, the wireless terminal 2300 receives a broadcast signal used for timing synchronization in a $1^{st}$ band and transmits its user beacon in a $2^{nd}$ frequency band, which is a different band.

Peer to peer communications band determination module 2326 determines, prior to transmitting the $2^{nd}$ signal 2344 the $2^{nd}$ communication band based on the $1^{st}$ received communications signal 2340. Thus peer to peer communications band determination module 2326 determines $2^{nd}$ frequency band information 2360. In some embodiments, the $1^{st}$ and $2^{nd}$ frequency bands are non-overlapping frequency bands. In some embodiments, the $1^{st}$ and $2^{nd}$ frequency bands are partially overlapping frequency bands.

Second signal generation module 2328, generated $2^{nd}$ signal 2344, prior to transmitting the second signal as a function of one of a device identifier 2362 corresponding to the wireless terminal and a user identifier 2364 corresponding to a user of wireless terminal 2300. In some embodiments, second signal generation module 2328 generates signaling including beacon signal bursts, e.g., OFDM beacon signal bursts including at least one beacon symbol. In some embodiments, the second signal is a pseudo noise sequence transmitted over the second frequency band.

Additional transmit time determination module 2330 determines at least one additional transmit time as a function of a parameter derived from the $1^{st}$ signal, e.g., time hopping function input parameter 1 2350. The additional transmit time determination module 2330 uses a time hopping function which uses parameter 2350 as an input. Time hopping function information 2348 includes, e.g., information defining the time hopping sequence. In some embodiments, the time hopping function uses a second input parameter 2352 derived from another signal received from the communications device which transmitted the $1^{st}$ broadcast signal. For example, the another signal may be, and sometimes, is, a non-beacon broadcast signal communicating the $2^{nd}$ input parameter. The another signal may be, and sometimes is, another beacon signal burst.

Peer to peer communications establishment module 2332 is used to establish a peer to peer communications session with another device, e.g., a peer node, using timing synchronization information derived from the received $1^{st}$ signal 2340.

Peer to peer session management module 2334 controls the exchange of used data including at least one of voice data, text data, and image data, said peer to peer communications session being conducted directly between the wireless terminal and another device, e.g., peer wireless terminal, over a direct air link.

Frequency information recovery module 2336 recovers conveyed frequency information 2366 from the received $1^{st}$ signal 2340, prior to transmitting the second signal 2344, deriving frequency information from the received $1^{st}$ signal 2340. For example, the $1^{st}$ signal conveyed information identifying the $2^{nd}$ frequency band, the $2^{nd}$ frequency band to be used by wireless terminal 2300 for transmitting its user beacon signal and for peer to peer user data communications.

Transmission frequency determination module 2338 determines at least one transmit frequency to be used for transmitting the second signal from derived frequency information. Information including in 2376 is an output of module 2338. Transmit information 2376 includes, e.g., frequency band information and/or individual tone identification information. In some embodiments, transmit frequency information identifies OFDM tones used to convey beacon symbols of beacon signal bursts to be transmitted by wireless terminal 2300. In some such embodiments, beacon symbol tones are tone hopped from one burst to another in a sequence of bursts in accordance with a tone hopping sequence.

In some embodiments, both the first and second signals are OFDM signals. In some embodiments, the first signal is a GSM signal and the second signal is an OFDM signal. In some embodiments, the first signal is a CDMA signal and the second signal is an OFDM signal. In some embodiments, the first signal is a satellite broadcast signal and the second signal is a terrestrial broadcast signal. In some embodiments, the first signal is received from a terrestrial cellular network and the wireless terminal is a mobile handset.

Figure 14:
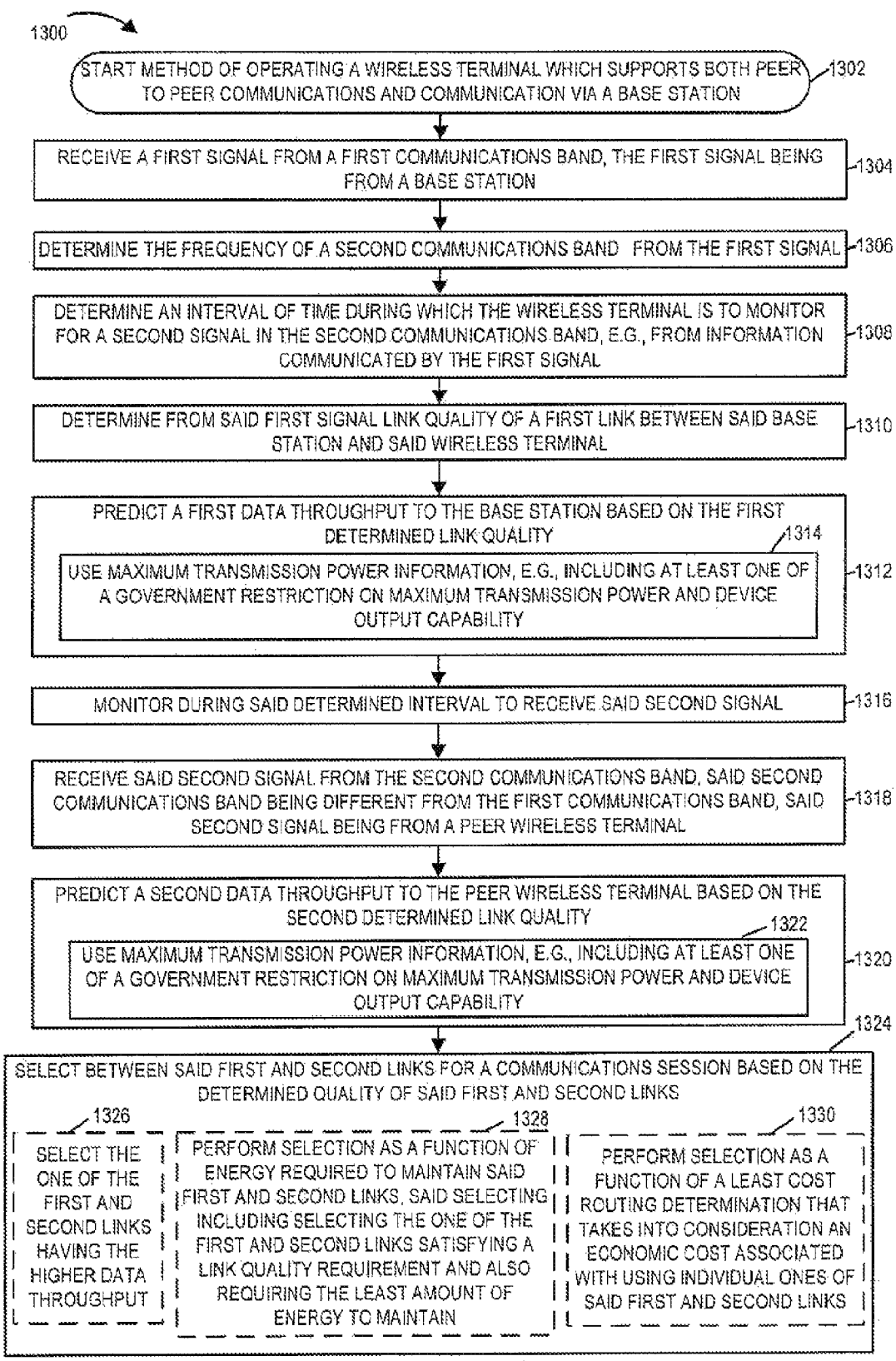
FIG. 14 is a drawing of a flowchart of an exemplary method of operating a wireless terminal which supports both peer to peer communications and communications with a base station in accordance with various embodiments.

FIG. 14 is a drawing of a flowchart 1300 of an exemplary method of operating a wireless terminal which supports both peer to peer communications and communications with a base station in accordance with various embodiments. Operation starts in step 1302, where the wireless terminal is powered on and initialized and proceeds to step 1304. In step 1304, the wireless terminal receives a first signal from a first communications band, the first signal being from a base station. Operation proceeds from step 1304 to step 1306. In step 1306, the wireless terminal determines the frequency of a second communications band from the first signal, and in step 1308, the wireless terminal determines an interval of time during which the wireless terminal is to monitor for a second signal in the second communications band, the determination of the time interval being based on information communicated by the first signal, e.g., a time reference communicated. Operation proceeds from step 1308 to step 1310.

In step 1310, the wireless terminal determines from said first signal link the quality of a first link between said base station and said wireless terminal, and in step 1312, the wireless terminal predicts a first data throughput to the base station based on the first determined link quality. Step 1312 includes sub-step 1314, in which the wireless terminal uses maximum transmission power information in the first link quality determination. The maximum transmission power information includes, e.g., at least one of a government restriction on maximum transmission power and device output capability. Operation proceeds from step 1312 to step 1316.

In step 1316, the wireless terminal monitors during said determined time interval to receive said second signal, and then in step 1318, the wireless terminal receives said second signal from the second communications band, said second communications band being different from the first communications band, said second signal being from a peer wireless terminal. In some embodiments, the first and second signal each include at least one beacon signal burst.

Operation proceeds from step 1318 to step 1320. In step 1320, the wireless terminal predicts a second data throughput to the peer wireless terminal based on the second determined link quality. Step 1320 includes sub-step 1322 in which the wireless terminal uses maximum transmission power information in the second link quality determination. The maximum transmission power information includes, e.g., at least one of a government restriction on maximum transmission power and device output capability. Operation proceeds from step 1320 to step 1324, in which the wireless terminal selects between said first and second links for a communications session based on the determined quality of the first and second links. Step 1324 includes alternative sub-steps 1326, 1328, and 1330.

In alternative sub-step 1326, the wireless terminal selects the one of the first and second links having a higher data throughput. In alternative sub-step 1328, the wireless terminal performs the selection as a function of energy required to maintain said first and second links, said selecting including selecting the one of the first and second links satisfying a link quality requirement and also requiring the least amount of energy to maintain. In alternative sub-step 1330, the wireless terminal performs selection as a function of a lest cost routing determination that takes into consideration an economic cost associated with using individual ones of said first and second links.

Figure 15:
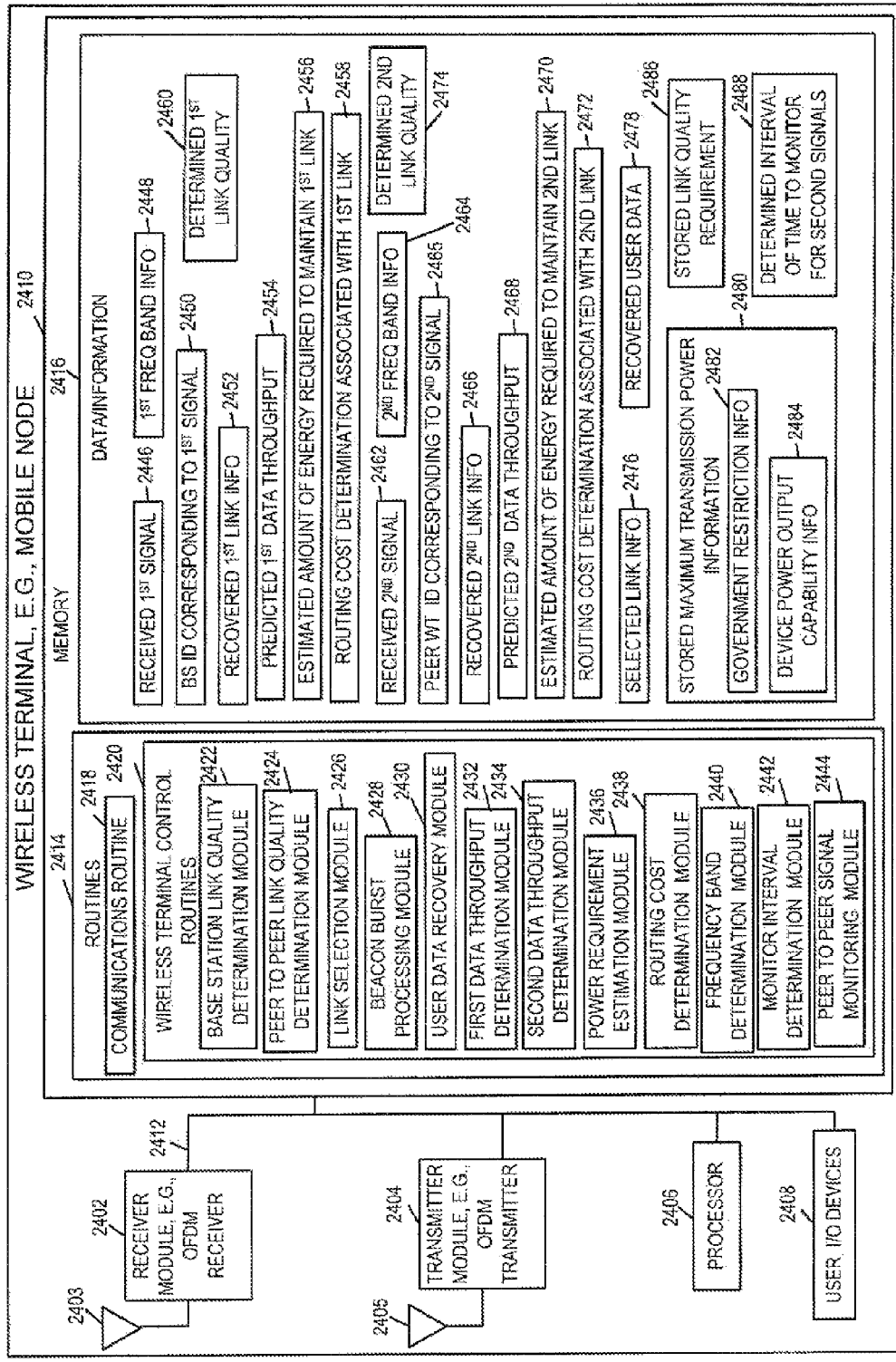
FIG. 15 is a drawing of an exemplary wireless terminal, e.g., mobile node, implemented in accordance with various embodiments.

FIG. 15 is a drawing of an exemplary wireless terminal 2400, e.g., mobile node, implemented in accordance with various embodiments. Exemplary wireless terminal 2400 supports both peer to peer communications and communications via a base station. Exemplary wireless terminal 2400 includes a receiver module 2402, a transmitter module 2404, a processor 2406, user I/O devices 2408, a memory 2410 coupled together via a bus 2412 over which the various elements may exchange data and information. Memory 2410 includes routines 2414 and data/information 2416. The processor 2406, e.g., a CPU, executes the routines 2414 and uses the data/information 2416 in memory 2410 to control the operation of the wireless terminal 2400 and implement methods.

Receiver module 2402, e.g., an OFDM receiver, is coupled to receive antenna 2403 via which the wireless terminal 2400 receives signals from base stations and other wireless terminals. Transmitter module 2404, e.g., an OFDM transmitter, is coupled to transmit antenna 2405 via which the wireless terminal 2400 transmits signals to base stations and to other wireless terminals. In some embodiments, the same antenna is used for both the receiver and transmitter modules (2402, 2404).

User I/O devices 2408 include, e.g., keypad, keyboard, switches, mouse, microphone, speaker, display, etc. User I/O devices 2408 are used for operations including inputting user data, accessing output user data, and controlling at least some functions and operations of the wireless terminal, e.g., initiating a communications session.

Routines 2414 include a communications routine 2418 and wireless terminal control routines 2430. The communications routine 2418 implements the various communications protocols used by the wireless terminal 2400. The wireless terminal control routines 2420 include a base station link quality determination module 2422, a peer to peer link quality determination module 2424, a link selection module 2426, a beacon burst processing module 2428, a user data recovery module 2430, a first data throughput determination module 2432, a second data throughput determination module 2434, a power requirement estimation module 2436, a routing cost determination module 2438, a frequency band determination module 2440, a monitor interval determination module 2442, and a peer to peer signal monitoring module 2444.

Data/information 2416 includes a received $1^{st}$ signal 2446, $1^{st}$ frequency band information 2448, base station identification information corresponding to the base station which transmitted the $1^{st}$ signal 2450, recovered $1^{st}$ link information 2452, predicted $1^{st}$ link data throughput 2454, estimated amount of energy required to maintain $1^{st}$ 2456, routing cost determination associated with $1^{st}$ link 2458, determined $1^{st}$ link quality 2460, received $2^{nd}$ signal 2462, $2^{nd}$ frequency band information 2464, peer wireless terminal identification information corresponding to the peer wireless terminal which transmitted the $2^{nd}$ signal 2465, recovered $2^{nd}$ link information 2466, predicated 2nd link data throughput 2468, estimated amount of energy required to maintain $2^{nd}$ link 2470, routing cost determination associated with $2^{nd}$ link 2472, determined $2^{nd}$ link quality 2474, selected link information 2476, recovered user data 2478, stored maximum transmission power information 2480, stored link quality requirement information 2486, and determined interval of time to monitor for second signals 2488. Stored maximum transmission power information 2480 includes government restriction information 2482 and device output capability information 2484.

Receiver module 2402 receives a $1^{st}$ signal from a $1^{st}$ communication band, the first signal being from a base station. Received $1^{st}$ signal 2446 includes information representing the $1^{st}$ signal which was received in the band identified by $1^{st}$ frequency band information 2448 and was transmitted by the base station identified in information 2450. Receiver module 2402 also receives a second signal from a second communications band which is different from the first communications band, said second signal being from a peer wireless terminal. Received $2^{nd}$ signal 2462 includes information representing the $2^{nd}$ signal which was received in the band identified by $2^{nd}$ frequency band information 2464 and was transmitted by the peer wireless terminal identified in information 2465. In some embodiments, the first and second signals each include at least one beacon signal burst, e.g., an OFDM beacon signal burst including at least one beacon symbol.

Base station link quality determination module 2422 determines, from the first signal, link quality of a first link between a base station which transmitted the first signal and the wireless terminal 2400, and determined $1^{st}$ link quality 2460 is an output of module 2422. Peer to peer link quality determination module 2424 determines, from the second signal, link quality of a second link between a peer wireless terminal which transmitted the second signal and the wireless terminal 2400, and determined $2^{nd}$ link quality 2474 is an output of module 2424.

Link selection module 2426 selects between $1^{st}$ and $2^{nd}$ links, for a communications session, based on the determined quality of the first and second links. Determined $1^{st}$ link quality 2460 and determined $2^{nd}$ link quality 2474 are inputs to link selection module 2426 and selected link information 2476 is an output of link selection module 2426 which identifies the selected link.

Beacon burst processing module 2428 recovers link information from beacon signal bursts (recovered $1^{st}$ link information 2452 corresponding to $1^{st}$ signal, recovered $2^{nd}$ link information 2466 corresponding to $2^{nd}$ signal). User data recovery module 2430 recovers user data 2478 from non-beacon signals used to communicate user data as part of a communications session. At some times the recovered user data 2478 is from a peer to peer communication session, while at other times the recovered user data is from a communications session in which the user data is relayed through a base station serving as an access node.

First data throughput determination module 2432 predicts a first data throughput 2454 to the base station based on the first determined link quality 2460. Second data throughput determination module 2434 predicts a second data throughput 2468 to the peer wireless terminal based on the second determined link quality 2474. Link selection module 2426 includes a throughput based selection module for selecting the one of the first and second links having the higher data throughput. First data throughput determination module 2432 uses the stored maximum transmission power information 2480 in predicting the first data throughput 2454. Second data throughput determination module 2434 uses the stored maximum transmission power information 2480 in predicting the second data throughput 2468.

Power requirement estimation module 2436 estimates the amount of energy required to maintain the $1^{st}$ and $2^{nd}$ links (estimated amount of energy required to maintain $1^{st}$ link 2456, estimated amount of energy required to maintain $2^{nd}$ link 2470). Link selection module 2426 also performs selection between first and second links for a communications session as a function of energy required to maintain first and second links, said selecting including selecting the one of the $1^{st}$ and 2nd links satisfying a link quality requirement 2486 and also requiring the least amount of energy to maintain.

Routing cost determination module 2438 performs a routing cost determination that takes into consideration economic costs associated with using individual ones of the first and second links. Routing cost determination associated with $1^{st}$ link 2458 and routing cost determination associated with $2^{nd}$ link 2472 are outputs of module 2438. Link selection module 2426 also performs selection between first and second links as a function of least cost routing determination, e.g., using info (2458, 2472) that takes into consideration economic costs associated with individual ones of the first and second links.

Frequency band determination module 2440 determines, prior to receiving the second signal, the frequency band of the second signal from the first signal. Thus a base station identifies the frequency band to be used for peer to peer communications in its vicinity. Monitor interval determination module 2442 determines an interval of time during which said wireless terminal 2400 is to monitor for second signals 2488, e.g., a time interval for wireless terminal 2400 to search for user beacon signals from peer nodes. Peer to peer signal monitoring module 2444 monitors for a signal from a peer wireless terminal during the interval identified to receive second signals, e.g., peer to peer signal monitoring module 2444 monitors for user beacon signal buses from peer nodes.

In some embodiments, the selection module 2426 changes selection criteria and/or re-weights selection criteria as a function of base station identification information, peer identification information, priority information, type of information anticipated to be communicated, wireless terminal 2400 current conditions, and/or latency requirements. For example, selection module 2426, in some embodiments, heavily weights the selection as a function of energy requirements, when a low battery power condition is detected in wireless terminal 2400. As another example, selection module 2426 heavily weights the selection based on predicted data throughput when a large amount of time critical data is anticipated to be communicated.

Figure 16:
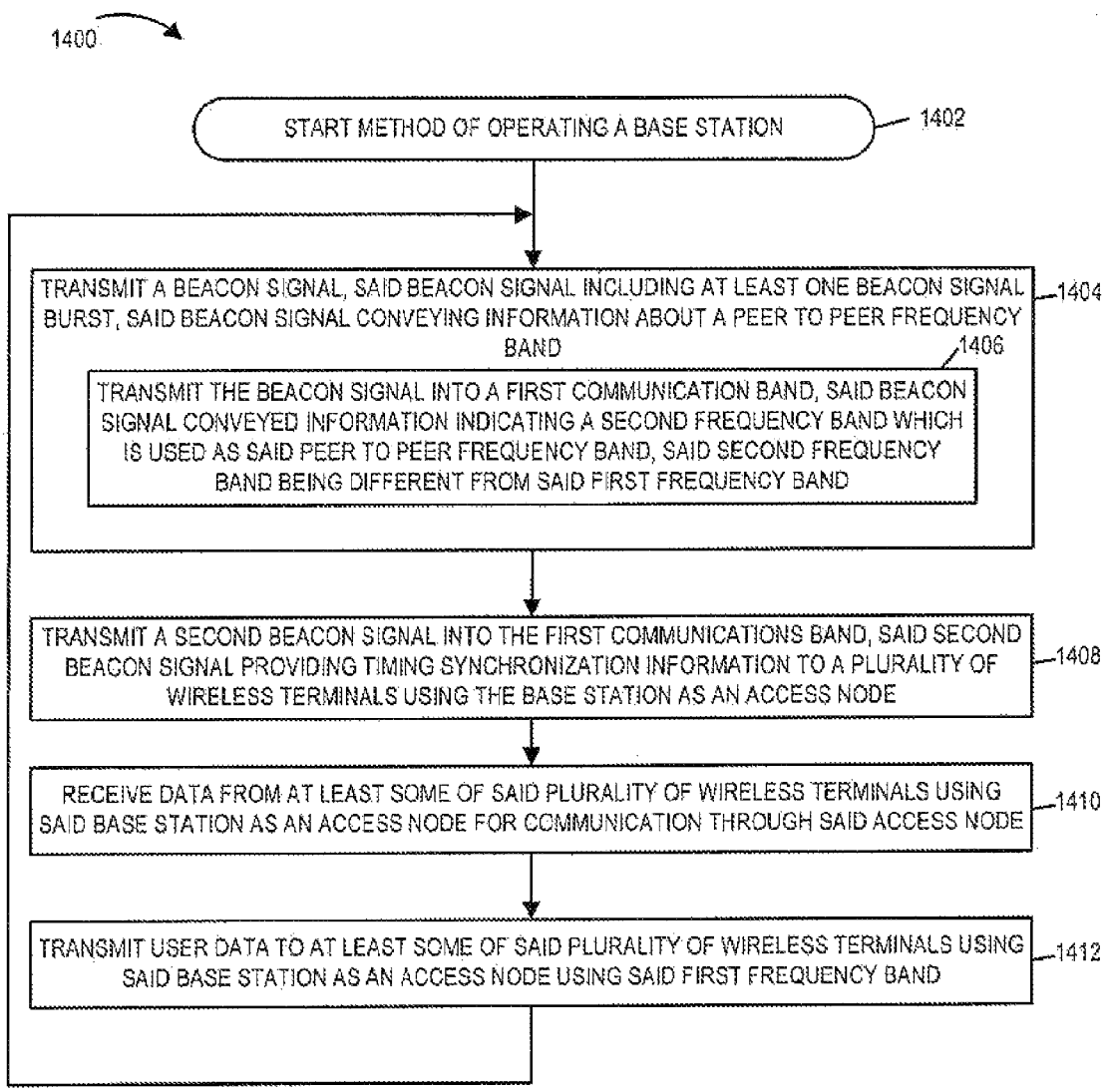
FIG. 16 is a drawing of a flowchart of an exemplary method of operating a base station in accordance with various embodiments.

FIG. 16 is a drawing of a flowchart 1400 of an exemplary method of operating a base station in accordance with various embodiments. Operation starts in step 1402, where the base station is powered on and initialized and proceeds to step 1404. In step 1404, the base station transmits a beacon signal, said beacon signal including at least one beacon signal burst, said beacon signal conveying information about a peer to peer frequency band, e.g., a peer to peer frequency band which is available for use in the vicinity of the base station. Step 1404 includes sub-step 1406. In sub-step 1406, the base station transmits the beacon signal into a first communications band, said beacon signal conveyed information indicating a second frequency band which is used as said peer to peer frequency band, said second frequency band being different from said first frequency band. Operation proceeds from step 1404 to step 1408.

In step 1408, the base station transmits a second beacon signal into the first communications band, said second beacon signal providing timing synchronization information to a plurality of wireless terminals using the base station as an access node. Operation proceeds from step 1408 to step 1410.

In step 1410, the base station receives data from at least some of said plurality of wireless terminals using said base station as an access node for communication through said access node, and in step 1412, the base station transmits user data to at least some of said plurality of wireless terminals using said base station as an access node using the first frequency band. Operation proceeds from step 1412 to step 1404.

In some embodiments, the first frequency band is used in a time division multiplexed manner, and said step of receiving data (1410) receives data in the first communications band during a first time period and said step of transmitting user data into the first frequency band (1412) is performed during a second time period which is different from said first time period. In some other embodiments, the base station uses the first frequency band for transmitting signals including said beacon signal, said second beacon signal and said user data signals, while a third communications band is used for receiving user data signals from wireless terminals using the base station as an access point. In some embodiments, the first, second and third communications bands are different and non-overlapping. In some such embodiments, the base station transmits and receives user data concurrently.

In some embodiments, the average base station transmitted power into the second communication band over a 1 minute time period is less than $\frac{1}{1000}$ the average base station transmitted power into the first frequency band over the same 1 minute interval. In some such embodiments, the base station does not transmit any power into the second frequency band.

In another embodiment, which is a variation of embodiments described with respect to flowchart 1400, the base station transmits its access node beacon signal and user data into the first frequency band, and transmits a beacon signal for peer to peer communications into the second frequency band, the second frequency band being used for peer to peer communications, but the base station does not transmit any user data into the second frequency band. In some such embodiments, the average base station transmitted power into the second communication band over a 1 minute time period is less than $\frac{1}{1000}$ the average base station transmitted power into the first frequency band over the same 1 minute interval.

In still another embodiment, which is a variation with respect to flowchart 1400, the base station transmits both its access node beacon signal and its peer to peer node beacon signal in a first frequency band used for beacon signals. In addition, the base station transmits user data intended for wireless terminals using the base station as an access node into a second frequency band; and the base station refrains from transmitting user data into a third frequency band which is utilized for peer to peer communications, wherein said first, second nd third communications bands are non-overlapping.

Figure 17:
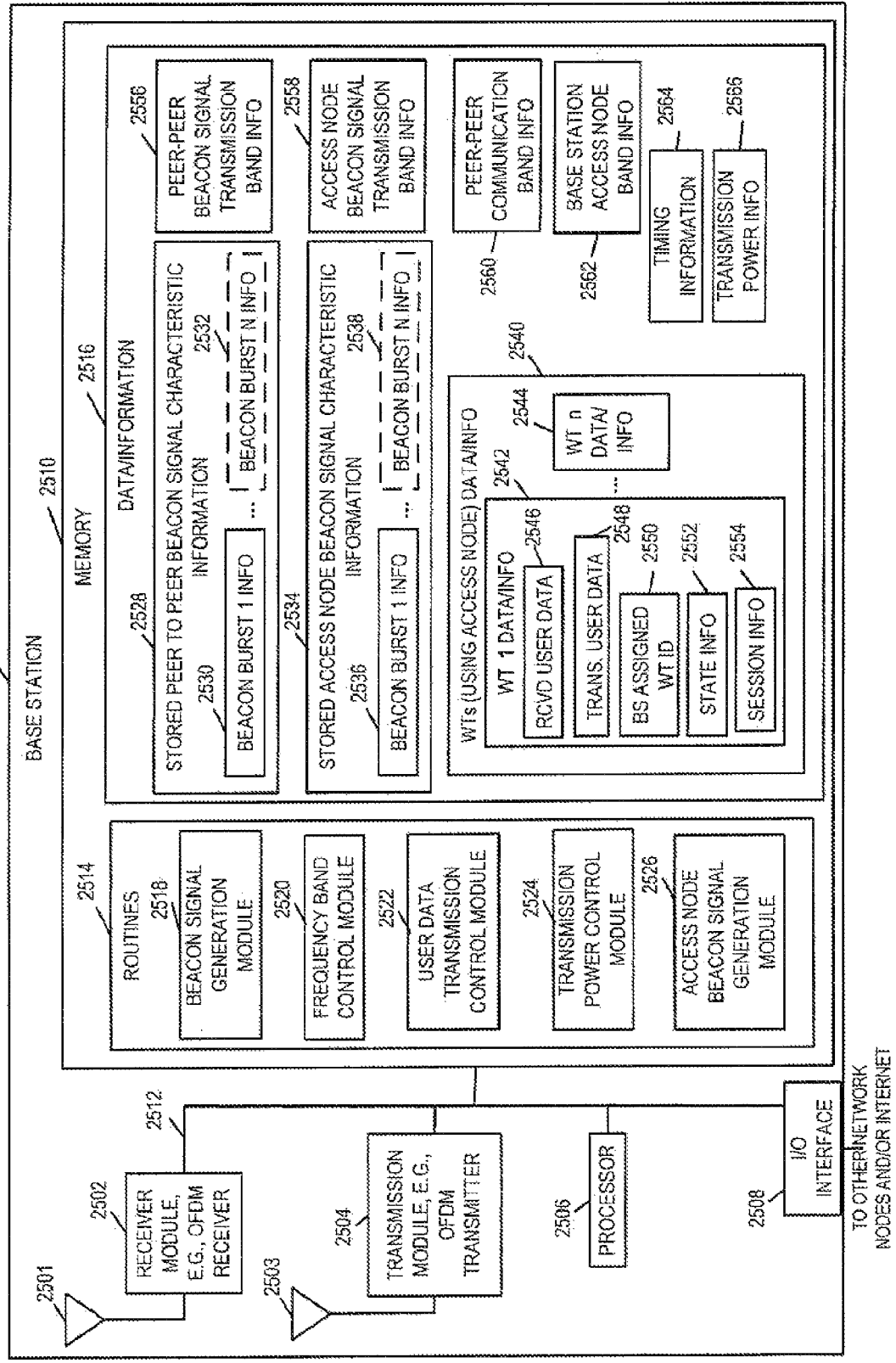
FIG. 17 is a drawing of an exemplary base station in accordance with various embodiments.
Figure 18:
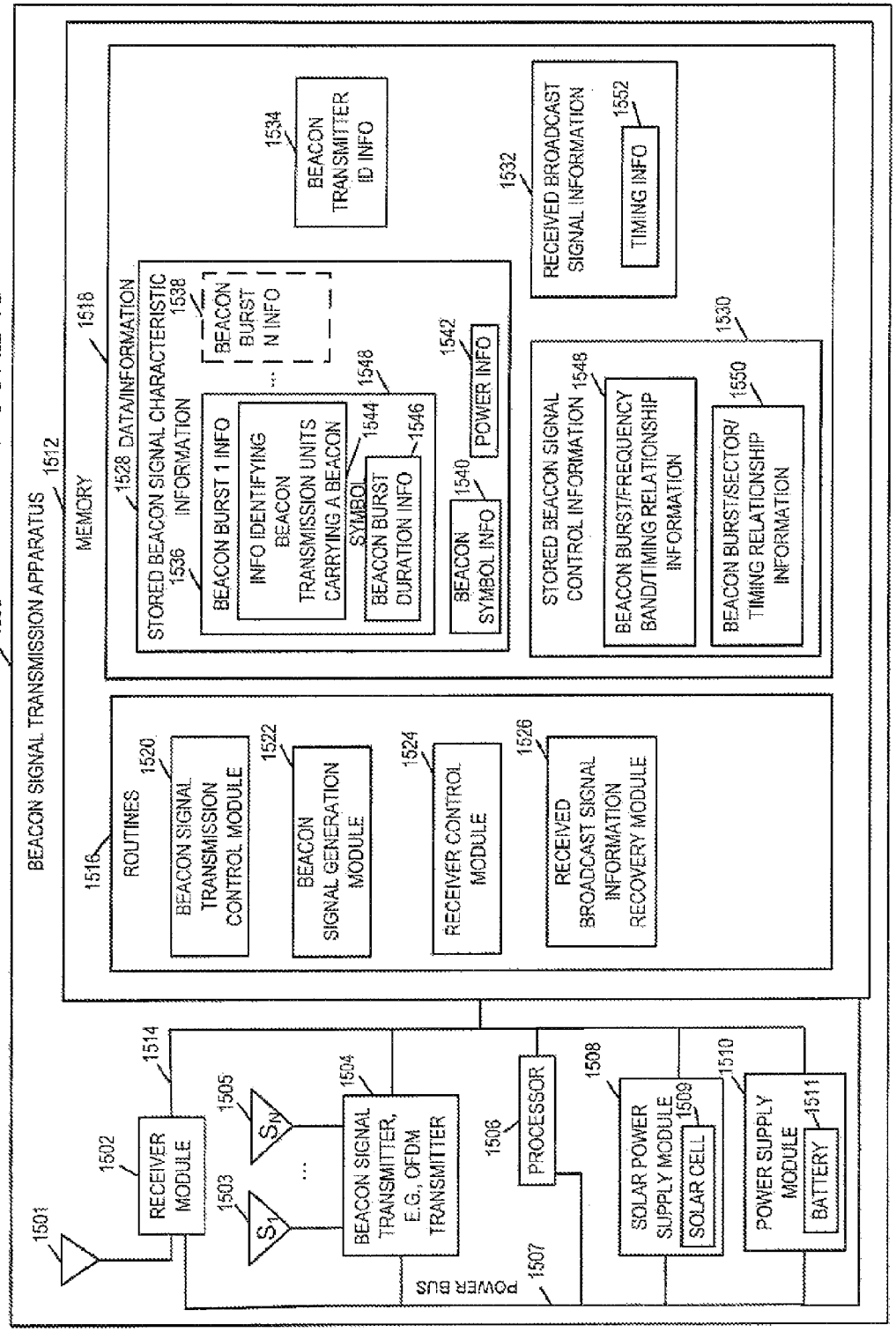
FIG. 18 is a drawing of an exemplary beacon signal transmission apparatus in accordance with various embodiments.

FIG. 17 is a drawing of an exemplary base station 2500 in accordance with various embodiments. Exemplary base station 2500 includes a receiver module 2502, with associated antenna 2501, a transmission module 2504, with associated transmitter antenna 2503, a processor 2506, and I/O interface 2508, and memory 2510 coupled together via a bus 2512 over which the various elements interchange data and information. Memory includes routines 2514 and data/information 2516. The processor 2506, e.g., a CPU, executes the routine 2514 and uses the data/information 2516 in memory 2510 to control the operation of the base station 2500 and implement methods, e.g., the method of FIG. 16.

Routines 2514 include a beacon signal generation module 2518, a frequency band control module 2520, a user data transmission control module 2522, a transmission power control module 2524, and an access node beacon signal generation module 2526. Data/information 2516 includes stored peer to peer beacon signal characteristic information 2528, stored access node beacon signal characteristic information 2534, peer to peer beacon signal transmission band information 2556, access node beacon signal transmission band information 2558, peer to peer communications band information 2560, base station access node band information 2562, timing information 2564, transmission power information 2566, and wireless terminal data/information 2540 corresponding to wireless terminals using the base station 2500 as an access node.

Stored peer to peer beacon signal characteristic information 2528 includes one or more sets of beacon burst information (beacon burst 1 information 2530), . . . , beacon burst N information 2532). Stored access node beacon signal characteristic information 2534 includes one or more sets of beacon burst information (beacon burst 1 information 2547, . . . , beacon burst N information 2538).

WTs data/information 2640 corresponding to WTs using the base station as an access node includes a plurality of sets of information (WT 1 data/information 2542, . . . , WT n data/information 2544). WT 1 data/information 2542 includes received user data 2546, user data to be transmitted 2548, a base station assigned wireless terminal identifier 2550, state information 2552, and communication session information 2554.

Receiver module 2502, e.g., an OFDM receiver, receives uplink signals from a wireless terminals using the base station 2500 as an access node. The received signals include user data signals, e.g., traffic channel signals, from a plurality of wireless terminals using base station 2500 as an access node for communication through the access node. Received user data 2546 corresponding to WT 1 represents user data obtained from received signals from one exemplary wireless terminal using base station 2500 as an access node.

Transmitter module 2504, e.g., an OFDM transmitter, transmit signals to wireless terminals in its vicinity. The transmitted signals include a generated beacon signal intended to support peer to peer communications in its vicinity. The generated beacon signal includes at least one beacon signal burst and conveys information about a peer to peer frequency band. The transmitted signals also include a generated second beacon signal intended to support access node operations, the generated second beacon signal providing timing synchronization information to a plurality of wireless terminals using the base station as an access node. In some embodiments, the generated beacon signal conveying peer to peer frequency band information and the generated second beacon signal communicating access node timing synchronization information are transmitted into the same frequency band. The transmitter 2504 also transmits control data and user data to wireless terminals using the base station as an attachment point. User data to be transmitted 2548, corresponding to wireless terminal 1, is an example of user data that is transmitted by the base station 2500, e.g., in downlink traffic channel segments, to a wireless terminal using the base station as an access node. User data includes, e.g., voice, image, text, and/or file data.

In some embodiments, receiving data includes receiving data from wireless terminals using the base station as an access node in a first frequency band during a first period of time and transmitting user data into the first frequency band is performing during a second period of time which is different from the first period of time, said frequency band being used in a time division multiplexed manner. Timing information 2564, in some embodiments, identifies first and second periods of time. In various embodiments, the base station does not transmit or receive user data into a second frequency band designated to be used for peer to peer communications.

I/O interface 2508 couples the base station 2500 to other network nodes, e.g., other base station, AAA node, home agent nodes, etc. and/or the Internet. I/O interface 2508, by coupling base station 2500 to a backhaul network allows a wireless terminal using base station 2500 as its point of network attachment to participate in a communications session with another wireless terminal using a different base station as its point of network attachment.

Beacon signal generation module 2518 generates a beacon signal, said beacon signal including at least one beacon signal burst, said beacon signal burst conveying information about a peer to peer frequency band, e.g., identifying the peer to peer frequency band. Stored peer to peer beacon signal characteristic information 2528 is used by beacon signal generation module 2518 in generating the beacon signal. In some embodiments, the generated beacon signal by module 2518 conveys peer to peer communications band information 2560.

Frequency band control module 2520 controls transmission of the beacon signal generated by module 2518 into a first communications band, the beacon signal conveying information indicating a second frequency band which is used as the peer to peer frequency band, said second frequency band being different from the first frequency band. In some such embodiments, the first frequency band is the frequency band identified by peer to peer beacon signal transmission band information 2556 and the second frequency band is the frequency band identified by peer to peer communication band information 2560.

User data transmission control module 2522 controls transmission of user data to multiple ones of the plurality of wireless terminals using the base station as an access point using a transmission band identified by the base station access node information. In some embodiments, the band used for transmission of user data to a wireless terminal using the base station as a point of network attachment is the same as the first band which is the band into which the generated beacon signal for peer to peer communications is transmitted.

Transmission power control module 2524 controls transmission power into the second frequency band, which is the frequency band used for peer to peer communications, to keep the base station average transmitted power into the second frequency band over a 1 minute time period less than 1/1000 the average transmitted power transmitted into the first frequency band, e.g., the frequency band used for the beacon signal and access node related downlink signaling including user data. In some embodiments, the base station 2500 does not transmit into the second frequency band, which is used for peer to peer communications.

Access node beacon signal generation module 2526 uses the data/information 2516 including the access node beacon signal characteristic information 2534 to generate a second beacon signal, the second beacon signal providing timing synchronization information to the plurality of wireless terminals using the base station 2500 as an access node.

In some embodiments, (i) the band into which the beacon signal identifying the peer to peer band is transmitted, (ii) the band into which the beacon signal used for wireless terminal timing synchronization with regard to access node operations is transmitted, and (iii) the band used for downlink access node signaling to wireless terminal is the same band. In such embodiments, the band used for peer to peer communications is different, non-overlapping band. Thus information 2556, 2558, and 2562, in some embodiments, identify the same band, while information 2560 identifies a different band.

FIG. 28 is a drawing of an exemplary beacon signal transmission apparatus 1500 in accordance with various embodiments. Exemplary beacon signal transmission apparatus 1500 is a free standing device and does not include any transmitter used to transmit user data to an individual user device. Exemplary beacon signal transmission apparatus 1500 includes a receiver module 1502, a beacon signal transmitter 1504, a processor 1506, a solar power supply module 1508, a power supply module 1510, a memory 1512 coupled together via a bus 1514 over which the various elements may interchange data and information. The various elements (1502, 1504, 1506, 1408, 1510, 1512) are coupled to a power supply by bus 1507. Memory 1512 includes routines 1516 and data/information 1518. The processor 1506, e.g., a CPU, executes the routines 1516 and uses the data/information 1518 in memory 1512 to control the apparatus 1500 and implement methods.

Routines 1516 include a beacon signal transmission control module 1520, a beacon signal generation module 1522, a receiver control module 1524 and a received broadcast signal information recovery module 1526. Data/information 1518 includes stored beacon signal characteristic information 1528, stored beacon signal control information 1530, received broadcast signal information 1532, and beacon transmitter identification information 1534. Stored beacon signal characteristic information 1528 includes one or more sets of beacon burst information (beacon burst 1 information 1536, . . . , beacon burst N information 1538), beacon symbol information 1540, and power information 1542. Beacon burst 1 information 1536 includes information identifying beacon transmission units carrying a beacon symbol 1544 and beacon burst duration information 1546. Stored beacon signal control information 1530 includes beacon burst/frequency band/timing relationship information 1548 and beacon burst/sector/timing relationship information 1550. Received broadcast signal information 1532 includes timing information 1552.

Receiver nodule 1502 is coupled to receive antenna 1501 via which the apparatus 1500 receives signals, e.g., a signal used for timing synchronization purposes. In some embodiments, the receiver is one of a GPS, GSM and CDMA receiver. In some embodiments, the receiver is an OFDM receiver. In some embodiments the receiver module 1502 includes the capability to receive a plurality of different types of signals, and, e.g., depending upon the area of deployment a different type of signal is received and utilized as a reference source. In some such embodiments, the receiver control module 1524 follows a predetermined ordered sequence when determining reference signal search protocol.

Receiver 1502, under the control of receiver control module 1524, receives a broadcast signal and received broadcast signal information recovery module 1526 recovers received broadcast signal information 1532 from the received broadcast signal including timing information 1552, e.g., a timing reference.

Beacon signal transmitter 1504, e.g., an OFDM transmitter, is coupled to transmit antennas (sector 1 antenna 1503, . . . , sector N antenna 1505) via which the apparatus 1500 transmits beacon signal bursts which are used to support a peer-peer communications network. Beacon signal transmitter 1504 transmits a sequence of beacon signal bursts, each beacon signal burst including at least one beacon symbol. Beacon signal transmission control module 1520 uses the data/information 1518 in memory 1512 including stored beacon signal control information 1530 and timing information 1552 to control the transmission of beacon a controlling beacon signal burst transmission timing as a function of the received broadcast signal which was detected and processed. Beacon signal transmission control module 1520 uses the data/information 1518 including timing information 1552 and beacon burst/frequency band/timing relationship information 1548 to control the beacon transmitter 1504 to transmit beacon signal bursts into different frequency bands at different times. Beacon signal transmission control module 1520 uses the data/information 1518 including timing information 1552 and beacon burst/sector/timing relationship information 1548 to control the beacon transmitter 1504 to transmit beacon signal bursts into sectors at different times. In some such embodiments, the beacon signal transmission control module 1520 controls the beacon signal transmitter 1504 to transmit into at most one sector at a time.

Solar power supply module 1508 includes solar cell 1509 for converting solar energy to electrical energy such that apparatus 1500 can be, and sometimes is solar powered. Power supply module 1510 includes battery 1511 for storing energy such that apparatus can be, and sometimes is powered by battery 1511. Some embodiments include a battery power supply 1511, but do not include a solar power supply module 1508, e.g., with the batteries being replaced and/or recharged periodically. In some embodiments, apparatus 1500 is expected to operate for the duration of the battery life and then be discarded or refitted with a replacement battery. In some embodiments, the beacons signal transmission apparatus 1500 is independently powered, e.g., operating from a portable gasoline, diesel, kerosene, propane, natural gas, and/or hydrogen based, generator and/or fuel cell. Embodiments using solar, battery and/or other independent energy sources are advantageous in remote sites, where a local power grid may be unavailable and/or in areas where a power grid is unreliable. In various embodiments, beacon signal transmission power is coupled to a power grid for receiving power.

Beacon signal generation module 1522 uses the data information including stored beacons signal characteristic information 1528 and/or beacon transmitter identifications information 1534 to generate a sequence of beacon signal bursts, each beacon signal bust including at least one beacon symbol, the beacon signal burst intended to be used to support peer to peer communications. Information identifying beacon transmission units carrying a beacon symbol 1544 include, e.g., information identifying a subset of OFDM tone-symbols designated to carry a high power beacon symbol in a set of OFDM tone-symbols of beacon burst 1. Beacon burst symbol information 1540 includes information defining a beacon symbol, e.g., a modulation symbol value, while power information 1542 includes transmission power level information associated with the beacon signal. In some embodiments, each of the beacon symbols is controlled to be transmitted at the same transmission power level. In some embodiments, each of the beacon symbols corresponding to a given sector and a given frequency band are controlled to be transmitted at the same transmission power level, with at least some beacon symbols corresponding to different sectors and/or frequency bands are transmitted at different power levels.

Figure 19:
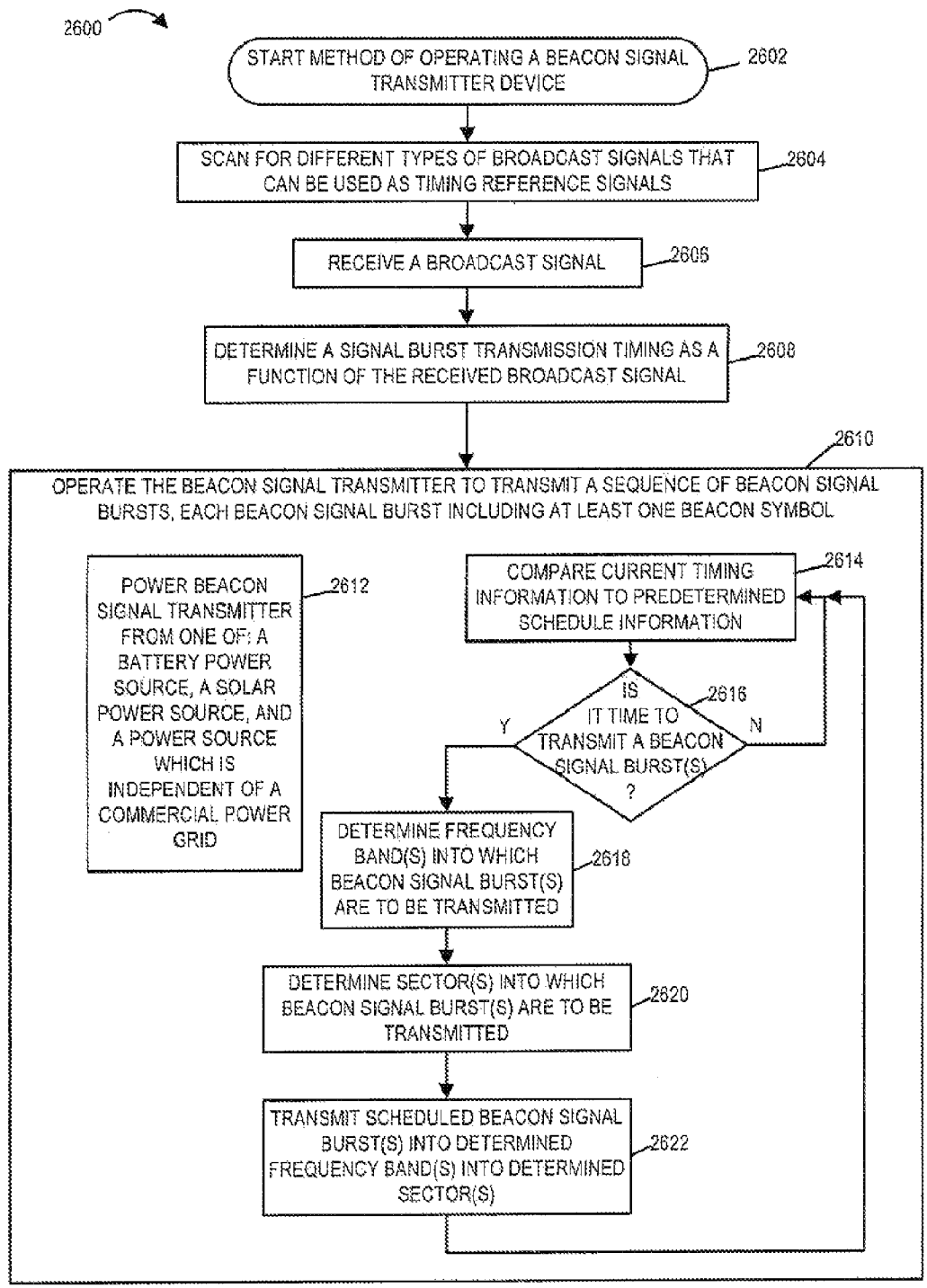
FIG. 19 is a drawing of a flowchart of an exemplary method of operating a beacon signal transmitter device in accordance with various embodiments.

FIG. 19 is a drawing of a flowchart 2600 of an exemplary method of operating a beacon signal transmitter device in accordance with various embodiments. The beacon signal transmitter device is, e.g., a free standing device, and the beacon signal transmitter device does not include any transmitter used to transmit user data to an individual user device, e.g., wireless terminal. In various embodiments, the beacon signal transmitter device includes an OFDM beacon signal transmitter for transmitting OFDM beacon signal bursts, each beacon signal burst including at least one relatively high power OFDM beacon symbol, e.g., with respect to the transmission power levels of data symbols transmitted by wireless terminals communicating in a peer to peer communications session in the local region being serviced by the beacon signal transmitter device.

Operation starts in step 2602, where the beacon signal transmitter device is powered on and initialized. Operation proceeds from start step 2602 and proceeds to step 2604. In step 2604, the beacon signal transmitter device scans for different types of broadcast signals that can be used as timing reference signals. In some embodiments, the scanning is performed based on a predetermined sequence based on at least some geographic location information. Then, in step 2606, the beacon signal transmitter device receives a broadcast signal, and in step 2608 determines a signal burst transmission timing as a function of the received broadcast signal. In some embodiments the receiver is a receiver which includes at least one of a GPS receiver, a GSM receiver, and a CDMA receiver. Operation proceeds from step 2608 to step 2610.

In step 2610, the beacon signal transmitter device is operated to transmit a sequence of beacon signal bursts, each beacon signal burst including at least one beacon symbol. Step 2610 includes sub-steps 2612, 2614, 2616, 2618, 2620, and 2622. In sub-step 2612, the beacon signal transmitter device's transmitter is powered from one of a battery power source, a solar power source, and a power source which is independent of a commercial power grid.

In sub-step 2614, the beacon signal transmitter device compares current timing information to predetermined schedule information. Operation proceeds from sub-step 2614 to sub-step 2616, in which the beacon signal transmitter device determines if it is time to transmit a beacon signal burst or bursts. If it is determined in sub-step 2616, that it is not time to transmit a beacon signal burst, then operation proceeds back to step 2614 for additional comparison of timing information. However, if it is determined in sub-step 2616 that the beacon signal transmitter device is scheduled to transmit a beacon signal burst(s), then operation proceeds to sub-step 2618, where the device determines the frequency band or bands into which the beacon signal burst(s) are to be transmitted. Operation proceeds from sub-step 2618 to sub-step 2620, in which the device determines the sector or sectors into which the beacon signal burst or bursts are to be transmitted. Then, in sub-step 2622, the beacon signal transmitter device transmits the scheduled beacon signal burst or bursts into the determined frequency band or bands into the determined sector or sectors. Operation proceeds from sub-step 2622 back to sub-step 2614 for additional time comparisons/

In various embodiment, the beacon signal transmitter device uses stored control information to determine a plurality of frequency bands into which the beacon signal bursts are to be transmitted and the timed at which the transmission of the beacon signal bursts are to occur. In some embodiments, the beacon signal transmitter device controls its transmitter to transmit beacon signal burst into different frequency bands at different times. In some embodiments, the beacon signal transmitter device controls its transmitter to use a multi-sector antenna and to transmit beacon signal bursts into different sectors at different times. In one such embodiment the beacon signal transmitter device controls its transmitter to transmit into at most one sector at a time. In some embodiments, the beacon signal transmitter device controls its transmitter to transmit into at most one frequency band at a time.

In various embodiments, the beacon signal transmitter controls its transmitter to transmit into multiple frequency bands in each of multiple sectors of a cell. In some embodiments, the beacon signal transmitter is controlled to transmit into at most one frequency band of one sector at a given time at which beacon signal bursts are transmitted.

In some embodiments, described with respect to flowchart 2600, the beacon signal transmitter device obtains an external reference from a received broadcast signal. In some embodiments, the beacon signal transmitter does not include a receiver and does not receive a reference signal. For example, the beacon signal transmitter device transmits its beacon signal bursts in accordance with stored schedule information corresponding to a recurring schedule, and the beacon signal transmitter device's timing is free running and not coordinated with any other beacon signal transmitter device.

Figure 20A:
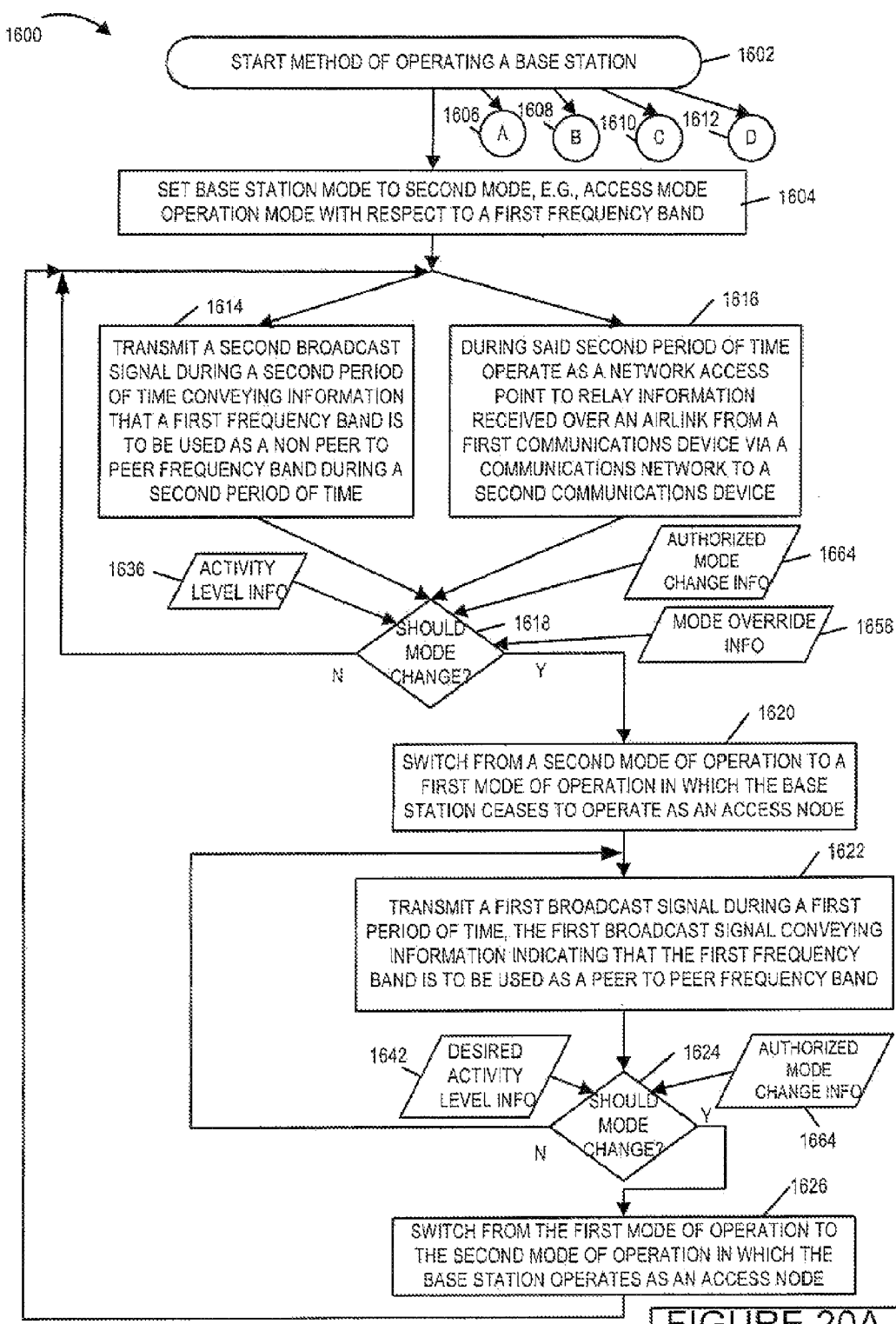
FIG. 20 comprising the combination of FIG. 20A
FIG. 20B is a drawing of a flowchart of an exemplary method of operating a base station in accordance with various embodiments.

FIG. 20 is a drawing of a flowchart 1600 of an exemplary method of operating a base station in accordance with various embodiments. The exemplary base station switches between infrastructure spectrum use and peer to spectrum use. Thus at different times spectrum, e.g., a frequency band, in the vicinity of the base station is used for different purposes. Operation starts in step 1602, where the base station is powered on and initialized and proceeds to step 1604 and connecting nodes A 1606, B 1608, C 1610 and D 1612.

In step 1604, the base station sets its mode to a second mode, e.g., an access mode operation mode with respect to a first frequency band. In this particular exemplary embodiment, the access mode with respect to the first frequency band is the start-up default mode. In other embodiments, the peer to peer mode of operation is the start-up default mode, and the base station starts up in a mode in which the first frequency band is designated to be used for peer to peer communications. Operation proceeds from step 1604 to steps 1614 and step 1616.

In step 1614, the base station transmits a second broadcast signal during a second period of time conveying information that a first frequency band is be used as a non-peer to peer frequency band during a second period of time. In step 1616, during the second period of time, the base station operates as a network access point to relay information received over an airlink from a first communications device via a communications network to a second communications device. Operation proceeds from step 1614 and step 1616 to step 1618.

Returning to connecting node A 1606, operation proceeds via connecting node A 1606 to step 1628, where the base station monitors communications activity level during the second mode of operation. Operation proceeds from step 1628 to step 1630, in which the base station checks whether the activity is below a predetermined threshold. If the level of activity is below a predetermined threshold, then operation proceeds to step 1632, where the activity level information 1636 is updated to indicate a low level of activity, e.g., corresponding to a level in which the mode is to be switched in response to the determined low level. If the activity level is not below the threshold, then operation proceeds from step 1630 to step 1634 in which the base station updates the activity level information 1636 to indicate that the threshold is above the mode switch threshold e.g., the base station should remain in the second mode based on the current level of activity. In some embodiments, the predetermined threshold corresponds to one wireless terminal currently using the base station as a network attachment point. In some embodiments the predetermined threshold corresponds to one wireless terminal currently using the base station as a network attachment point and communicating at least some user data via the base station from and/or to that wireless terminal. Operation proceeds from step 1632 or step 1634 to step 1628 for additional monitoring.

Returning to connecting node B 1608, operation proceeds via connecting node B 1608 to step 1638, where the base station monitors for signals from wireless terminals, while in a first mode of operation, indicating that a wireless terminal is seeking to use the base station as an access point. Then, in step 1640, the base station checks if a signal detected in step 1638. If a signal was detected operations proceeds from step 1640 to step 1642, where the base station updates the desired activity level information 1644. Operation proceeds from step 1642 to step 1638 for additional monitoring. If a signal was not detected in step 1640, operation proceeds from step 1640 to step 1638 for additional monitoring.

Returning to connecting node C 1610, the operation proceeds via connecting node C 1610 to step 1646, where the base station monitors for an override condition to occur. Step 1646 includes sub-step 1648 and sub-step 1650. In sub-step 1648, the base station monitors for receipt of a control signal indicating preemption of the first frequency band, e.g., by a government organization. In sub-step 1650, the base station monitors for receipt of a control signal indicating of preemption of the first frequency band, e.g., by a high priority user. Operation proceeds from step 1646 to step 1652.

In step 1652, the base station determines if a condition used to override the second mode of operation has occurred. If a condition has occurred, then operation proceeds from step 1652 to step 1654, where the base station updates the mode override information 1656; otherwise operation proceeds from step 1652 to step 1646 for additional monitoring. Operation proceeds from step 1654 to step 1646 for additional monitoring.

Returning to connecting node D 1612, operation proceeds via connecting node D 1612 to step 1658, where the base station monitors for a mode change signal from a wireless terminal indicating that the wireless terminal has the authority to alter the current mode of base station operation. In some embodiments, the information indicating that the wireless terminal has the authority to alter the current mode of base station operation is one of a wireless terminal identifier, priority level indicated and a wireless terminal user identifier. Operation proceeds from step 1658 to step 1660, in which the base station determines whether such a mode change signal has occurred. If an authorized mode change signal has been detected, operation proceeds from step 1660 to step 1662, where the base station updates the authorized mode change information 1664; otherwise operation proceeds from step 1660 to step 1658 for additional monitoring. Operation proceeds from step 1662 back to step 1658 for additional monitoring.

Returning to step 1618, in step 1618, the base station makes a mode change determination as a function of the activity level information 1636, authorized mode change information 1664, and/or mode override information 1656. If the determination in step 1618, is that the mode should change, then operation proceeds to step 1620, where the base station switches from a second mode of operation to a first mode of operation in which the base station ceases to operate as an access node; otherwise operation proceeds from step 1618 to the input of steps 1614 and 1616 and operation continues in the second mode.

From step 1620, operation proceeds to step 1622, where the base station transmits a first broadcast signal during a first period of time, the first broadcast signal conveying information indicating that the first frequency band is to be used as a peer to peer frequency band. Operation proceeds from step 1622 to step 1624, where the base station determines whether the mode should be changed. The base station uses the desired activity level information 1642 and/or authorized mode change information 1664 in deciding whether to implement a mode change. If the decision of step 1624 is that the mode should be changed, then operation proceeds to step 1626, where the base station switches from the first mode of operation to the second mode of operation in which the base station operates as an access node; otherwise operation proceeds from step 1624 to the input of step 1622, and the base station continues to operate in the first mode, e.g., a mode supporting use of the first frequency band as a peer to peer band. Operation proceeds from step 1626 to the inputs of steps 1614 and step 1616, where the base station operates in the second mode as an access node.

Figure 21:
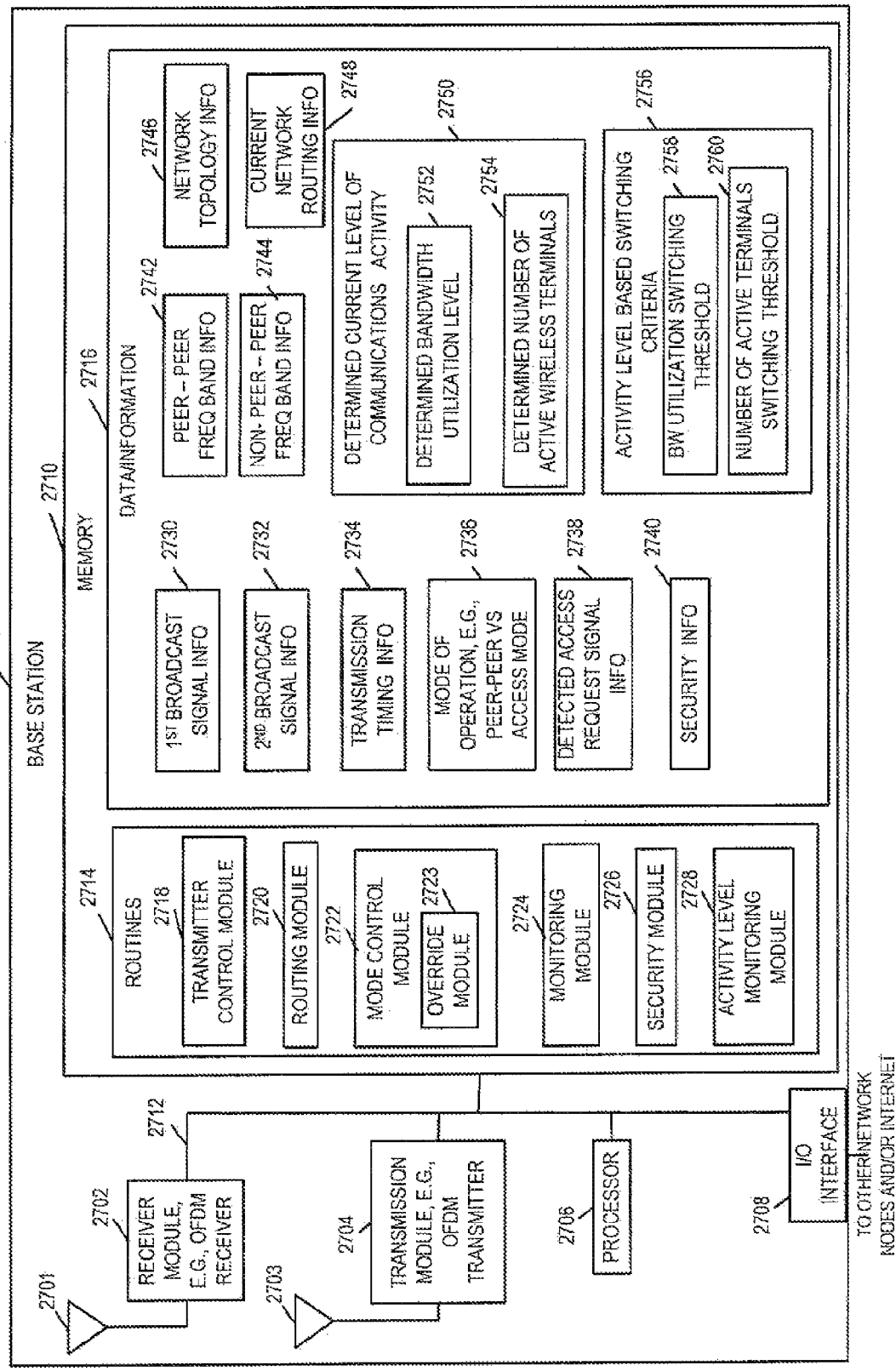
FIG. 21 is a drawing of an exemplary base station in accordance with various embodiments.

FIG. 21 is a drawing of an exemplary base station 2700 in accordance with various embodiments. Exemplary base station 2700 includes the capability to control reallocation of frequency spectrum between infrastructure use, e.g., with the communications being directed through the base station 2700 functioning as an access node, and peer to peer spectrum use in which direct communications links between peer wireless terminals are used.

Exemplary base station 2700 includes a receiver module 2702, a transmission module 2704, a processor 2706, an I/O interface 2708, and memory 2710 coupled together via a bus 2712 over which the various elements may interchange data and information. Memory 2710 includes routines 2714 and data/information 2716. The processor 2706, e.g., a CPU, executes the routines 2714 and uses the data/information 2716 in memory 2710 to control the operation of the base station and implement methods, e.g., the method of FIG. 20.

Receiver module 2702, e.g., an OFDM receiver, is coupled to receive antenna 2701 via which the base station 2700 receives signals from wireless terminal, e.g., when the base station is functioning as an access node. Transmission module 2704, e.g., in OFDM transmitter is coupled to transmit antenna 2703, via which the base station 2700 transmits signals to wireless terminals. The transmitted signals include broadcast signals such as beacon signals used to identify whether a frequency spectrum is to be used in an access mode of operation or in a peer to peer communications session mode of operation. When the base station 2700 is using spectrum in an access mode of operation the transmitter 2704 also transmits downlink signals, e.g., a pilot channel signals, control channel signals and user data signals, e.g., traffic channel signals to wireless terminals using the base station 2700 as a point of network attachment.

Transmission module 2704 transmits a $1^{st}$ broadcast signal during a $1^{st}$ period of time, the first broadcast signal conveying information indicating that a first frequency band is to be used as a peer to peer frequency band, and transmits a second broadcast signal during a second period of time, the second broadcast signal conveying information indicating that the first frequency band is to be used as a non-peer to frequency band during the second period of time. In some embodiments, the $1^{st}$ and 2nd broadcast signals are beacon signals, e.g., OFDM beacon signals. $1^{st}$ broadcast signal is generated by base station 2700 based upon $1^{st}$ broadcast signal information 2730, e.g., information identifying beacon symbols in beacon signal bursts and timing beacon burst timing informnation representing the $1^{st}$ broadcast signal, conveys peer to peer frequency band information. $2^{nd}$ broadcast signal is generated by base station 2700 based upon $2^{nd}$ broadcast signal information 2732 e.g., information identifying beacon symbols in beacon signal bursts and timing beacon burst timing information representing the $2^{nd}$ broadcast signal conveys non-peer to peer frequency band information 2744. Thus a wireless terminal can monitor for the presence of $1^{st}$ and $2^{nd}$ broadcast signals from base station 2700 and depending upon which one is detected, determine how the first frequency band is currently being used.

I/O interface 2708 couples the base station 2700 to other network nodes, e.g., other base station, AAA node, home agent nodes, etc. and/or the Internet. I/O interface 2708, by coupling base station 2700 to a backhaul network allows a wireless terminal using base station 2700 as its point of network attachment to participate in a communications session with another wireless terminal using a different base station as its point of network attachment.

Routines 2714 include a transmitter control module 2718, a routing module 2720, a mode control module 2722, a monitoring module 2724, a security module 2726, and an activity level monitoring module 2728. The mode control module 2722 includes an override module 2723. Data/information 2716 includes $1^{st}$ broadcast signal information 2730, $2^{nd}$ broadcast signal information 2732, transmission timing information 2734, mode of operation information 2736, detected access request signal information 2738, security information 2740, peer to peer frequency band information 2742, non-peer to peer frequency band information 2744, network topology information 2746, current network routing information 2748, determined current level of communications activity information 2750 and activity level based switching criteria 2756. The determined current level of communications activity information 2750 includes a determined bandwidth utilization level 2752 and a determined number of active wireless terminal users 2754. Activity level based switching criteria 2756 includes a bandwidth utilization switching threshold 2758 and a number of active terminals switching threshold 2760.

Transmitter control module 2718 controls the transmission module 2704 to transmit said first and second broadcast signals during said first and second periods of time, respectively, said first and second periods of time being non-overlapping. Routing module 2720, which is used during the second period of time, routes user data received over an airlink from a first communications device to a second communications device via a communications network coupled to said base station. Routing nodule 2720 uses network topology information 2746 and current network routing information 2748, e.g., information identifying congestion locations, failed nodes, alternative routing costs, delay consideration information, etc., to determined user data routing.

Mode control module switches between first and second modes of operation. The current mode of operation into which the base station has been switched is indicated by mode of operation information 2736. The first mode of operation corresponds to a mode during the first periods of time in which the first frequency band is being utilized as a peer to peer frequency band, while the second mode of operation is a mode of operation in which the first frequency band is being utilized for non peer to peer communications with base station 2700 serving as an access node. When the mode control module 2722 switches from the second mode of operation to the first mode of operation the mode control module 2722 stops the base station 2700 from acting as an access node, e.g., with regard to the first frequency band in the region into which the $1^{st}$ broadcast signal transmission is directed.

Monitoring module 2724 monitors for and detects signals from wireless terminals that are seeking to use the base station 2700 as an access node. For example, the base station 2700 may be currently in the first mode of operation in which the first band is being used for peer to peer communications; however, a wireless terminal may desire that the base station reallocate the spectrum to access node operation, and send an access request signal to the base station which is detected and recovered by monitoring module 2724. The recovered information is e.g., detected access request signal information. In some embodiments, the detected access request signal information includes information indicating that the wireless terminal making the request has the authority to command the requested change. For example, the information indicating that the wireless terminal has the authority to alter the current mode of base station operation is, in some embodiments communicated by one of a wireless terminal identifier, a priority level indicated, and a wireless terminal user identifier. Security information 2740 includes information utilized in making authorization evaluations, e.g., lists of authorized users, wireless terminal, and/or priority level interpretation information. The base station 2700 considers the request in making a decision as to whether or not to switch modes. For example, the base station switches from the first mode of operation to the second mode of operation in response to a signal received from a wireless terminal indicating that the wireless terminal is seeking to use the base station as an access node.

Security module 2726, using security information 2740, determines that a signal requesting a mode change is from a wireless terminal or user having the authority to command the requested mode changed.

Activity level monitoring module 2728 determines the level of communications activity 2750 while the base station is in the second mode of operation functioning as an access node. The mode control module 2722 is responsive to a low activity level, which it uses to initiate a switch from the second mode of operation to the first mode of operation. In some embodiments, at some times, a low level of activity is indicated by determined bandwidth utilization level 2752 being below a predetermined threshold, the bandwidth utilization switching threshold 2758. In some embodiments, at some times, a low level of activity is indicated by determined number of active wireless terminals 2754 being below a predetermined threshold, the number of active terminals switching threshold 2760. In various embodiments, the determined number of active wireless terminals 2754 indicates the number of wireless terminals currently using the base station as an access point. In some embodiments, the number of active terminals switching threshold is set to 1.

Override module 2723 detects when a current mode override condition occurs. The current mode override condition is, e.g., the receipt of a control signal indicating preemption of the first frequency band. The preemption can be, and sometimes is, by a government organization. Alternatively, the preemption can be, and sometimes is, by a high priority user. The control signal can be communicated over an airlink and received via receive module 2702 or communicated over the backhaul network and received via I/O interface 2708.

Figure 22:
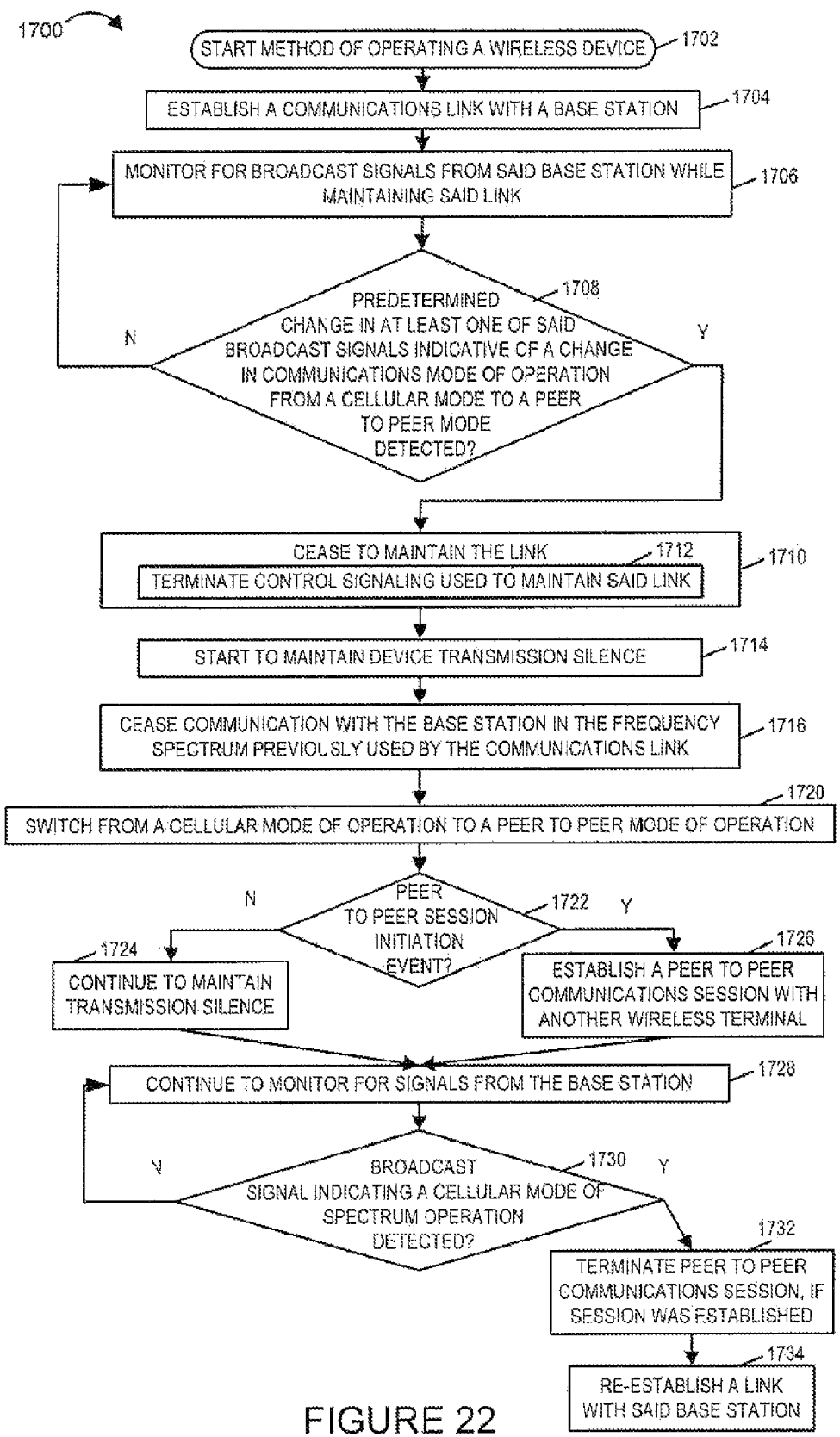
FIG. 22 is a drawing of a flowchart of an exemplary method of operating a wireless device, e.g., a mobile node, in accordance with various embodiments.

FIG. 22 is a drawing of a flowchart 1700 of an exemplary method of operating a wireless device, e.g., a mobile node, in accordance with various embodiments. Operation starts in step 1702, where the wireless device is powered on and initialized and proceeds to step 1704, where the wireless device establishes a communications link with a base station. Then, in step 1706, the wireless device monitors for broadcast signals from the base station while maintaining the link. Operation proceeds from step 1706 to step 1708.

In step 1708, the wireless device checks whether a predetermined change in at least one of said broadcast signals indicative of a change in communications mode of operation from a cellular mode to a peer to peer node has been detected.

In some embodiments, the change in at least one of said broadcast signals is a change in a beacon signal, e.g., a change in an OFDM beacon signal being transmitted by the base station. In some such embodiments, the change includes a change in information communicated by the beacon signal. In various embodiments the information communicated by the beacon signal indicates a peer to peer mode of frequency spectrum use after said change. If in step 1708 the wireless device detected a change in a broadcast signal indicative of a change in communications mode of operation from a cellular mode to a peer to peer mode, then operation proceeds from step 1708 to step 1710; otherwise operation proceeds from step 1708 to step 1706 for additional monitoring.

In step 1710, the wireless device, in response to detecting the change, ceases to maintain the link. Step 1710 includes sub-step 1710 in which the wireless device terminates control signaling used to maintain said link. Operation proceeds from Step 1710 to step 1714, in which the wireless device starts to maintain transmission silence. Then, in step 1716, the wireless device ceases communication with the base station in the frequency spectrum previously used by the communications link. Operation proceeds from stop 1716 to step 1720. In step 1720, the wireless device switches from a cellular mode of operation to a peer to peer mode of operation. Operation proceeds from step 1720 to step 1722.

In step 1722, the wireless device checks for a peer to peer session initiation event. For example, a session initiation event is, e.g., a signal from a peer requesting session establishment, or a decision by the wireless device to attempt to establish a peer session with another wireless terminal detected or known to be in the region. In response to a session initiation event, operation proceeds from step 1722 to step 1726, where the wireless device establishes a peer to peer communications session with another wireless terminal. If a peer to peer session initiation event was not detected, then operation proceeds from step 1722 to step 1724, where the wireless device continues to maintain transmission silence. In some other embodiments, while in the peer to peer mode, the wireless device transmits some broadcast signals, e.g., some user beacon signals, irrespective of whether or not the wireless terminal is in a communications session.

Operation proceeds form step 1724 or step 1726 to step 1728, where the wireless device continues to monitor for signals from the base station, e.g., broadcast signals such as beacon signals conveying spectrum usage information. Operation proceeds from step 1728 to step 1730. In step 1730, the wireless device determines whether a broadcast signal indicating a cellular mode of operation was detected. If such a signal was detected, operation proceeds from step 1730 to step 1732; otherwise, operation proceeds from step 1730 to step 1728 for additional monitoring.

In step 1732, the wireless device terminates the peer to peer communications session with said another terminal, if such a session was established. Then, in step 1734, the wireless device re-establishes a link with the base station, e.g., with the wireless device having remained in the coverage area corresponding to the base station between the time the link ceased to be maintained and the time the link was re-established.

Figure 23:
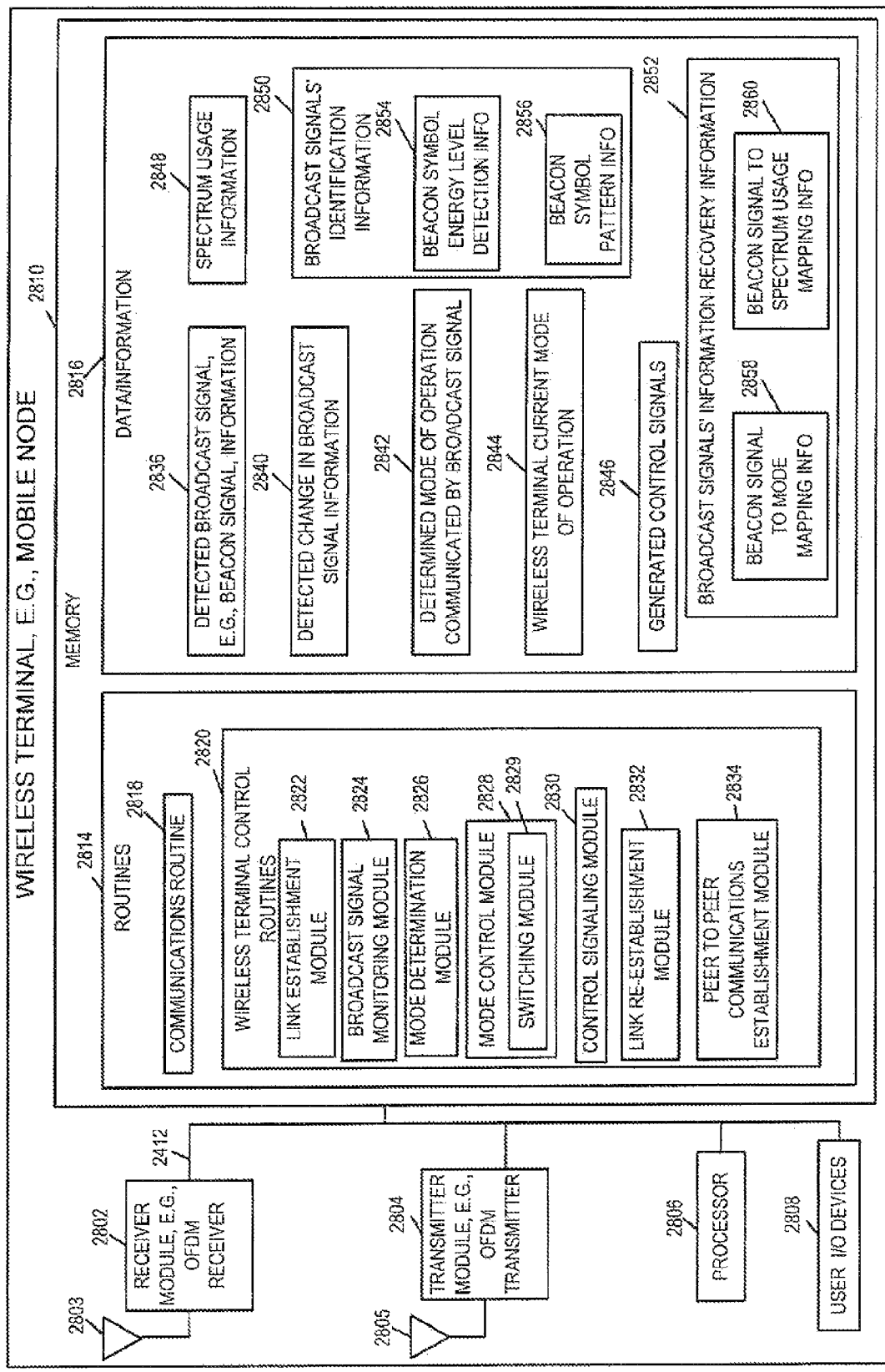
FIG. 23 is a drawing of an exemplary wireless terminal, e.g., mobile node in accordance with various embodiments.

FIG. 23 is a drawing of an exemplary wireless terminal 2800, e.g., mobile node in accordance with various embodiments. Exemplary wireless terminal 2800 can, and sometimes does, switch between a cellular operation mode and a peer to peer operational mode in response to received broadcast signals, e.g., beacon signals. Wireless terminal 2800 includes a receiver module 2802, a transmitter module 2804, a processor 2806, user I/O devices 2808, and memory 2810 coupled together via a bus 2412 over which the various elements may interchange data and information. Memory 2810 includes routines 2814 and data/information 2816. The processor 2806, e.g., a CPU, executes the routines 2814 and uses the data/information 2816 in memory 2810 to control the operation of the wireless terminal 2800 and implement methods, e.g., a method in accordance with FIG. 22.

Routines 2814 include a communications routine 2818 and wireless terminal control routines 2820. The communications routine 2818 implements the various communications protocols used by the wireless terminal 2800. Wireless terminal control routines 2820 include a link establishment module 2822, a broadcast signal monitoring module 2824, a mode determination module 2826, a mode control module 2828, a control signaling module 2830, a link re-establishment module 2832, and a peer to peer communications establishment module 2834. Mode control module 2828 includes switching module 2829.

Data/information 2816 includes detected broadcast signal information 2836, detected change in broadcast signal information 2840, determined mode of operation communicated by broadcast signaling 2842, spectrum usage information 2848, wireless terminal current mode of operation information 2844, and generated control signals 2846. Data/information 2816 also includes broadcast signals' identification information 2850 and broadcast signals' information recovery information 2852. The broadcast signals' identification information 2850 includes beacon symbol energy level detection information 2854, and beacon symbol pattern information 2856. Broadcast signals' information recovery information 2852 includes beacon signal to mode mapping information 2858 and beacon signal to spectrum usage mapping information 2860.

Receiver module 2802, e.g., an OFDM receiver, is coupled to receive antenna 2803 via which the wireless terminal receives signals. Receiver module 2802 receives broadcast signals from base stations. The broadcast signals include, e.g., beacon signaling used to communicate a current mode of spectrum usage. When the base station is functioning as an access node, the wireless terminal receiver 2802 can, and sometimes does, receive control signals and user data signals from the base station in the spectrum. When the spectrum is being utilized for peer to peer communications, the wireless terminal receiver 2802 can, and sometimes does, receive signals directly from a peer wireless terminal, e.g., user beacon signals, peer to peer session establishment signals, and user data signals as part of a peer to peer communication session.

Transmitter module 2804, e.g., an OFDM transmitter, is coupled to transmit antenna 2805 via which the wireless terminal 2800 transmits signals. In some embodiments, the same antenna is used by the transmitter and receiver. Transmitted signals include, e.g., access node based session establishment signals, peer to peer node session establishment signals, control signal to an access node as part of maintaining a link with the access node, user data signals to an access node, and user data signals to a peer node as part of a peer to peer communication session.

User I/O devices 2808 include, e.g., key pad, keyboard, switches, mouse, microphone, speaker, display, etc. User I/O devices 2808 are used for operations including inputting user data, accessing output user data, and controlling at least some functions and operations of the wireless terminal, e.g., initiating a communications session.

Link establishment module 2822 establishes a communications link with a base station. Broadcast signal monitoring module 2824 monitors to detect broadcast signals from base stations. Mode determination module 2826 determines a communications mode of operation from at least one broadcast signal from a base station detected by the monitoring of module 2824. In various embodiments, the broadcast signal from the base station used by the mode determination module 2826 for its determination is a beacon signal. In some embodiments, the mode determination is based on a change in a beacon signal, e.g., as indicated in detected change in broadcast signal information 2840. In some such embodiments, the change indicates a change in information communicated by the beacon signal. For example, the information communicated by the beacon signal indicates a peer to peer frequency spectrum use after the change, while the beacon signal information before the change indicates a cellular mode usage of the spectrum. As another example, the information communicated by the beacon signal indicates a cellular mode spectrum use after the change, while the beacon signal information before the change indicates a peer to peer mode usage of the spectrum.

Mode control module 2828 controls the wireless terminal 2800 to operate in the mode determined by the mode determination module 2826. The mode control module 2828 can and sometimes does, drop an established link with a base station when the mode determination module 2826 indicates a change in a communication mode of operation from a cellular mode to a peer to peer mode of operation. Switching module 2829 switches the wireless terminal 2800 from a cellular mode of operation to a peer to peer mode of operation in response to detecting a predetermined change in at least one of the broadcast signals. Wireless terminal current mode of operation 2844 indicates the current mode of wireless terminal operation, e.g., cellular mode or peer to peer mode, into which the wireless terminal has been switched.

Control signaling module 2830 generates control signals 2846 to maintain an established link with a base station. Generated control signals 2846 include, e.g., power control signals, timing, control signals, control channel report signals such as SNR reports, etc. When the mode control module 2828 drops an established link with a base station, the mode control module 2828 controls the control signaling module 2830 to stop generating control signals used to maintain the link.

Link re-establishment module 2832 re-establishes a link with a base station in response to detecting a broadcast signal indicating a cellular mode of operation. Peer to peer communications establishment module 2834 is used to establish a peer to peer communications session with another wireless terminal, e.g., during at least a portion of the time between which said link is ceased to be maintained with the base station and the link is re-established with the base station.

Detected broadcast signal information 2836, e.g., detected beacon signal information is an output of broadcast signal monitoring module 2824. Broadcast signal monitoring module 2824 uses the data/information 2816 including the broadcast signals' identification information 2850 to detect beacon signals. Beacon symbol energy level detection information 2854 includes energy level criteria used for identifying beacon symbols from among a plurality of received signals. For example a beacon signal includes a beacon signal burst including at least a beacon symbol and the beacon symbol is transmitted at a relatively high energy level with respect to other signals transmitted by the base station, facilitating easy detection by a wireless terminal. Beacon symbol pattern information 2856 includes information identifying sets of beacon symbols with a set of beacon symbol transmission units. For example, a particular pattern of beacon symbols may, and sometimes does, represent a particular beacon signal.

Mode determination module 2826 uses the data/information 2816 including the broadcast signals' information recovery information 2852 to determine a mode of operation being communicated by the broadcast signal 2842, e.g., one of a cellular mode and a peer to peer mode, and spectrum usage information 2848, e.g., one of a cellular mode spectrum allocation and a peer to peer mode spectrum allocation. In some embodiments the cellular mode spectrum usage information further identifies one of a time division duplex use of spectrum and a frequency division duplex use of spectrum. For example, the base station when functioning as an access node may operate in a TDD manner in which the spectrum is alternately used for downlink and uplink, or the base station may operate using two distinct bands for uplink and downlink which allow simultaneous uplink and downlink signaling.

Figure 24:
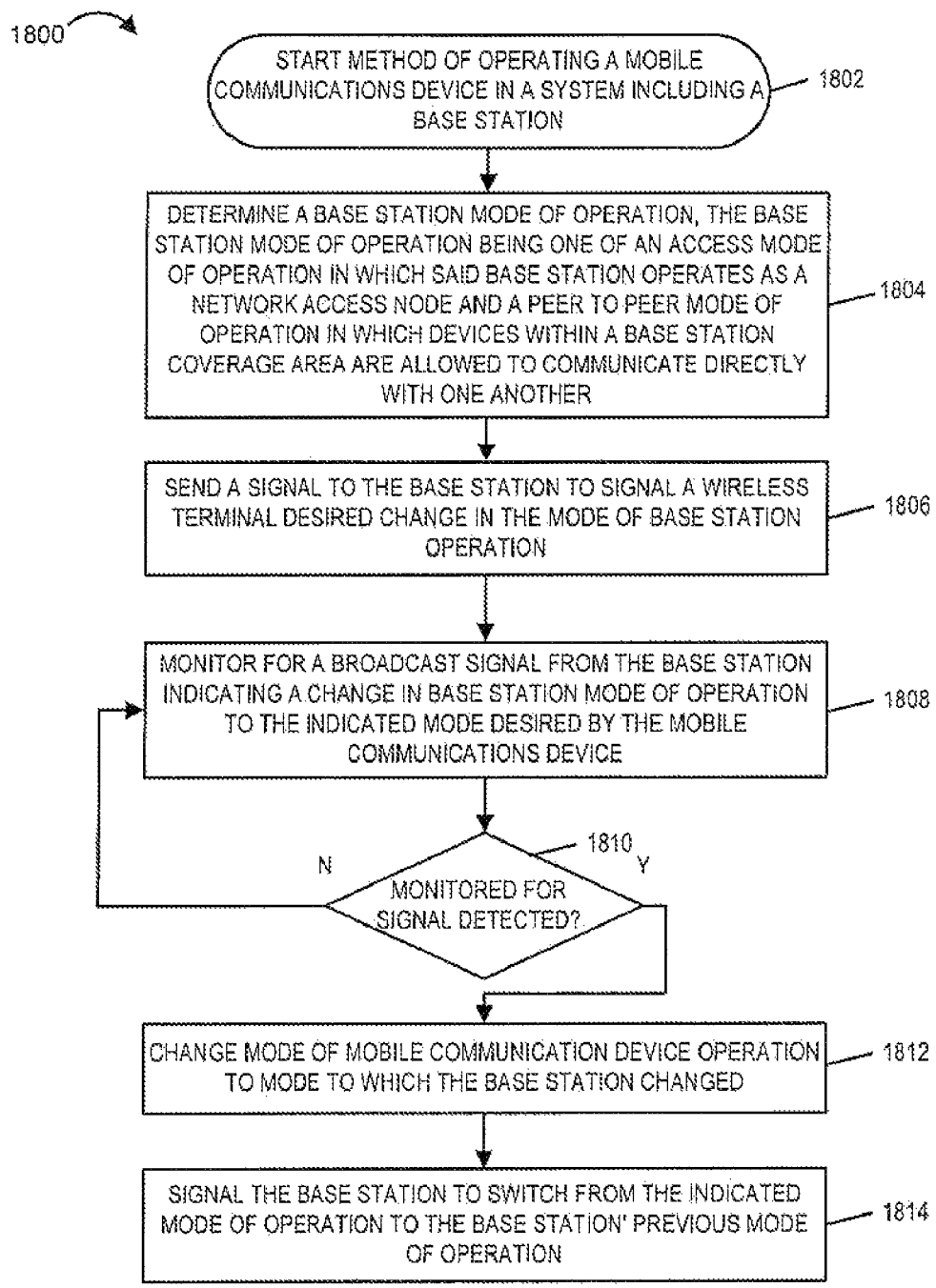
FIG. 24 is a drawing of a flowchart of an exemplary method of operating a mobile communications device in a system including a base station in accordance with various embodiments.

FIG. 24 is a drawing of a flowchart 1800 of an exemplary method of operating a mobile communications device in a system including a base station in accordance with various embodiments. Operation starts in step 1802, where the mobile communications device is powered on and initialized and proceeds to step 1804. In step 1804, the mobile communications device determines a base station mode of operation, the base station mode of operation being one of an access mode of operation in which the base station operates as a network access node and a peer to peer mode of operation in which devices within a base station coverage area are allowed to communicate directly with one another. Operation proceeds from step 1804 to step 1806.

In step 1806, the mobile communications device sends, a signal to a base station to signal a wireless terminal desired change in the mode of base station operation. Then, in step 1808, the mobile communications device monitors for a broadcast signal from the base station indicating a change in base station mode of operation to the indicated mode desired by the mobile communications device. Operation proceeds from step 1808 to step 1810. In step 1810, the mobile communications device checks if the monitored for signal has ben detected. If the monitored for signal was detected, then operation proceeds from step 1810 to step 1812; otherwise, operation proceeds from step 1810 to step 1808 for additional monitoring. In some embodiments, a timeout is associated with the duration of the monitoring, and if the mobile communications device does not receive the monitored for signal within the allocated time, the mobile communications device needs to resend the desired change signal.

In step 1812, the mobile communications device changes the mode of the mobile communications device operation to the mode to which the base station has changed. Operation proceeds from step 1812 to step 1814. In step 1814, the mobile communications device signals the base station to switch from the indicated mode of operation to the base station's previous mode of operation.

In some embodiments, the signal of step 1804 indicates a desire for a change from a network access mode of operation to a peer to peer mode of operation. In some embodiments, the signal of step 1804 includes information indicating a level of authority said mobile communications device has to control the base station operation. In some such embodiments, the information indicating the level of authority is one of a device identifier, user identifier, and priority level indicator.

In various embodiments, the mobile communications device is a device used by a government agent with authority to override use of the spectrum used by the base station.

In some embodiments, the mobile communications device is a cellular network device and the desired change of step 1806 is a change from a peer to peer mode to a network mode of operation. In some such embodiments, the cellular network device does not support peer to peer operation.

In various embodiments, the mobile communications device is a peer to peer device and the desired change is a change from a network access mode to a peer to peer mode of operation. In some such embodiments, the peer to peer device does not support a cellular network mode of operation. In some embodiments the peer to peer device which does not support a cellular network mode of operation is a device used by a government agent with authority to override the use of the spectrum by the base station.

Figure 25:
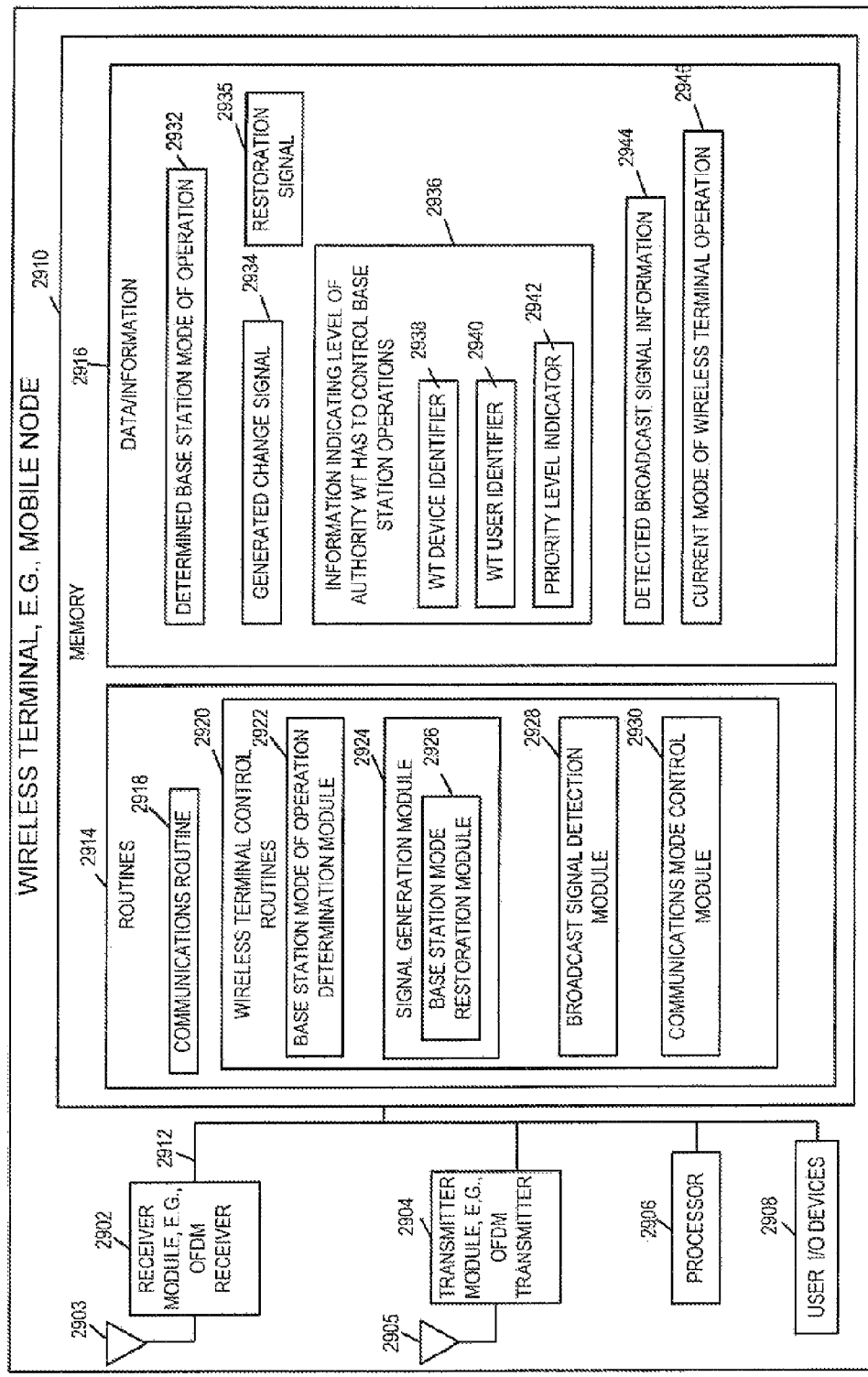
FIG. 25 is a drawing of an exemplary wireless terminal, e.g., mobile node, in accordance with various embodiments.

FIG. 25 is a drawing of an exemplary wireless terminal 2900, e.g., mobile node, in accordance with various embodiments. Exemplary wireless terminal 2900 includes the capability to influence a base station's mode of operation, e.g., requesting and/or commanding switching between a cellular mode and a peer to peer mode.

Exemplary wireless terminal 2900 includes a receiver module 2902, a transmitter module 2904, a processor 2906, user I/O devices 2908, and memory 2910 coupled together via a bus 2912 over which the various elements may exchange data and information. Memory 2910 includes routines 2914 and data/information 2916. The processor 2906, e.g., a CPU, executes the routines 2914 and uses the data/information 2916 in memory 2910 to control the operation of the wireless terminal and implement methods, e.g., a method in accordance with FIG. 24.

Routines 2914 include communications routine 2918 and wireless terminal control routines 2920. The wireless terminal control routines 2920 include a base station mode of operation determination module 2922, a signal generation module 2924, a broadcast signal detection module 2928 and a communications mode control module 2930. The signal generation module 2924 includes a base station mode restoration module 2926.

Data/information 2916 includes a determined base station mode of operation 2932, a generated change signal 2934, and stored information indicating the level of authority the wireless terminal has to control the base station operations 2936. Information 2936 includes a wireless terminal device identifier 2938, a wireless terminal user identifier 2940, and a priority level indicator 2942. Data/information 2916 also includes detected broadcast signal information 2944 and current mode of wireless terminal operation information 2946.

The receiver module 2902, e.g., an OFDM receiver, is coupled to receive antenna 2903 via which the wireless terminal 2900 receives signals. Received signals include received broadcast signals, e.g., beacon signals from a base station from which a base station mode of operation can be determined.

Transmitter module 2904 e.g., an OFDM transmitter, is coupled to transmit antenna 2905, via which the wireless terminal 2900 transmits signals. Transmitted signals include generated change signal 2934 conveying a wireless terminal 2900 desire for a base station to change its mode of operation. Transmitter module 2904 sends the generated change signal 2934 to the base station to communicate the wireless terminal's desired change in the base stations mode of operation. The generated change signal 2934 can be, and sometimes is, a request for the base station to change modes. The generated signal 2934 can be, and sometimes is, a command to the base station to change its mode of operation.

User I/O devices 2908 include, e.g., keypad, keyboard, switches, mouse, microphone, speaker, display, etc. User I/O devices 2908 are used for operations including inputting user data, accessing output user data, and controlling at least some functions and operations of the wireless terminal, e.g., initiating a communications session. In some embodiments, the user I/O devices 2908 include a special purpose key, switch or button, for use to command a mode switch of the base station. For example, the wireless communications device 2900 is used by a government agent with authority to override use of the spectrum by the base station and includes a special purpose button on the wireless terminal, which when depressed, initiates the generation and transmission of a mode change control signal directed to the base station.

Communications routine 2918 implements the various communications protocols used by the wireless terminal 2900. Base station mode of operation determination module 2922 determines a base station's mode of operation the base station mode of operation being one of an access node mode of operation in which the base station operates as a network access node and a peer to peer mode of operation in which devices within a base station coverage area are allowed to communicate directly with one another. Determined base station mode of operation 2932 is an output of determination module 2922.

Signal generation module 2924 generates a signal change signal 2934 indicating a wireless terminal desired change in the base station's mode of operation. At times, the generated change signal 2934 indicates a desire for a change from a network access mode of operation to a peer to peer mode of operation. At times, the generated change signal 2934 indicates a desire for a change from a peer to peer mode of operation to network access mode of operation.

In some embodiments, die change signal conveys a level of authority associated with the change signal. The level of authority, in some embodiments, is based on one or more of wireless terminal identifier, user identifier, and a priority level indicator. In some embodiments, wireless terminal 2900 has a fixed level of authority associated with the device. In some embodiments, wireless terminal 2900 has a variable level of authority e.g., which changes a function of user identification information and/or priority level access code information. In some such embodiments, the user I/O devices 2908 include a biometric input device for receiving biometric information corresponding to the user, the input biometric information being used to obtain/authenticate authorization information.

Base station mode restoration module 2926 generates a restoration signal 2935 to be communicated to a base station, the restoration signal to signal the base station to switch from the indicated mode of operation communicated by the previous change signal to the base station, the indicated mode being the mode in which the base station is currently operating, to the previous mode of base station operation.

Broadcast signal detection module 2928 detects a broadcast signal which indicates that the base station has changed the base station mode of operation to an indicated mode of operation desired by the wireless terminal. Detected broadcast signal information 2944 is an output of detection module 2928. In various embodiments, the detected broadcast signals are beacon signals, e.g., OFDM beacon signal.

Communications mode control module 2930 changes the operational mode of the mobile communications device, as indicated by current mode of wireless terminal operation, to match the mode of base station operation to which the base station has transitioned as indicated by a detected broadcast signal. In various embodiments, the wireless terminal 2900 supports communications sessions in both cellular, e.g., access node based mode and peer to peer mode. In some embodiments, the wireless terminal does not support communications sessions in one of the cellular and peer to peer modes of operation. In some such embodiments, the wireless terminal enters a standby state while the spectrum is allocated for the mode in which the wireless terminal can not participate in a communication session, e.g., conserving power.

In some embodiment, the wireless terminal 2900 is a device used by a government agent with the authority to override use of the spectrum used by a base station. In some embodiments, the wireless terminal 2900 is a cellular network device, and the wireless terminal indicates a desired change from a peer to peer to a network access mode of operation. In some such embodiment, the cellular network device does not support peer to peer communications. In some embodiments, the wireless terminal 2900 is a peer to peer device, and the wireless terminal indicates a desired change from a network access mode of operation to a peer to peer mode of operation. In some such embodiments, the cellular network device does not support a cellular network mode of operation. In some embodiments, the wireless terminal is a mobile communications device used by a government agent with authority to override use of the spectrum by the base station.

In one embodiment, which is a variation based on wireless terminal 2900, the wireless terminal is a mobile communications device used by a government agent with the authority to override the use of spectrum by the base station, and the device communicates mode change command signals, but does not support either access node based or peer to peer based communications sessions.

Figure 26:
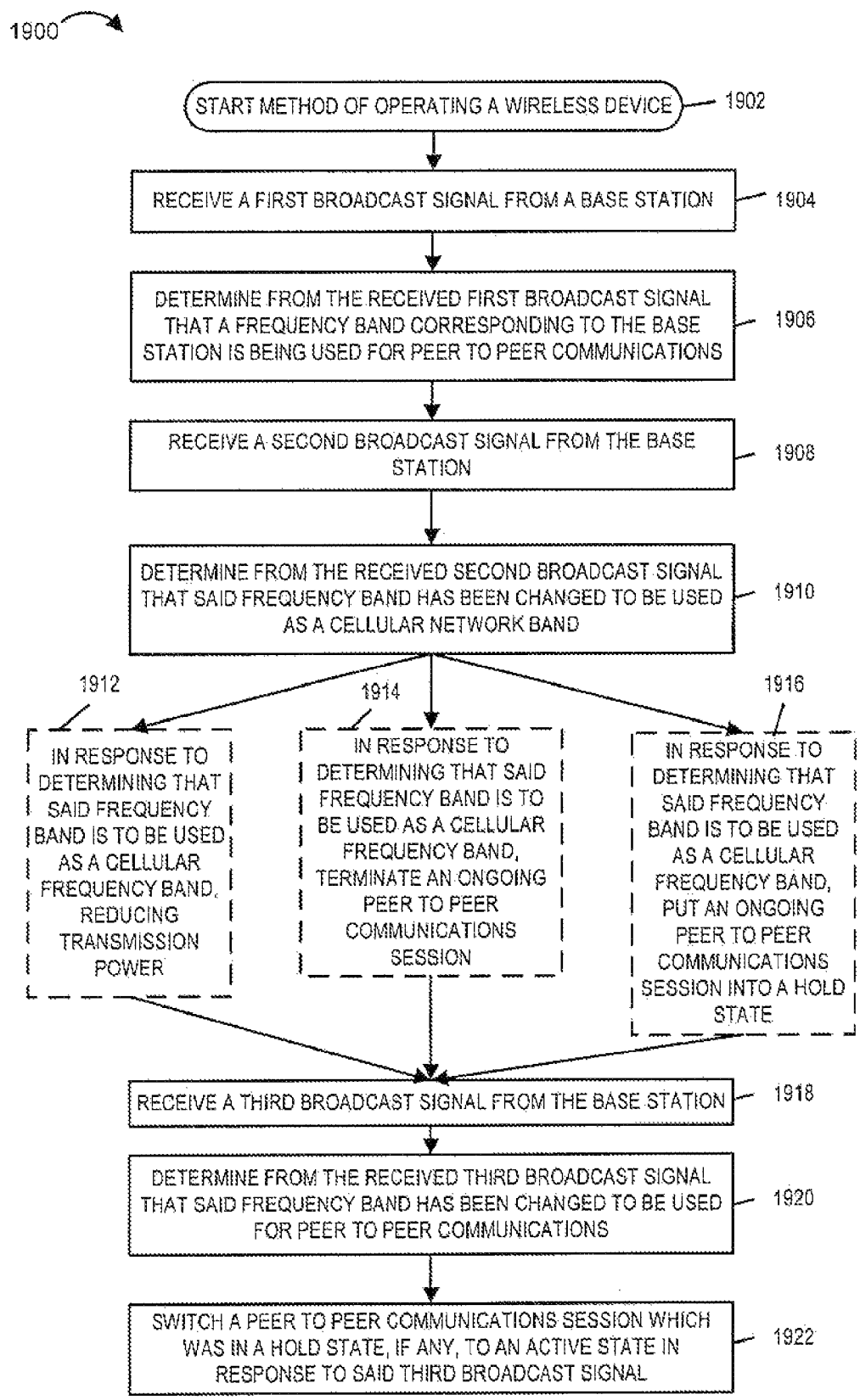
FIG. 26 is a drawing of a flowchart of an exemplary method of operating a wireless device, e.g., a mobile node, in accordance with various embodiments.

FIG. 26 is a drawing of a flowchart 1900 of an exemplary method of operating a wireless device, e.g., a mobile node, in accordance with various embodiments. Operation starts in step 1902, where the wireless device is powered on and initialized. Operation proceeds from start step 1902 to step 1904, where the wireless device receives a first broadcast signal from a base station. Then, in step 1906, the wireless device determines from the received first broadcast signal that a frequency band corresponding to the base station is being used for peer to peer communications. Operation proceeds from step 1906 to step 1908.

In step 1908, the wireless device receives a second broadcast signal from the base station, and then in step 1910, the wireless device determines from the received second broadcast signal that the second frequency band has ben changed to be used as a cellular network band. In response to determining that the frequency band is to be used as a cellular frequency band, operation proceeds from step 1910 to one of alternate steps 1912, 1914, and 1916. In alternative step 1912, the wireless device reduces transmission power. In some embodiments, reducing transmission power includes a reduction in transmission power by at least 10 dBs. In some embodiments, reducing transmission power includes ceasing to transmit. In alternative step 1914, the wireless device terminates an ongoing peer to peer communications session. In alternative step 1916, the wireless device puts an ongoing peer to peer communications session into a hold state. Operation proceeds from any of steps 1912, 1914, 1916 to step 1918. If the wireless terminal does not have an ongoing peer to peer communications session, when making the determination of step 1910, operation proceeds from step 1910 to step 1918 without traversing alternative steps 1912, 1914, or 1916.

In step 1918, the wireless device receives a third broadcast signal from the base station, and then in step 1920, the wireless device determines from the third broadcast signal that said frequency band has been changed to be used for peer to peer communications. Operation proceeds from step 1920 to step 1922, where the wireless device switches a peer to peer communications session, which was in hold state, if one happens to exist in hold state, to an active state in response to said third broadcast signal.

In some embodiments at least some of the received first, second and third broadcast signals include beacon signal bursts. In some embodiments, each of the first, second, and third signals are OFDM beacon signals.

Figure 27:
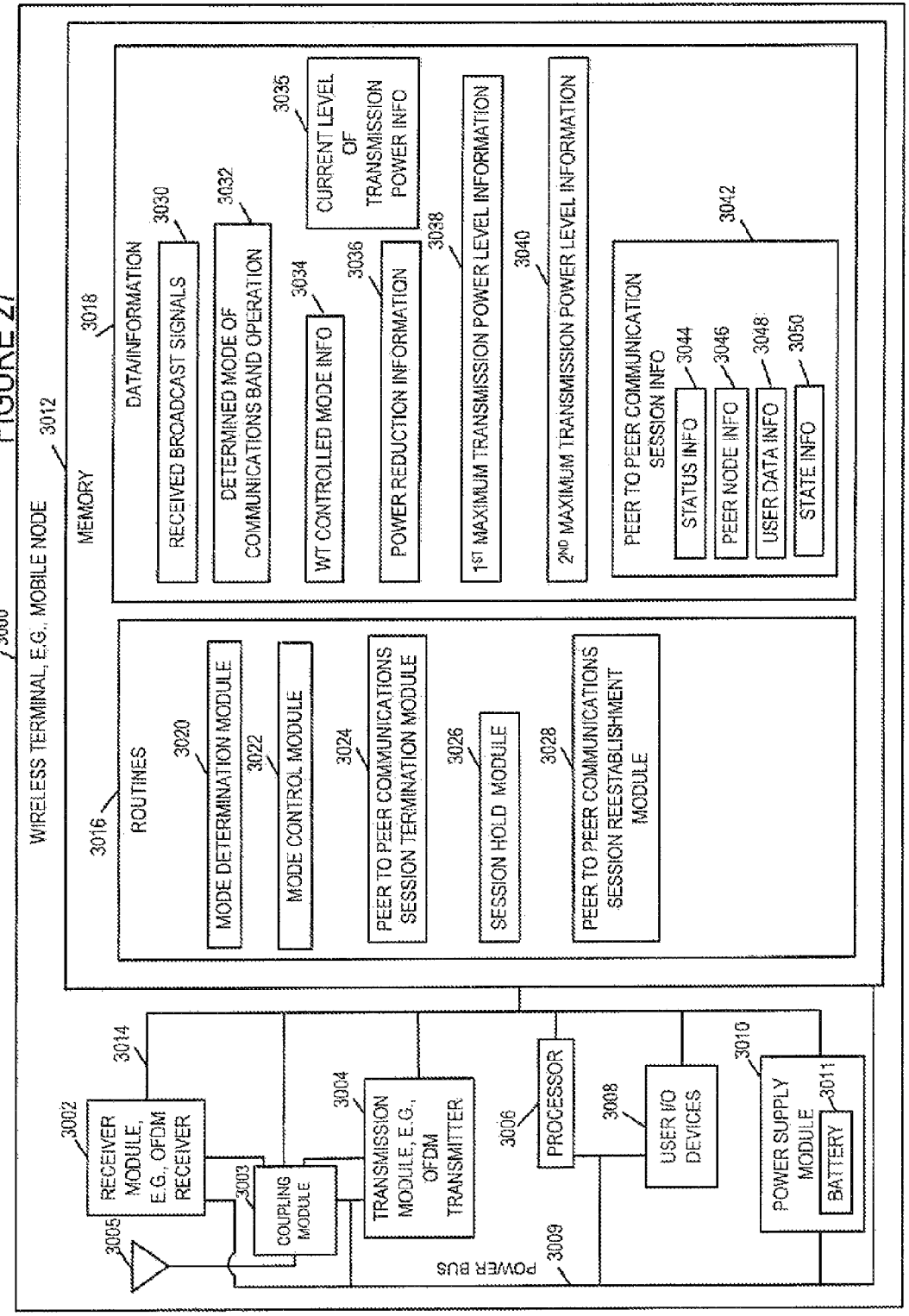
FIG. 27 is a drawing of an exemplary wireless terminal, e.g., mobile node, implemented in accordance with various embodiments.

FIG. 27 is a drawing of an exemplary wireless terminal, e.g., mobile node, implemented in accordance with various embodiments. Exemplary wireless terminal 3000 supports peer to peer communications sessions. In some embodiments, exemplary wireless terminal 3000 supports peer to peer communications but does not support a cellular mode of operation. Exemplary wireless terminal 3000 includes a receiver module 3002, a transmission module 3004, a coupling module 3003, a processor 3006, user I/O devices 3008, a power supply module 3010 and memory 3012 coupled together via a bus 3014 over which the various elements may interchange data and information. Memory 3012 includes routines 3016 and data/information 3018. The processor 3006, e.g., a CPU, executes the routines and uses data/information 3018 in memory 3012 to control the operation of the wireless terminal 3000 and implement methods, e.g., a method in accordance with FIG. 26.

Coupling module 3003, e.g., a duplex module couples the receiver module 3002 to antenna 3005 and the transmission module 3004 to antenna 3005, e.g., coordinating time division duplex operations of wireless terminal 3000. Power supply module 3012, which includes a battery 3011, is used to power up the various components of the wireless terminal 3000. Power is distributed from the power supply module 3010 to the various components (3002, 3003, 3004, 3006, 3008, 3012), via a power bus 3009. User I/O devices 3008 include, e.g., keypad, keyboard, switches, mouse, microphone, speaker, display, etc. User I/O devices 3008 are used for operation including inputting user data, accessing output user data, and controlling at least some functions and operations of the wireless terminal, e.g., initiating a peer to peer communications session.

Routines 3016 include a mode determination module 3020, a mode control module 3022, a peer to peer communications session termination module 3024, a session hold module 3026, and a peer to peer communications session reestablishment module 3028. Data/information 3018 includes received broadcast signals 3030, a determined mode of communications operation 3032, wireless terminal 3000 controlled mode information 3034, a current level of transmission power information 3035, power reduction information 3036, $1^{st}$ maximum transmission power level information 3038, $2^{nd}$ maximum transmission power level information 3040, and to peer communications session information 3042. The peer to peer communications session information 3042 includes status information 3044, peer node information 3046, user data information 3048, and state information 3050.

Receiver module 3002, e.g., an OFDM receiver, receives signals including broadcast signals. Receiver module 3002 also receives, at times, user data signals from a peer wireless terminal in a peer to peer communications session with wireless terminal 3000. Received broadcast signals 3030, e.g., beacon signals, are used to determine a mode of communication band operation.

Transmitter module 3004, e.g., an OFDM transmitter, transmits user data as part of a peer to peer communications session. In some embodiments, transmission module 3004 also transmits user beacon signals, e.g., OFDM user beacon signals.

Mode determination module 3020 determines based on received broadcast signals 3030 a mode of communications band operation, determined mode of communications band operation 3032. The determined mode of communications band operation indicating a mode of operation in which the frequency band is to be used at a point in time, the determined mode of communication band operation being one of a plurality of frequency band modes including at least a cellular communications mode and a first peer to peer communications mode.

Mode control module 3022 controls wireless terminal 3000 device operation as a function of at least one of a mode determination and a change in a determined mode of communications band operation, said mode control module 3022 controlling the transmitter to reduce power in response to determining that the frequency band is to be used as a cellular frequency band. In some embodiments, the controlling the transmitter to reduce power includes reducing transmission power by at least 10 dBs. In some embodiments reducing transmission power includes ceasing to transmit.

Thus, in some embodiment, when wireless terminal 3000 is in a peer to peer communications session and the spectrum is reallocated to support access node based operations, the wireless terminal is permitted to continue the peer to peer communications session at a reduced power level. While, in other embodiments, when wireless terminal 3000 is in a peer to peer communications session and the spectrum is reallocated for access node based operation, the wireless terminal terminates or suspends the peer to peer communications session until the spectrum is reallocated for peer to peer usage. In some embodiments, wireless terminal 3000 decides whether to continue with terminate, or place on hold a peer to peer session interrupted by a spectrum reallocation, in response to other factors e.g., device identification information, user identity information, priority information, latency requirements, etc.

Peer to peer communications session termination module 3024 terminates at least some peer to peer communications sessions in response to a determination that a frequency band is being used as a cellular frequency band. Session hold module 3026 puts a ongoing peer to peer communications session into a hold state in response to a determination that the frequency band is being used as a cellular frequency band. Peer to peer communications session reestablishment module 3028 transitions a peer to peer communications session from a hold state to an active state in response to a determination that the frequency band is to be used for peer to peer communications.

Current level of transmission power information 3035 is a monitored level used by mode control module 3022, when determining a transmission power level reduction in accordance with power reduction information 3036, e.g., a gain factor of at least 10 dBs, and $1^{st}$ maximum transmission power level information 3038 and $2^{nd}$ maximum level transmission power information 3040. The power level reduction is in response to a detection that spectrum usage is changing from peer to peer to cellular based, and the wireless terminal 3000 continuing with the peer to peer communications session at a reduced power level. In some embodiments, the mode control module 3022 supports $1^{st}$ and $2^{nd}$ modes of peer to peer operation from the perspective of the wireless terminal, the second peer to peer mode of operation being a reduced power level mode of operation in which the wireless communications device 3000 uses a lower maximum transmission power level for the transmission of user data than is used in the $1^{st}$ mode of peer to peer operation. In some embodiments, the $1^{st}$ mode of wireless terminal peer to peer operation applies when the spectrum is allocated for peer to peer usage, and the second mode of wireless terminal peer to peer operation applies when the spectrum is allocated primarily for cellular access node base operations.

Status information 3044 indicates whether the peer to peer communications session is in an active state or a hold state. Status information 3044 also indicates whether the peer to peer communications session is in a first mode of wireless terminal peer to peer operation, e.g., normal power mode, or a second mode of wireless terminal peer to peer operation, reduced power mode. Peer node information 3046 includes peer node identification information, addressing information, and priority level information. User data information 3048, e.g., voice, image, text, file information, includes user data to be transmitted and received as part of the peer to peer communications session. State information 3050 includes session maintenance information, and stored information used to reestablish a session placed into a hold state.

Figure 28A:
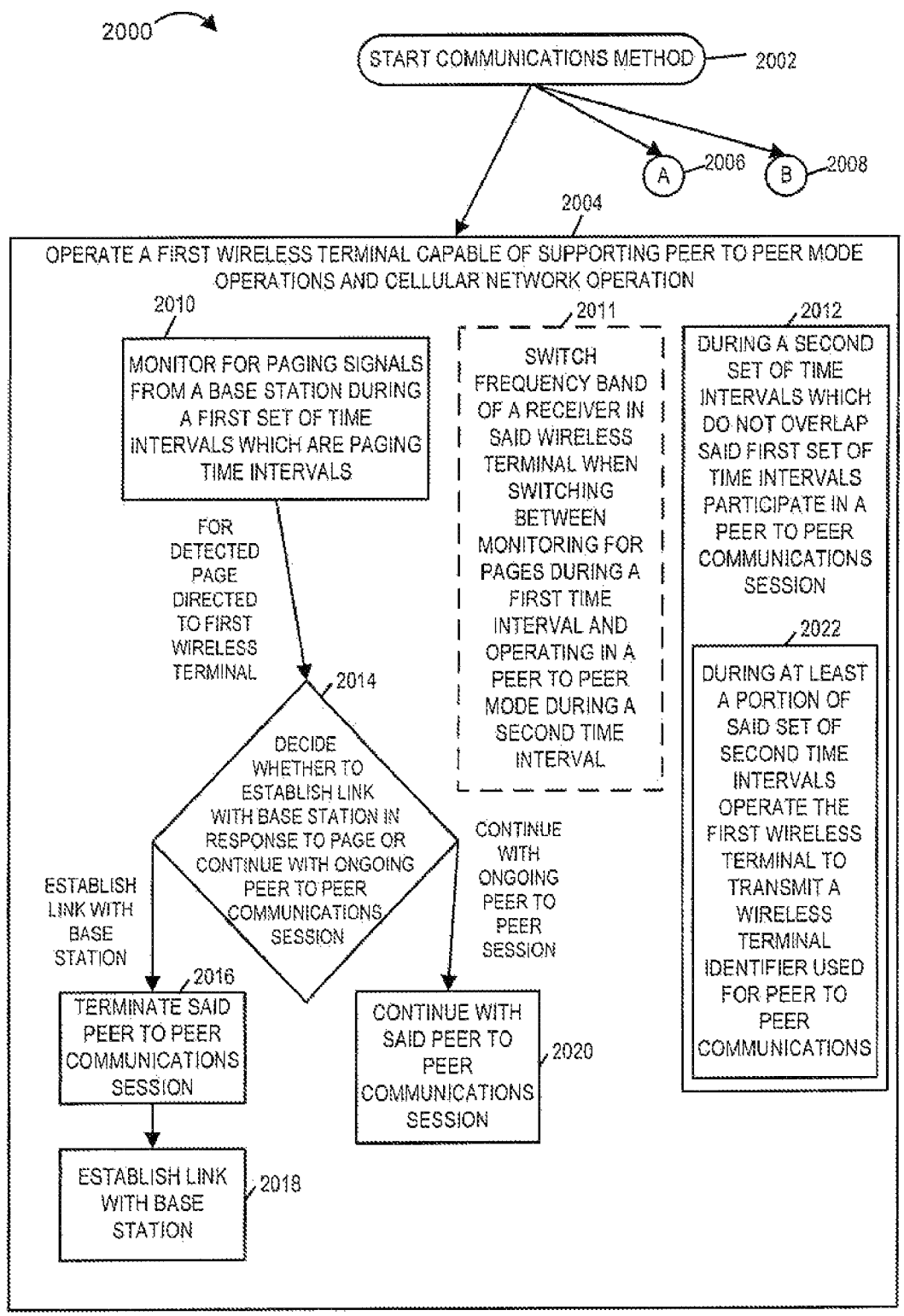
FIG. 28 comprising the combination of FIG. 28A
FIG. 28B is a drawing of a flowchart of an exemplary communications method in accordance with various embodiments.
Figure 28B:
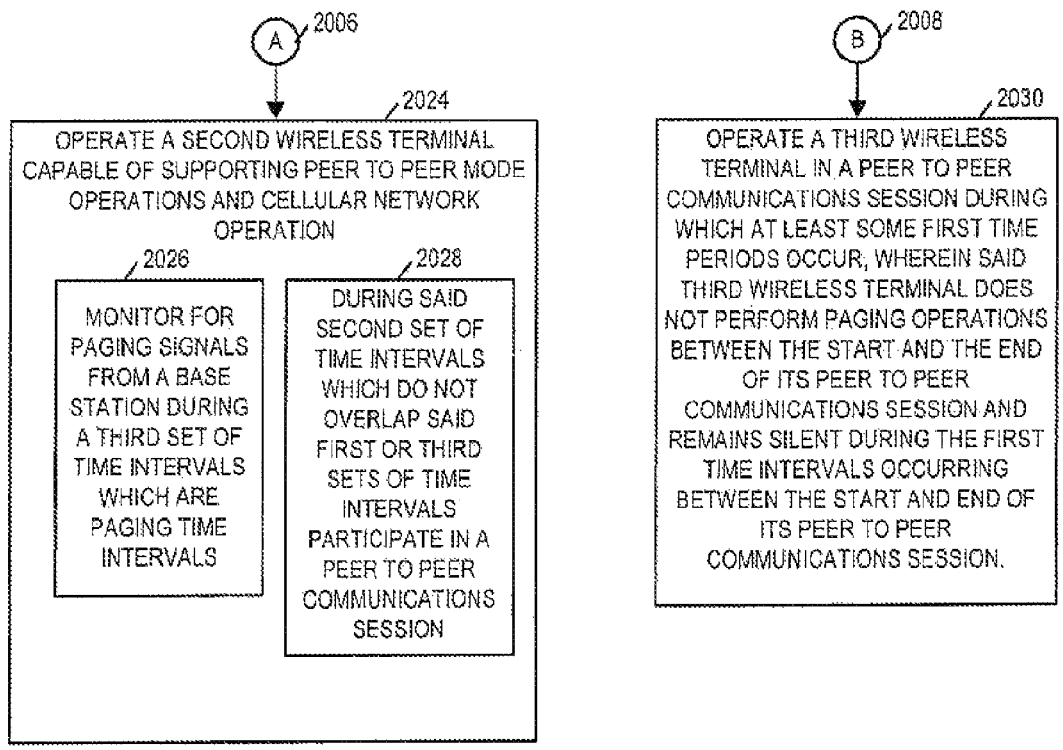

FIG. 28 comprising the combination of FIG. 28A and FIG. 28B is a drawing of a flowchart 2000 of an exemplary communications method in accordance with various embodiments. Operation of the exemplary communications method starts in step 2002 and proceeds to step 2004, step 2024 via connecting node A 2006, and step 2030 via connecting node B 2008.

In step 2004, a first wireless terminal capable of supporting peer to peer operations and cellular network operations is operated. Step 2004 includes sub-steps 2010, 2011, 2012, 2014, 2016, 2018 and 2020. In sub-step 2010, the first wireless terminal monitors for paging signals from a base station during a first set of time intervals which are paging time intervals, In various embodiments, during the first set of time intervals the first wireless terminal does not transmit peer to peer signals. In some embodiments, during the first set of time intervals the first wireless terminal also does not receive peer to peer signals.

In sub-step 2012, the first wireless terminal, during a second set of time intervals, which do not overlap said first set of time intervals, is operated to participate in a peer to peer communications session. In some embodiments, the first and second time intervals are interleaved. Sub-step 2012 includes sub-step 2022, in which the first wireless terminal, during at least a portion of said second set of time intervals is operated to transmit a first wireless terminal identifier used for peer to peer communications. In some such embodiments, the first wireless terminal identifier is communicated via a user beacon signal, e.g., an OFDM user beacon signal including a beacon signal burst including at least one beacon symbol.

In some embodiments, the same frequency band is used for paging and for peer to peer communications, and the first wireless terminal need not perform sub-step 2011. In some embodiments, different frequency bands are used for paging and for peer to peer communications. In some such embodiments, sub-step 2011 is performed in which the first wireless terminal switches the frequency band of a receiver in said wireless terminal when switching between monitoring for pages during a first time interval and operating in a peer to peer mode during a second time interval.

Returning to sub-step 2010, for a detected page signal directed to the first wireless terminal, operation proceeds from sub-step 2010 to sub-step 2014. In sub-step 2014, the first wireless terminal decides whether to establish a link with the base station in response to the page directed to the first wireless terminal or to continue with an ongoing peer to peer communication session. In some embodiments, the decision of the step 2014 is a function of at least one of a priority level associated with the ongoing peer to peer communications session, a priority level associated with the peer wireless terminal in the ongoing peer to peer communications session, a priority level associated with the user of the peer wireless terminal in the ongoing peer to peer communication session, the type of data being communicated in the peer to peer communication session, latency considerations of the data being communicated in the peer to peer session, an estimate of the amount of data remaining to be communicated in the peer to peer communications session, and priority information communicated in the page signal. In some such embodiments, the decision of step 2014 is a function of at least two of a priority level associated with the ongoing peer to peer communications session, a priority level associated with the peer wireless terminal in the ongoing peer to peer communications session, a priority level associated with the user of the peer wireless terminal in the ongoing peer to peer communications session, the type of data being communicated in the peer to peer communications session, latency considerations of the data being communicated in the peer to peer session, an estimate of the amount of data remaining to be communicated in the peer to peer communications session, and priority information communicated in the page signal.

If the decision of sub-step 2014 is to establish a link with the base stations which transmitted the page, then operation proceeds to sub-step 2016, where the first wireless terminal terminates the peer to peer communications session and in sub-step 2018 establishes a link with the base station. However, if the first wireless terminal decides in sub-step 2014 to continue with the ongoing peer to peer communication session, operation proceeds from sub-step 2014 to sub-step 2020 where the first wireless terminal continues with the peer to peer communications session. In some such embodiments, the first wireless terminal, when deciding to perform sub-step 2020, the first wireless terminal ignores the page, e.g., with no response back to the base station. In other embodiments, the first wireless terminal, when deciding to perform sub-step 2020, sends a page response signal to the base station indicating the first wireless terminal has received the page but has decided not to establish a link with the base station.

Returning to step 2024, in step 2024, a second wireless terminal, capable of supporting peer to peer mode operations and cellular network operations, is operated. Step 2024 includes sub-steps 2026 and 2028. In sub-step 2026, the second wireless terminal monitors for paging signals from a base station during a third set of time intervals which are paging time intervals. In some such embodiments, the first and third paging time intervals overlap. In sub-step 2028, the second wireless terminal, during said second set of time intervals, which does not overlap with said first or third set of time intervals participates in a peer to peer communications session.

Returning to step 2030, in step 2030, a third wireless terminal is operated in a peer to peer communications session during which at least some first time periods occur, wherein the third wireless terminal does not perform paging operations between the start and end of its peer to peer communications session and remains silent during the first time intervals occurring between the start and end of its peer to peer communications session.

Figure 29:
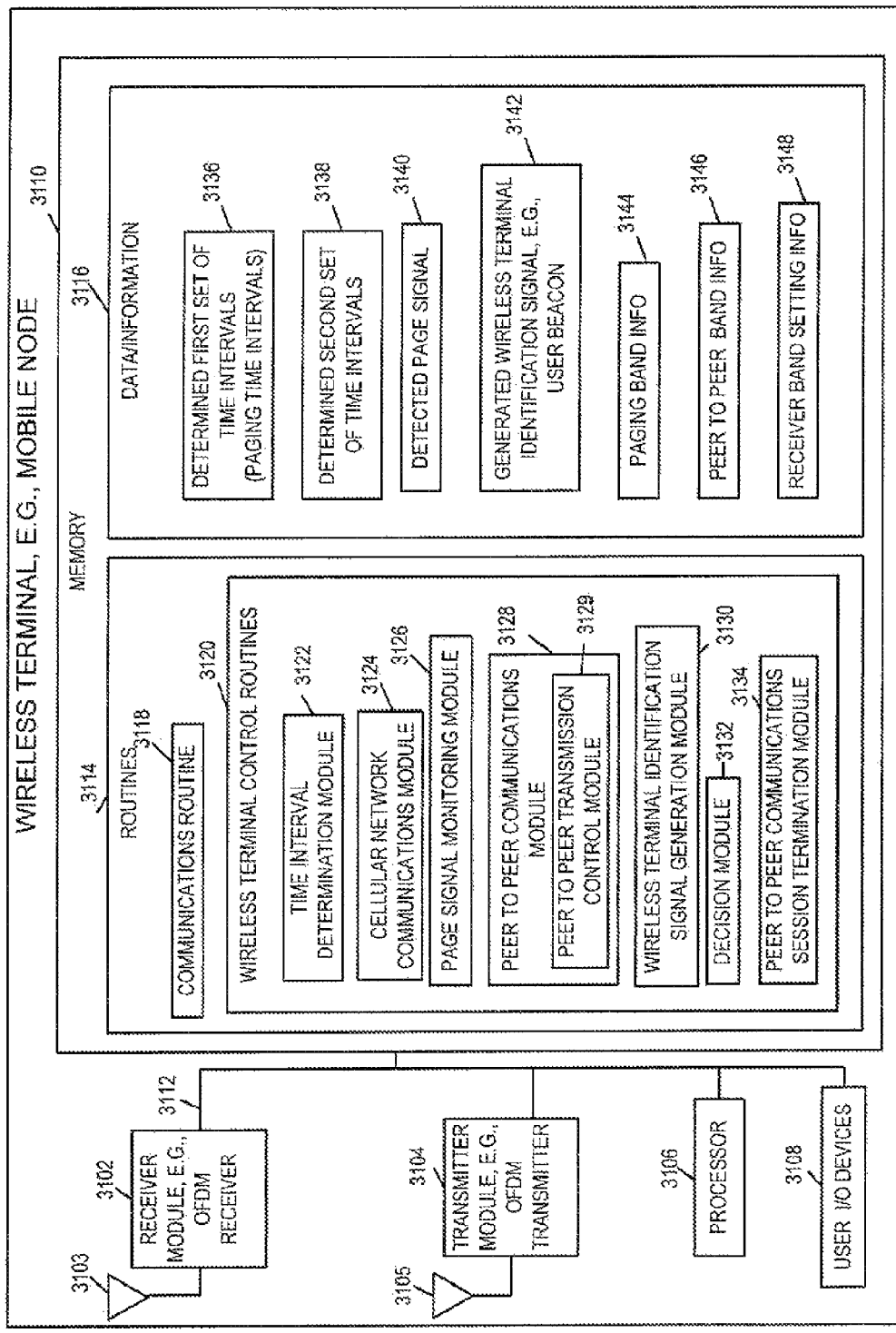
FIG. 29 is a drawing of an exemplary wireless terminal, e.g., mobile node, in accordance with various embodiments.

FIG. 29 is a drawing of an exemplary wireless terminal 3100, e.g., mobile node, in accordance with various embodiments. Exemplary wireless terminal 3100 monitors for, detects, and processes paging signals in a wireless communications system including dual mode capability including access node based cellular communications and peer to peer communications, and exemplary wireless terminal 3100 supports operation in both modes of operation.

Exemplary wireless terminal 3100 includes a receiver module 3102, a transmitter module 3104, a processor 3106, user I/O devices 3108, and memory 3110 coupled together via a bus 3112 over which the various elements may exchange data and information. User I/O devices 3108 include, e.g., keypad, keyboard, switches, mouse, microphone, speaker, display, etc. User I/O devices 3108 are used for operation including inputting user data, accessing output user data, and controlling at least some functions and operations of the wireless terminal, e.g., initiating a peer to peer communications session or initiating an access node based communications session.

Receiver module 3102, e.g., an OFDM receiver, coupled to receive antenna 3103 via which the wireless terminal receives signals from a base station including paging signals and signals in which the base station is functioning as a point of network attachment for wireless terminal 3100 e.g., downlink control signals and downlink user data signals. Receiver module 3102 also receives signals from a peer node in a peer to peer communications session with wireless terminal 3100.

Transmitter module 3104, e.g., an OFDM transmitter, is coupled to transmit antenna 3105, via which the wireless terminal 3100 transmits signals. Transmitted signals include generated identification signals 3142, e.g., an OFDM user beacon signal including beacon signal burst, each beacon signal burst including at least one OFDM beacon symbol. Transmitted signals also include access node based session establishment signals, peer to peer session establishment signals, control and user data uplink signals directed to a base station serving as the wireless terminal's point of network attachment, signals directed to a peer node as part of a peer to peer communications session, and uplink page response signals directed to the base station which transmitted the page directed to wireless terminal 3100.

Memory 3110 includes routines 3114 and data/information 3116. The processor 3106, e.g., a CPU, executes the routines 3114 and uses the data/information 3116 in memory 3110 to control the operation of the wireless terminal and implement methods. Routines 3114 include a communications routine 3118 and wireless terminal control routines 3120. The communications routine 3118 implements the various communications protocols used by the wireless terminal 3100. The wireless terminal control routines 3120 include a time interval determination module 3122, a cellular network communications module 3124, a page signal monitoring module 3126, a peer to peer communications module 3128, a wireless terminal identification signal generation module 3130, a decision module 3132, and a peer to peer communications session termination module 3134. The peer to peer communications module 3128 includes a peer to peer communications control module 3129.

Data/information 3116 includes a determined first set of time intervals 3136, which are paging time intervals, a determined second set of time intervals 3138, a detected page signal 3140, a generated wireless terminal identification signal, e.g., a generated user beacon associated with wireless terminal 3100 paging band information 3144, peer to peer band information 3146 aid receiver band setting information 3148.

Time interval determination module 3122 determines first and second sets of time intervals (3136, 3138), respectively), the first and second sets of time intervals being non-overlapping sets, the first set of time intervals being paging time intervals. Cellular network communications module 3124 supports cellular network communications operations, e.g., operations in which the wireless terminal uses the base station as a network attachment point to communicate with another wireless terminal via the cellular communications network. Page signal monitoring module 3126 monitors for paging signals from a base station during the first set of time intervals

3136. Information 3140 represents a detected page signal directed to wireless terminal 3100.

Peer to peer communications module 3128 supports peer to peer communications signaling operations during the second set of time intervals 3138 but not during the first set of time intervals 3136. Peer to peer transmission control module 3129 restrains the wireless terminal from transmitting peer to peer signals during the first time intervals. In some embodiments, the wireless terminal is also controlled to suspend detection operations of peer to peer signals during the first time intervals. In various embodiments, of the first set of time intervals are interleaved with members of the second set of time intervals.

Wireless terminal identification signal generation module 3130 generates a wireless terminal identifier 3142 used for peer to peer communications, e.g., an OFDM beacon signal burst or sequence of bursts, each beacon signal burst including at least one beacon symbol. Decision module 3132 decides between establishing a communication link with a base station in response to a page which was received or continuing with an ongoing peer to peer communications session. Peer to peer communications session termination module 3134 terminates a peer to peer communications session in response to a received page directed to the wireless terminal 3100.

Paging band information 3144 includes information identifying the frequency band used for paging, while peer to peer band information 3146 identifies the frequency band used for peer to peer communications. In some embodiments the same frequency band is used for paging and peer to peer communications. In some embodiments, different frequency bands are used for paging and peer to peer communications. In some such embodiments, receiver module 3412 includes a tunable receiver responsive to a mode control signal for switching between the different frequency brands used for paging and peer to peer communications. Receiver band setting information 3148 includes information indicating the current setting of the receiver module 3102 and control signaling used to change the setting of the receiver module 3102.

Figure 30:
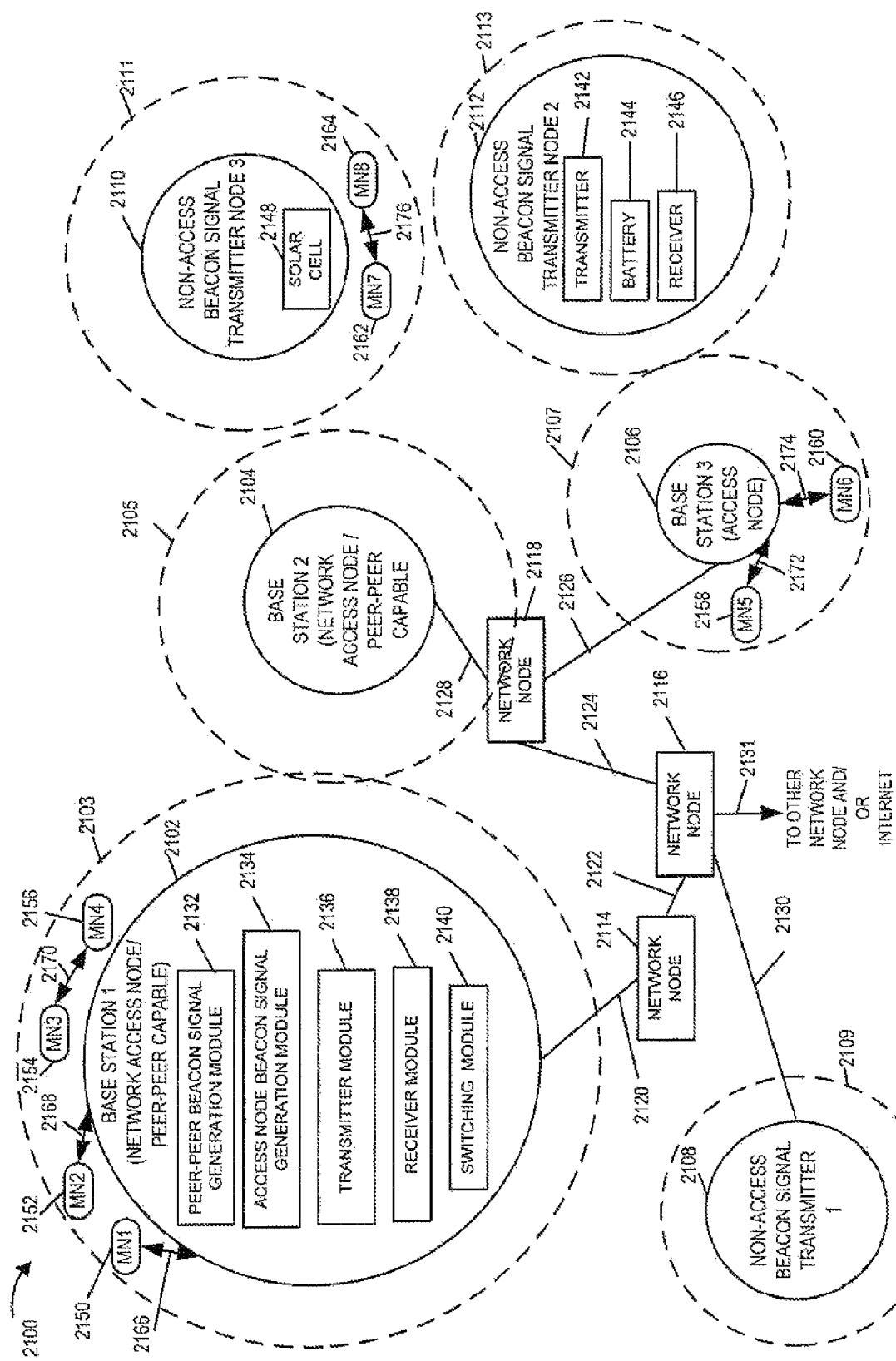
FIG. 30 is a drawing of an exemplary communications system in accordance with various embodiments.

FIG. 30 is a drawing of an exemplary communications system 2100 in accordance with various embodiment. Exemplary communications system 2100 includes a plurality of base stations (base station 1 2102, base station 2 2104 base station 3 2106) and a plurality of non-access beacon signal transmitter nodes (non-access beacon signal transmitter node 1 2108, non-access beacon signal transmitter node 2 2112, non-access beacon signal transmitter node 3 2110). The base stations (2102, 2104, 2106) are coupled to network nodes (2114, 2118, 2118) via network links (2120 2128, 2126), respectively. In addition, system 2100 includes network node 2116 which is coupled to (network node 2114, network node 2118, non-access beacon signal transmitter 2108, and other network nodes and/or the Internet) via network links (2122, 2124, 2130, 2131), respectively. Network links (2120, 2122, 2124, 2126, 2128, 2130, 2131) are, e.g., fiber optic links and/or wired links.

Some of the base stations (BS 1 2102 BS 2 2104) support both peer to peer communications in the base station region and also operate as access nodes. Base station 3 2106 functions as an access node and does not support peer to peer communications in its coverage region. Each base station (BS 1102, BS 2 2104, BS 3 2106) has a corresponding region (2103, 2105, 2107) which represents a cellular coverage area when in the network access mode. Regions (2103, 2105) also represent base station beacon transmission regions when supporting peer to peer communications.

The base stations (2102, 2104, 2106) and the non-access beacon signal transmitter nodes (2108, 2110, 2112) transmit beacon signals including beacon signal bursts, e.g., OFDM beacon signal bursts each beacon signal burst including at least one beacon symbol.

Exemplary system 2100 also includes a plurality of wireless terminals, e.g., mobile nodes, (MN 1 2150, MN 2 2152, MN 3 2154, MN 4 2156, MN 5 2158, MN 6 2160, MN 7 2162, MN 8 2164), which may move throughout the system. MN 1 2150 is using BS 1 2102 as an access node and is coupled to BS 1 2102 via link 2166. MN 2 2152 is using BS 1 2102 as an access node and is coupled to BS 1 2102 via link 2168. MN 1 2150 and MN 2 2152 are using access node beacon signals transmitted from BS 1 2102 for synchronization. MN 3 2154 is in a peer to peer communications session with MN4 2156 using peer to peer link 2170. MN 3 2154 and MN 4 2156 are using peer to peer beacon signals from BS 1 2102 for synchronization purposes.

MN 5 2158 is using BS 3 2106 as an access node and is coupled to BS 3 2106 via link 2172. MN 6 2160 is using BS 3 2106 as an access node and is coupled to BS 3 2106 via link 2174. MN 5 2158 and MN 6 2160 are using access node beacon signals transmitted from BS 3 2174 for synchronization.

MN 7 2162 is in a peer to peer communications session with MN 8 2164 using peer to peer link 2176. MN 7 2162 and MN 8 2164 are using peer to peer beacon signals from non-access beacon signal transmitter node 3110 for synchronization purposes.

Base station 1 2102 includes a peer to peer beacon signal generation module 2132, an access node beacon signal generation module 2134, a transmitter module 2136, a receiver module 2138 and a switching module 2140. Peer to peer beacon signal generation module 2132 generates beacon signals used to support peer to peer communications, while access node beacon signal generation module 2134 generates beacon signals used to support cellular network communications. Transmitter module 2136, e.g., an OFDM transmitter, transmits generated peer to peer beacon signals and generated access node beacon signals. Transmitter module 2136 also transmits control and user data signals to wireless terminals when functioning as an access node. Receiver module 2138, e.g., an OFDM receiver, receives signals such as access request signals, control signals and user data from wireless terminals, e.g., mobile nodes using the base station as a point of network attachment. Switching module 2140 supports switching between peer to peer and cellular modes of operation using the same frequency band for peer to peer and cellular modes of operation at different times. Base station 1 2102 transmits different beacon signals during peer to peer and cellular modes of operation.

Non-access beacon signal transmitter node 2 2112 and non-access beacon signal transmitter node 3 2110 are standalone devices. Non-access beacon signal transmitter node 2 2112 includes a transmitter 2142, a battery 2142 and a receiver 2146. Battery 2144 powers non-access beacon signal transmitter node 2 2112. Transmitter 2142 transmits beacon signals which are utilized by mobile nodes in its transmitter coverage region 2113 for synchronization purposes in supporting peer to peer communications sessions. The beacon signal transmitter 2142 does not relay any user data. Receiver 2146 receives a broadcast signal used for timing synchronization purposes. The receiver 2146 for receiving a broadcast signal used for timing synchronization purposes is one of a GSM receiver, a satellite receiver, and a cellular network receiver. Satellite receivers include, e.g., a GPS receiver, broadcast TV and/or radio signal satellite receiver, proprietary satellite receiver or government controlled satellite receiver. Cellular network receivers include, e.g., CDMA., OFDM, GSM, etc., receivers. In some embodiments, a non-access beacon signal transmitter node includes a plurality of different types of receivers for receiving different types of broadcast signals, e.g., with different signals being available in some areas but not in others.

In various embodiments, at least some of the base stations, which transmit beacon signals are not synchronized with respect to one another. In various embodiments, at least some of the non-access beacon signal transmitter nodes, which transmit beacon signals, are not synchronized with respect to one another. For example, non-access beacon signal transmitter node 3 2110, in some embodiments, does not include a receiver, and its transmitted beacon signals into its transmitter region 2111 are free running with respect to the other non-access beacon signal transmitters in system 2100 and the base stations in system 2100.

Non-access beacon signal transmitter module 3 2110 includes a solar cell 2148 and the solar cell 2148 is a solar power source conversion for powering non-access beacon signal transmitter node 3 2110 during at least some of the time.

Non-beacon access beacon signal transmitter node 1 2108 is coupled to the network via link 2130 thus facilitating timing synchronization information to be communicated to the node 2108, allowing for its beacon signal transmission into its transmitter region 2109 to be synchronized with respect to an overall system timing reference. No user data is communicated over link 2130.

Figure 31:
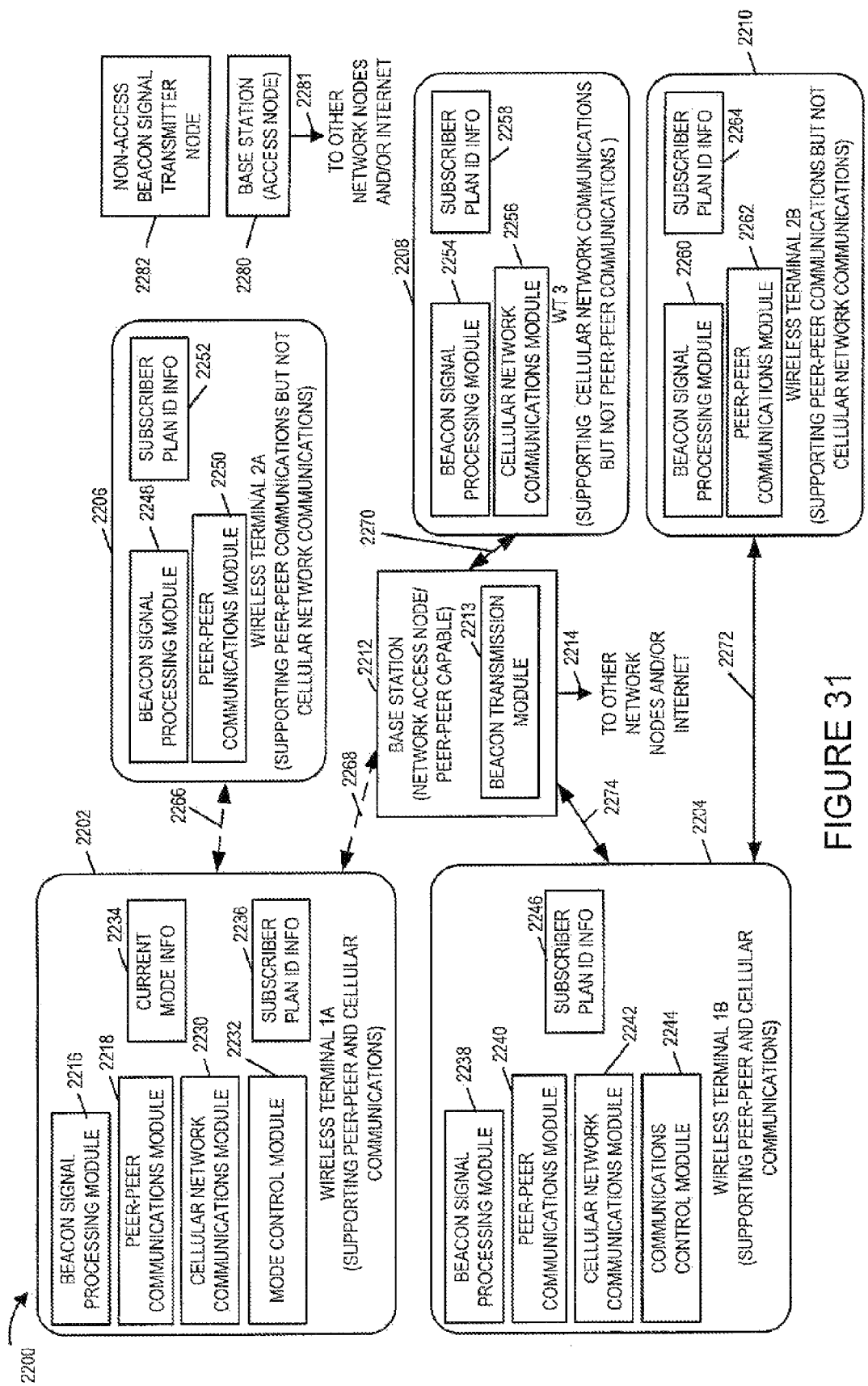
FIG. 31 is a drawing of an exemplary wireless communications system which supports both peer to peer communications and cellular communications in accordance with various embodiments.

FIG. 31 is a drawing of an exemplary wireless communications system 2200 which supports both peer to peer communications and cellular communications in accordance with various embodiments. Exemplary communications system 2200 includes a plurality of wireless terminals, e.g., mobile nodes, and a plurality of base stations. At least some of the plurality of base stations are both network access node and peer to peer capable such as exemplary base station 2212. Exemplary communications system 2220 also includes some base stations which function as access nodes, but do not support peer to peer communications such as exemplary base station 2280 and some non-access beacon signal transmitter nodes for supporting peer to peer communications such as exemplary non-access beacon signal transmitter node 2282.

System 2200 includes wireless terminal 1A 2202 and wireless terminal 1B 2204, which both support peer to peer and cellular communications; wireless terminal 2A 2206 and wireless terminal 2B 2210, which both support peer to peer communications but not cellular network communications; and wireless terminal 3 2208 which supports cellular network communications but not peer to peer communications.

Wireless terminal 1A 2202 includes a beacon signal processing module 2216, a peer to peer commutations module 2218, a cellular network communications module 2230, a mode control module 2232, current mode information 2234 and subscriber plan identification information 2236. Beacon signal processing module 2216 processes beacon signals received from base stations and/or non-access beacon signal transmitter nodes. The beacon signals are uses for supporting cellular and peer to peer communications, e.g., providing synchronization, identification, mode and/or priority information. Peer to peer communications module 2218 performs operations supporting peer to peer communications. Cellular network communications module 2230 performs operations supporting cellular communications in which the wireless terminal 1A 2202 is communicating via a wireless communications link with a base station functioning as an access node and providing a point of network attachment. Mode control module 2232 switches between peer to peer and cellular modes of operation as wireless terminal 1A 2202 supports at most one of peer to peer mode and cellular mode operation at a given time. Current mode information 2234 indicates which of the peer to peer mode and cellular mode wireless terminal 1A 2202 is currently operating in.

Wireless terminal 1B 2204 includes a beacon signal processing module 2238, a peer to peer communications module 2240, a cellular network communications module 2242, a communications control module 2244, and subscriber plan identification information 2246. Beacon signal processing module 2238 processes beacon signals received from base stations and/or non-access beacon signal transmitter nodes. Peer to peer communications module 2240 performs operations supporting peer to peer communications. Cellular network communications module 2242 performs operations supporting cellular communications in which the wireless terminal 1B 2204 is communicating via a wireless communications link with a base station functioning as an access node and providing a point of network attachment. Communications control module 2244 switches between peer to peer and cellular modes of operation, as wireless terminal 1A 2212 controls the wireless terminal to maintain peer to peer and cellular network communications sessions at the same time.

Wireless terminal 2A 2206 includes a beacon signal processing module 2248, a peer to peer communications module 2250, ad subscriber plan identification information 2252. Beacon signal processing module 2248 processes beacon signals received from base stations and/or non-access beacon signal transmitter nodes. Peer to peer communication module 2250 performs operations supporting peer to peer communications. Wireless terminal 2B 2210 includes a beacon signal processing module 2260, a peer to peer communications module 2262, and subscriber plan identification information 2264. Beacon signal processing module 2260 processes beacon signals received from base stations and/or non-access beacon signal transmitter nodes. Peer to peer communications module 2262 performs operations supporting peer to peer communications.

Wireless terminal 3 2208 includes a beacon signal processing module 2254, a cellular network communications module 2256, and subscriber plan identification information 2258. Beacon signal processing module 2254 processes beacon signals received from base stations and/or non-access beacon signal transmitter nodes. Cellular network communications module 2256 performs operations supporting cellular network communications.

Base station 2212 includes a beacon transmission module 2213. Beacon signal transmission module 2213 transmits beacon signals used for communications synchronization, identification, mode, and/or priority information. In some embodiments, at least some of the beacon signals are OFDM beacon signals including beacons signal bursts, each beacon signal burst including at least one beacon symbol. Base station 2212 is coupled to other network nodes, e.g., other base stations routers, AAA nodes, home agent nodes, etc, and/or the Internet via link 2214. Base station 2280 is coupled to other network nodes and/or the Internet via network link 2281. Network links 2214, 2281 are, e.g., fiber optic links and/or wired links.

Dotted line 2268 between wireless terminal 1A 2202 and base station 2212 indicates that WT 1A 2202 can operate in a cellular communication mode and have a wireless communication link with a base station. Dotted line 2266 between wireless terminal 1A 2202 and WT 2A 2206 2212 indicates that WT 1A 2202 and WT 2A 2206 can operate in a peer to peer communications mode and have a wireless communication link with another wireless terminal. The lines 2266 and 2268 have been indicated as dotted lines to indicate that WT 1A 2202 switches between two modes.

Solid line 2274 between wireless terminal 1B 2204 and base station 2212 indicates that WT 1B 2204 can operate in a cellular communication mode and have a wireless communication link with a base station. Solid line 2272 between wireless terminal 1B 2204 and WT 2B 2206 2210 indicates that WT 1B 2204 and WT 2B 2210 can operate in a peer to peer communications mode and have a wireless communication link with another wireless terminal. The lines 2272 and 2274 have been indicated as solid lines to indicate that WT 1B can maintain peer to peer and cellular network communications sessions at the same time.

Line 2270 between wireless terminal 3 2208 and base station 2212 indicates that WT 3 2208 can operate in a cellular communication mode and have a wireless communication link with a base station.

The various wireless terminals (2202, 2204, 2206, 2208, 2210) include subscriber plan identification information (2236, 2246, 2252, 2259, 2264), respectively. In some embodiments, a set of wireless terminals correspond to a communications service subscriber who subscribes to a family plan which supports multiple communications devices some of which have different capabilities. For example, in one embodiment, the set of wireless terminals corresponding to the communications service subscriber who subscribes to a family plan includes WT1A 2202, WT 1B 2204, WT 2A 2206, and WT 3 2208.

In some embodiments, the peer to peer communications modules (2218, 2240, 2250, 2262) are OFDM communications modules. In some embodiments the cellular network communications modules (2230, 2242, 2256) are OFDM communications modules. In some embodiments, the peer to peer communications modules (2218, 2240, 2250, 2262) are OFDM communications modules, and the cellular network communications modules (2230, 2242, 2256) are CDMA communications modules. In some embodiments, the peer to peer communications modules (2218, 2240, 2250, 2262) are OFDM communications modules, and the cellular network communications modules (2230, 2242, 2256) are GSM communications modules.

FIG. 32 is a drawing 3200 illustrating exemplary beacon burst time position hopping in accordance with various embodiments. Horizontal axis 3202 represents time while vertical axis 3204 represents frequency, e.g., OFDM tones in a frequency band, e.g., a non-infrastructure frequency band being used for peer to peer communications. A wireless terminal receives an external broadcast signal 3206 which the wireless terminal uses a timing reference signal and upon which it bases its timing structure. The external reference signal repeats as indicated by signal 3206'. In some embodiments, the timing reference point is derived from information conveyed by the received broadcast signal. In this example, the peer to peer timing structure being used by the wireless terminal includes a sequence of slots used for beacon signaling, each time slot is associated with a beacon signaling resource (slot 1 beacon signaling resource 3208, slot 2 beacon signaling resource 3210, slot 3 beacon signaling resource 3212. The slots repeat as indicated by slot 1 beacon signaling resource 3208'. Each slot beacon signaling resource represents a block of air link resources, e.g., OFDM tone-symbols.

The start of each beacon signaling resources slot (3208, 3210, 3212) is referenced with respect a predetermined timing offset (T1 3214, T2 3216, T3 3218). In some embodiments, the time duration of each beacon signaling slot is the same. In some embodiments T2−T1=T3−T2.

Within each beacon signaling slot resource (3208, 3210, 3212), the wireless terminal transmits a beacon signal burst (3220, 3222, 3224) including at least one beacon symbol (3226, 3228, 3230) the beacon symbol being a relatively high power symbol with respect to data symbols transmitted by the wireless terminal. In this example, the time position of the beacon signal burst with the beacon resource slot is hopped from one slot to the next in accordance with a hopping function used by the wireless terminal. The hopping function varies the time of the beacon signal burst from the start of the slot as indicated by different time offset values (T4 3234, T5 3236, T6 3238) corresponding to (slot 1, slot 2, slot 3), respectively, The hopping function determines the time offset as a function of a wireless terminal identifier, a user identifier and/or a priority level value. In some embodiments, other inputs can be used by the hopping function, e.g., a received broadcast value associated with the spectrum, a received key, a value associated with a designated area, a value associated with a sector, etc.

In this example, the same tone is used by the wireless terminal for the beacon symbol (3226, 3228, 3230, 3226') of the beacon signal bursts (3220, 3220, 3224, 3220'), respectively, in slots resources (3208, 3210, 3212, 3208'), respectively. Different wireless may, and sometimes do use a different tone for the beacon symbol.

FIG. 33 is a drawing 3300 illustrating exemplary beacon burst time position hopping and beacon symbol tone hopping in accordance with various embodiments. Horizontal axis 3302 represents time while vertical axis 3304 represents frequency, e.g., OFDM tones in a frequency band, e.g., a non-infrastructure frequency band being used for peer to peer communications. A wireless terminal receives an external broadcast signal 3306 which the wireless terminal uses a timing reference signal and upon which it bases its timing structure. The external reference signal repeats as indicated by signal 3306'. In some embodiments, the timing reference point is derived from information conveyed by the received broadcast signal. In this example, the peer to peer timing structure being used by the wireless terminal includes a sequence of slots used for beacon signaling, each time slot is associated with a beacon signaling resource (slot 1 beacon signaling resource 3308, slot 2 beacon signaling resource 3310, slot 3 beacon signaling resource 3312). The slots repeat as indicated by slot 1 beacon signaling resource 3308'. Each slot beacon signaling resource represents a block of air link resources, e.g., OFDM tone-symbols.

The start of each beacon signaling resources slot (3308, 3310, 3312) is referenced with respect a predetermined timing offset (T1 3314, T2 3316, T3 3318) from the external timing reference signal 3306. In some embodiments, the time duration of each beacon signaling slot is the same. In some embodiments T2−T1=T3−T2.

Within each beacon signaling slot resource (3308, 3310, 3312), the wireless terminal transmits a beacon signal burst (3320, 3322, 3324) including at least one beacon symbol (3326, 3328, 3330), the beacon symbol being a relatively high power symbol with respect to data symbols transmitted by the wireless terminal. In this example, the time position of the beacon signal burst with the beacon resource slot is hopped from one slot to the next in accordance with a time hopping function used by the wireless terminal. The hopping function varies the time of the beacon signal burst from the start of the slot as indicated by different time offset values (T4 3334, T5 3336, T6 3338) corresponding to (slot 1, slot 2, slot 3), respectively. The hopping function determines the time offset as a function of a wireless terminal identifier, a user identified and/or a priority level value. In some embodiments, other inputs can be used by the hopping function, e.g., a received broadcast value associated with the spectrum, a received key, a value associated with a designated area, a value associated with a sector, etc.

In this example, the tone of the beacon signal used by the wireless terminal for the beacon symbol (3326, 3328, 3330) of the beacon signal bursts (3320, 3322, 3324), respectively, in slots resources (3308, 3310, 3312), respectively, is also hopped from one slot to another in accordance with a tone hopping function. Inputs to the tone hopping function include one or more of a wireless terminal identifier, a user identifier, a priority level value, a received broadcast value associated with the spectrum, a received key, a value associated with a designated area, and a value associated with a sector.

In this example, the next iteration of beacon signaling resource slot 1 3308' has the beacon symbol 3326' of beacon burst 3320' placed in the same OFDM tone-symbol position of the resource 3308' as the beacon symbol 3326 of beacon burst 3320 in resource 3308. In some embodiments, two separate hopping functions are used, one for beacon burst time hopping and the other for tone hopping. In some embodiments the beacon burst time position hopping function and the tone hopping function have the same sequence length. In some embodiments, the beacon burst time position hopping function and the tone hopping function have different sequence lengths. For example, the two sequence lengths may be co-prime with each other. Alternatively, the ratio of one sequence length to the other sequence length may be an integer. In other embodiments, one hopping function is used for both beacon burst time hopping and tone hopping. Specifically, suppose that each beacon signaling resource slot 3308, 3310, 3312 includes M symbol times and every symbol time includes N tones. Then, in each slot, the hopping function outputs a number, which uniquely identifies one specific tone at one specific symbol time. For example, the number can be $0, 1, \ldots, M*N-1$, where M and N are positive integers. In some embodiments, N is at least 100 and M is at least 20, although in other embodiments, the values may be smaller.

FIG. 34 is a drawing 3400 illustrating exemplary coordinated timing in a peer to peer communications band in accordance with various embodiments. Drawing 3400 includes exemplary $1^{st}$ and $2^{nd}$ wireless terminal (3402, 3404), e.g., peer mobile nodes. Upper drawing portion 3401 is used to illustrate operations of wireless terminal 1 3402, while lower drawing portion 3403 is used to illustrate operations of wireless terminal 2 3404. Horizontal axes 3406 represents time, while vertical axes 3408 represents frequency, e.g., OFDM tones in the peer to peer frequency band.

Both wireless terminals (3402, 3404) receive and use external broadcast signal 3410 to obtain timing reference. Based on the timing reference signal 3410, both wireless terminals (3402, 3404) recognize beacon signaling resource slots 3412 and 3414. Wireless terminal 1 3402 transmits a beacon signal burst 3416 including beacon symbol 3418 during time interval 3440, and beacon signal burst 3420 including beacon symbol 3422 during time interval 3442. Wireless terminal 2 3404 is monitoring for beacon symbols from other wireless terminals during time intervals 3444, 3446, 3448, and 3450. Since time interval 3440 is with time interval 3446 wireless terminal 2 is able to detect the beacon symbol 3418 from wireless terminal 1 3402. Since time interval 3442 is within time interval 3450 wireless terminal 2 is able to detect the beacon symbol 3422 from wireless terminal 1 3402.

Wireless terminal 2 3404 transmits a beacon signal burst 3424 including beacon symbol 3426 during time interval 3452, and beacon signal burst 3428 including beacon symbol 3430 during time interval 3454. Wireless terminal 1 3402 is monitoring for beacon symbols from other wireless terminals during time intervals 3432, 3434, 3436, and 3438. Since time interval 3452 is within time interval 3432 wireless terminal 1 is able to detect the beacon symbol 3426 from wireless terminal 2 3404. Since time interval 3454 is within time interval 3436 wireless terminal 1 is able to detect the beacon symbol 3430 from wireless terminal 2 3404.

In this example, both wireless terminals are able to detect beacon signals from each other. The coordinated timing structure based on a reference allows efficient operation and reduced power consumption, since modules within a wireless terminal can be powered down when transmission and/or monitoring is not required, e.g., during silence modes of operation.

Time hopping of the beacon burst, e.g., as a function of a wireless terminal identifier, facilitates resolution of a problem where both wireless terminal 1 and wireless terminal 2 should happen to transmit a beacon signal burst during one beacon signaling resource slot. In some embodiments, the beacon burst time hopping is structured so that at least some beacon signal bursts transmitted by two peer wireless terminals will be non-overlapping. In some embodiments, a wireless terminal, occasionally, refrains from transmitting its beacon burst during a beacon signaling resource and monitors for the full duration of the beacon signaling resource.

Additional embodiments, features and variations will now be discussed.

An infrastructure network usually includes a base station, which provides service to terminals in a given geographical area. In an exemplary embodiment, a base station of an infrastructure network uses a first (infrastructure) spectrum band to provide service in a geographical area. Meanwhile, a second (non-infrastructure) spectrum band, which is different from the infrastructure spectrum band, is also available for the terminals in the area, e.g., to be used for an ad hoc network.

In accordance with various embodiments, in order to facilitate the timing and/or frequency synchronization in the ad hoc network using the non-infrastructure spectrum band, the infrastructure base station transmits a beacon signal.

In an exemplary embodiment, the base station transmits the beacon signal in the infrastructure spectrum band. The desired common timing and/or frequency reference to be used in the non-infrastructure spectrum band can be determined from the beacon signal. In addition, the base station may, and sometimes does, send system information about the frequency location of the non-infrastructure spectrum band and the type of service provided in the non-infrastructure spectrum band, e.g., TDD (time division duplex) or ad hoc networking. The system information is sent using the beacon signal and/or other broadcast control signals.

A wireless terminal first tunes to the infrastructure spectrum band to detect the beacon signal and derives the timing and/or frequency reference to be used in the non-infrastructure spectrum band. The wireless terminal further receives the system information from the beacon and/or other broadcast control signals and determines the frequency location of the non-infrastructure spectrum band, e.g., carrier frequency. The wireless terminal tunes to the non-infrastructure spectrum band and uses the acquired timing and/or frequency synchronization to start a communication link in the non-infrastructure spectrum band.

In another embodiment, the base station transmits the beacon signal in the non-infrastructure spectrum band, so that if the wireless terminal directly tunes to the non-infrastructure spectrum band, the wireless terminal can derive the desired common timing and/or frequency reference from the beacon signal. In that embodiment, the base station may, and sometimes does, additionally transmit beacon and/or other broadcast control signals in the infrastructure spectrum band as well as send system information about the frequency location of the non-infrastructure spectrum band and the type of service provided in the non-infrastructure spectrum band.

In yet another embodiment, in which the infrastructure spectrum band may not exist, a special transmitter is set in a geographic area to transmit a system beacon signal in each of the non-infrastructure spectrum bands that are available for use in the vicinity of the geographical area in which the special transmitter sits. In one embodiment, at a given time, the special transmitter transmits at most one beacon signal burst in a spectrum band. The special transmitter hops across each of the available spectrum bands and transmits the beacon signal burst successively from one spectrum band to another. A wireless terminal is to scan a candidate spectrum band to see whether a system beacon signal can be detected in the candidate spectrum band. If a system beacon signal is detected, then the candidate spectrum band is available for use. Otherwise, the wireless terminal, in some embodiments, is not allowed to use the candidate spectrum band, in which case the wireless terminal may have to scan another candidate spectrum band to find an available spectrum band to use.

After the wireless terminal obtains the timing and/or frequency reference from the beacon signal the wireless terminal then tunes to the non-infrastructure spectrum band. The wireless terminal, in some embodiments, starts to transmit its own user beacon signal in the non-infrastructure spectrum band. Similar to the beacon signal sent by the infrastructure base station, the user beacon signal also includes a sequence of beacon signal bursts in a spectrum band. However, the user beacon signal, in some embodiments, is different from the beacon signal sent by the infrastructure base station in at least one of the following ways: the periodicity of the beacon signal bursts, the tone used in a beacon signal burst, and the hopping pattern of the tones used in successive beacon signal bursts. The wireless terminal may, and sometimes does, further listen to the non-infrastructure spectrum band to detect the presence of a user beacon signal sent by another wireless terminal. In some embodiments, the wireless terminal determines transmission and/or detection of user beacon signals as a function of the timing and/or frequency reference from the beacon signal sent by the infrastructure base station. When wireless terminals derive their timing and/or frequency reference from the same source, e.g., the same infrastructure base station beacon signal, it is easy for them to detect each other's presence and to establish communication links.

In accordance with a feature of some exemplary embodiments, while a wireless terminal is in a peer-to-peer communication session the non-infrastructure spectrum band, the wireless terminal may, and sometimes does, periodically suspend the session for a short time period and tune to the infrastructure spectrum band, e.g., to check whether there is a page for the terminal. The time periods in which the wireless terminal checks pages are, in some embodiments, pre-determined, so that both the wireless terminal and the base station can be synchronized on when a page should be delivered. In some embodiments, a set of wireless terminals in the peer-to-peer communication sessions have a common time period in which each of those wireless terminals suspend the sessions in the non-infrastructure spectrum band and check pates in the infrastructure spectrum band. Advantageously, this synchronization helps reduce the wastage of session time in the peer-to-peer sessions.

In accordance with various embodiments, the infrastructure base station also provides service in the non-infrastructure spectrum band, e.g., to provide peer-to-peer communication service and/or to provide TDD service. The base station in some embodiments transmits the beacon signal in such a way that after the wireless terminal receives the beacon signal the wireless terminal can predict the signal quality of a data session if the wireless terminal is to establish a communication link with the base station. In one embodiment, the transmission power of the beacon signal is the same for each of such base stations. In another embodiment, the data session, e.g., at a given coding and modulation rate, is set at a transmission power, which is a function of the transmission power of the beacon signal. For example, the per minimum transmission unit transmission power of the data session is a fixed dB amount, e.g., 10 dBs or 16 dBs, below the transmission power of the beacon symbols of the beacon signal.

While described primarily in the context of an OFDM system, the methods and apparatus of various embodiments are applicable to a wide range of communications systems including many non-OFDM, and/or many non-cellular systems.

In various embodiments nodes described herein are implemented using one or more modules to perform the steps corresponding to one or more methods, for example, generating a beacon signal, transmitting a beacon signal, receiving beacon signals, monitoring for beacon signals, recovering information from received beacon signals, determining a timing adjustment, implementing a timing adjustment, changing a mode of operation, initiating a communication session, etc. In some embodiments various features are implemented using modules. Such modules may be implemented using software, hardware or a combination of software and hardware. Many of the above described methods or method steps can be implemented using machine executable instructions, such as software, included in a machine readable medium such as a mnemory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communication links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:
1. A method of operating a base station, comprising:
transmitting a beacon signal, said beacon signal including at least one beacon signal burst, said beacon signal conveying information about a peer to peer frequency band;

receiving data, from a plurality of wireless terminals using said base station as an access node, for communication through said access node;

wherein transmitting a beacon signal includes transmitting said beacon signal into a first communications band, said beacon signal conveyed information indicating a second frequency band which is used as said peer to peer frequency band, said second frequency band being different from said first frequency band; and wherein said base station does not receive or transmit user data in the second frequency band.

2. The method of claim 1, further comprising transmitting user data to said plurality of wireless terminals using said first frequency band.

3. The method of claim 2, wherein said receiving data includes receiving data in said first frequency band during a first time period and wherein said transmitting user data into said first frequency band is performed during a second time period which is different from said first time period, said first frequency band being used in a time division multiplexed manner.

4. The method of claim 3, wherein the average transmitted power into said second frequency band over a 1 minute time period is less than $\frac{1}{1000}$ the average transmitted power transmitted by said base station into the first frequency band.

5. The method of claim 2, further comprising transmitting a second beacon signal into the first communications band, said second beacon signal providing timing synchronization information to the plurality of wireless terminals using said base station as an access node.

6. A base station, comprising:

a beacon signal generation module for generating a beacon signal, said beacon signal including at least one beacon signal burst, said beacon signal burst conveying information about a peer to peer frequency band;

a frequency band control module for controlling transmission of said beacon signal into a first communications band, said beacon signal conveying information indicating a second frequency band which is used as said peer to peer frequency band, said second frequency band being different from said first frequency band, said second frequency band being a frequency band in which said base station does not receive or transmit user data;

a transmitter for transmitting the generated beacon signal, and a receiver for receiving signals including user data signals from a plurality of wireless terminals using said base station as an access node for communication through said access node.

7. The base station of claim 6, further comprising:

wherein said beacon signal indicates a carrier frequency of said second frequency band and if said second frequency band is to be used in a time division duplex manner.

8. The base station of claim 7, further comprising:

a user data transmission control module for controlling transmission of user data to multiple ones of said plurality of wireless terminals using said first frequency band.

9. The base station of claim 8, wherein said receiving data includes receiving data in said first frequency band during a first time period and wherein said transmitting user data into said first frequency band is performed during a second time period which is different from said first time period, said first frequency band being used in a time division multiplexed manner.

10. The base station of claim 9, further comprising:

a transmission power control module for controlling transmission power into the second frequency band to keep the average transmitted power into said second frequency band over a 1 minute time period less than $\frac{1}{1000}$ the average transmitted power transmitted by said base station into the first frequency band.

11. The base station of claim 9, wherein the base station transmits into the first frequency band but does not transmit into the second frequency band.

12. The base station of claim 9, further comprising:

an access node beacon signal generation module for generating a second beacon signal, said second beacon signal providing timing synchronization information to the plurality of wireless terminals using said base station as an access node; and wherein the transmitter is also for transmitting the second beacon signal into the first frequency band.

13. The base station of claim 12, wherein said transmitter is an OFDM transmitter.

14. A base station, comprising:

beacon signal generation means for generating a beacon signal, said beacon signal including at least one beacon signal burst, said beacon signal burst conveying information about a peer to peer frequency band;

frequency band control means for controlling transmission of said beacon signal into a first communications band, said beacon signal conveying information indicating a second frequency band which is used as said peer to peer frequency band, said second frequency band being different from said first frequency band, said second frequency band being a frequency band in which said base station does not receive or transmit user data;

transmission means for transmitting the generated beacon signal, and receiver means for receiving signals including user data signals from a plurality of wireless terminals using said base station as an access node for communication through said access node.

15. The base station of claim 14, wherein said beacon signal indicates a carrier frequency of said second frequency band and if said second frequency band is to be used in a time division duplex manner.

16. The base station of claim 15, further comprising:

user data transmission control means for controlling transmission of user data to multiple ones of said plurality of wireless terminals using said first frequency band.

17. The base station of claim 16, wherein said receiving data includes receiving data in said first frequency band during a first time period and wherein said transmitting user data into said first frequency band is performed during a second time period which is different from said first time period, said first frequency band being used in a time division multiplexed manner.

18. The base station of claim 17, further comprising:

transmission power control means for controlling transmission power into the second frequency band to keep the average transmitted power into said second frequency band over a 1 minute time period less than $\frac{1}{1000}$ the average transmitted power transmitted by said base station into the first frequency band.

19. A non-transitory computer readable medium embodying machine executable instructions for controlling a base station to implement a method of communicating with another communications device, the method comprising:

transmitting a beacon signal, said beacon signal including at least one beacon signal burst, said beacon signal conveying information about a peer to peer frequency band;

receiving data from a plurality of wireless terminals using said base station as an access node for communication through said access node;

wherein transmitting a beacon signal includes transmitting said beacon signal into a first communications band, said beacon signal conveyed information indicating a second frequency band which is used as said peer to peer frequency band, said second frequency band being different from said first frequency band; and wherein said base station does not receive or transmit user data in the second frequency band.

20. The non-transitory computer readable medium of claim 19, wherein said beacon signal indicates a carrier frequency of said second frequency band and if said second frequency band is to be used in a time division duplex manner.

21. The non-transitory computer readable medium of claim 20, further embodying machine executable instructions for:
transmitting user data to said plurality of wireless terminals using said first frequency band.

22. The non-transitory computer readable medium of claim 21, wherein said receiving data includes receiving data in said first frequency band during a first time period and wherein said transmitting user data into said first frequency band is performed during a second time period which is different from said first time period, said first frequency band being used in a time division multiplexed manner.

23. The non-transitory computer readable medium of claim 21, wherein said base station does not receive or transmit user data in the second frequency band.

24. The non-transitory computer readable medium of claim 21, further embodying machine executable instructions for transmitting a second beacon signal into the first communications band, said second beacon signal providing timing synchronization information to the plurality of wireless terminals using said base station as an access node.

25. An apparatus comprising:
a base station processor configured to:
generate a beacon signal, said beacon signal including at least one beacon signal burst, said beacon signal burst conveying information about a peer to peer frequency band;
control transmission of said beacon signal into a first communications band, said beacon signal conveying information indicating a second frequency band which is used as said peer to peer frequency band, said second frequency band being different from said first frequency band, said second frequency band being a frequency band in which said base station does not receive or transmit user data;
transmit the generated beacon signal, and
receive signals including user data signals from a plurality of wireless terminals using said apparatus as an access node for communication through said access node.

26. The apparatus of claim 25, wherein said beacon signal indicates a carrier frequency of said second frequency band and if said second frequency band is to be used in a time division duplex manner.

27. The apparatus of claim 26, wherein said base station processor is further configured to:
control transmission of user data to multiple ones of said plurality of wireless terminals using said first frequency band.

28. The apparatus of claim 27, wherein said receiving data includes receiving data in said first frequency band during a first time period and wherein said transmitting user data into said first frequency band is performed during a second time period which is different from said first time period, said first frequency band being used in a time division multiplexed manner.

29. The apparatus of claim 28, wherein said base station processor is further configured to:
control transmission power into the second frequency band to keep the average transmitted power into said second frequency band over a 1 minute time period less than $\frac{1}{1000}$ the average transmitted power transmitted by said apparatus into the first frequency band.

30. A beacon signal transmission apparatus, comprising:
a beacon signal transmitter for transmitting a sequence of beacon signal bursts each beacon signal burst including at least one beacon symbol, said beacon transmission signal apparatus being a free standing device not including any transmitter used to transmit data to an individual user device;
a beacon signal transmission control module for controlling transmission of beacon signal bursts; and
wherein said control module includes stored control information used to control said beacon signal transmitter to transmit beacon signal bursts into different frequency bands at different times.

31. A beacon signal transmission apparatus, comprising:
a beacon signal transmitter for transmitting a sequence of beacon signal bursts each beacon signal burst including at least one beacon symbol, said beacon transmission signal apparatus being a free standing device not including any transmitter used to transmit data to an individual user device;
a beacon signal transmission control module for controlling transmission of beacon signal bursts;
a multi-sector antenna; and
wherein the control module controls the transmitter to transmit beacon signal bursts into different sectors at different times.

32. The apparatus of claim 31, wherein the beacon signal transmitter is controlled to transmit into at most one sector at a time.

33. The apparatus of claim 31, wherein the apparatus is battery powered.

34. The apparatus of claim 31, wherein the apparatus is solar powered.

35. The apparatus of claim 31, wherein the apparatus is independently powered.

36. A beacon signal transmission apparatus, comprising:
a beacon signal transmitter for transmitting a sequence of beacon signal bursts each beacon signal burst including at least one beacon symbol, said beacon transmission signal apparatus being a free standing device not including any transmitter used to transmit data to an individual user device;
a beacon signal transmission control module for controlling transmission of beacon signal bursts;
a receiver for receiving a broadcast signal; and
wherein said control module controls beacon signal burst transmission timing as a function of the received broadcast signal.

37. The apparatus of claim 36, wherein said receiver is one of a GPS, GSM and CDMA receiver.

38. A method of transmitting beacon signals, comprising:
operating a beacon signal transmission apparatus comprising a beacon signal transmitter, to transmit a sequence of beacon signal bursts, each beacon signal burst including at least one beacon symbol, said beacon transmission signal apparatus being a free standing device;

controlling transmission of beacon signal bursts to occur according to a predetermined transmission schedule;
wherein said beacon signal transmission apparatus does not include any transmitter used to transmit data to an individual user device; and
wherein controlling transmission of beacon signal bursts includes using stored control information to determine a plurality of frequency bands into which beacon signal bursts are to be transmitted and the time at which said transmissions are to occur.

39. A method of transmitting beacon signals, comprising:
operating a beacon signal transmission apparatus comprising a beacon signal transmitter, to transmit a sequence of beacon signal bursts, each beacon signal burst including at least one beacon symbol;
controlling the beacon signal transmitter to transmit beacon signal bursts into different frequency bands at different times;
wherein said beacon transmission signal apparatus is a free standing device; and
wherein said beacon signal transmission apparatus does not include any transmitter used to transmit data to an individual user device.

40. A method of transmitting beacon signals, comprising:
operating a beacon signal transmission apparatus comprising a beacon signal transmitter, to transmit a sequence of beacon signal bursts, each beacon signal burst including at least one beacon symbol,
wherein said beacon transmission signal apparatus is a free standing device;
wherein said beacon signal transmission apparatus does not include any transmitter used to transmit data to an individual user device;
controlling transmission of beacon signal bursts to occur according to a predetermined transmission schedule; and
wherein controlling transmission of beacon signal bursts includes controlling the beacon signal transmitter to use a multi-sector antenna to transmit into different sectors at different times.

41. The method of claim 40, wherein controlling the beacon signal transmitter includes controlling the transmitter to transmit into at most one sector at a time.

42. The method of claim 41, wherein controlling the beacon signal transmitter includes controlling the transmitter to transmit into at most one frequency band at a time.

43. The method of claim 39, wherein controlling the beacon signal transmitter includes controlling the transmitter to control transmission into multiple frequency bands in each of multiple sectors of a cell.

44. The method of claim 43 wherein controlling the beacon signal transmitter to transmit into multiple frequency bands includes controlling the transmitter to transmit into at most one frequency band of one sector at any given time at which a beacon signal burst is transmitted.

45. The method of claim 40, further comprising:
powering said beacon signal transmitter solely from a battery power source during at least a portion of a time period during which beacon signal bursts are transmitted.

46. The method of claim 40, further comprising:
providing at least some power used to transmit beacon signal burst from a solar power source.

47. The method of claim 40, further comprising:
powering said transmitter from a power source which is independent of a commercial power grid.

48. The method of claim 39, further comprising:
receiving a broadcast signal; and
determining beacon signal burst transmission timing as a function of the received broadcast signal.

49. The method of claim 48, wherein said receiver is one of a GPS, GSM and CDMA receiver.

50. The method of claim 48, further comprising:
scanning for different types of broadcast signals which can be used as timing reference signals.

51. The method of claim 50, wherein said scanning is performed based on a predetermined sequence based on at least some geographic location information.

52. A beacon signal transmission apparatus, comprising:
beacon signal transmitter means for transmitting a sequence of beacon signal bursts, each beacon signal burst including at least one beacon symbol, said beacon transmission signal apparatus being a free standing device not including any transmitter used to transmit data to an individual user device;
beacon signal transmission control means for controlling transmission of beacon signal bursts; and
wherein said control means include stored control information used to control said beacon signal transmitter means to transmit beacon signal bursts into different frequency bands at different times.

53. The apparatus of claim 52, further comprising:
multi-sector antenna means; and
wherein the control means controls the transmitter means to transmit beacon signal bursts into different sectors at different times.

54. The apparatus of claim 53, wherein the beacon signal transmitter means is controlled to transmit into at most one sector at a time.

55. The apparatus of claim 52, further comprising:
receiver means for receiving a broadcast signal; and
wherein said control means controls beacons signal burst transmission timing as a function of the received broadcast signal.

56. A non-transitory computer readable medium embodying machine executable instructions for controlling a beacon signal transmission apparatus, the non-transitory computer readable medium comprising:
instructions for controlling a beacon signal transmitter included in said beacon signal transmission apparatus to transmit a sequence of beacon signal bursts, each beacon signal burst including at least one beacon symbol;
instructions for controlling transmission of beacon signal bursts to occur according to a predetermined transmission schedule;
wherein controlling transmission of beacon signal bursts includes using stored control information to determine a plurality of frequency bands into which beacon signal bursts are to be transmitted and the time at which said transmission is to occur;
wherein said beacon transmission signal apparatus is a free standing device; and
wherein said beacon signal transmission apparatus does not include any transmitter used to transmit data to an individual user device.

57. The non-transitory computer readable medium of claim 56,
wherein instructions for controlling the transmitter to transmit beacon signal bursts includes instructions for controlling the transmitter to use a multi-sector antenna to transmit into different sectors at different times.

58. The non-transitory computer readable medium of claim 57, wherein instructions for controlling the beacon signal transmitter includes instructions for controlling the transmitter to transmit into at most one sector at a time.

59. The non-transitory computer readable medium of claim 58, wherein instructions for controlling the beacon signal transmitter includes instructions for controlling the transmitter to transmit into at most one frequency band at a time.

60. An apparatus comprising:
a beacon signal transmitter processor configured to:
transmit a sequence of beacon signal bursts, each beacon signal burst including at least one beacon symbol, said apparatus being a free standing device not including any transmitter used to transmit data to an individual user device;
control transmission of beacon signal bursts; and
utilize stored control information to control said apparatus to transmit beacon signal bursts into different frequency bands at different times.

61. The apparatus of claim 60, further comprising a multi-sector antenna, wherein said beacon signal transmitter processor is further configured to:
control the apparatus to transmit beacon signal bursts into different sectors at different times.

62. The apparatus of claim 61, wherein the beacon signal transmitter processor is further configured to transmit into at most one sector at a time.

63. The apparatus of claim 60, wherein said beacon signal transmitter processor is further configured to:
receive a broadcast signal; and
control beacon signal burst transmission timing as a function of the received broadcast signal.

64. The method of claim 1,
wherein said beacon signal indicates a carrier frequency of said second frequency band.

65. The method of claim 64, wherein said beacon signal further indicates if said second frequency band is to be used in a time division duplex manner.

66. The apparatus of claim 30, wherein said apparatus is battery powered.

67. The apparatus of claim 30, wherein said apparatus does not include a receiver.

68. The beacon signal transmission apparatus of claim 31, wherein said beacon signal transmission apparatus does not include a receiver.

\* \* \* \* \*